United States Patent [19]
Batter, Jr.

[11] 3,932,187
[45] Jan. 13, 1976

[54] PHOTOGRAPHIC PROJECTING STRIP FILM IN A CASSETTE

[75] Inventor: John F. Batter, Jr., Lincoln, Mass.

[73] Assignee: Polaroid Corporation, Cambridge, Mass.

[22] Filed: Mar. 14, 1973

[21] Appl. No.: 341,135

Related U.S. Application Data

[62] Division of Ser. No. 277,150, Feb. 17, 1972, abandoned.

[52] U.S. Cl. .................................. 96/78; 352/241
[51] Int. Cl.² ............................................ G03C 3/02
[58] Field of Search ............... 96/78; 352/241, 130; 95/13

[56] References Cited
UNITED STATES PATENTS

| | | | |
|---|---|---|---|
| 1,499,941 | 6/1924 | Marette | 352/241 |
| 3,508,820 | 4/1970 | Tsunoda | 352/241 |
| 3,515,558 | 6/1970 | Winkler | 96/78 |
| 3,573,047 | 3/1971 | Jeffee | 96/78 |
| 3,627,407 | 12/1971 | Cook | 352/130 |
| 3,667,361 | 6/1972 | Meggs et al. | 95/13 |

*Primary Examiner*—David Klein
*Assistant Examiner*—John L. Goodrow
*Attorney, Agent, or Firm*—John W. Ericson

[57] ABSTRACT

A system for exposing, processing and projecting strip film comprising a cassette containing a roll of film connected at its ends to supply and takeup reels and passing therebetween through a film gate for cooperation with a camera and with a film drive and projection system. The cassette contains processing means, operating in a predetermined sequence determined by means within the cassette, and energized by drive energy supplied externally to sprocket holes on the film and to the takeup and supply reels by the film drive and projection system. An electrical signal generator within the cassette supplies an external signal to select the mode of operation of the film drive and projection system in dependence upon the processed or unprocessed state of the film.

1 Claim, 99 Drawing Figures

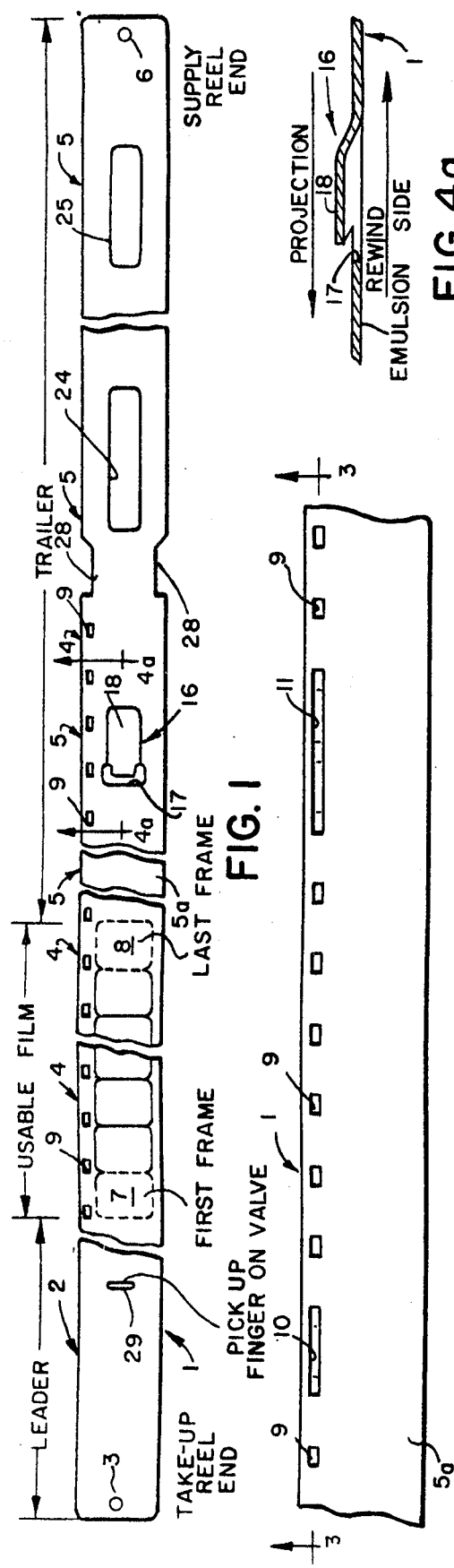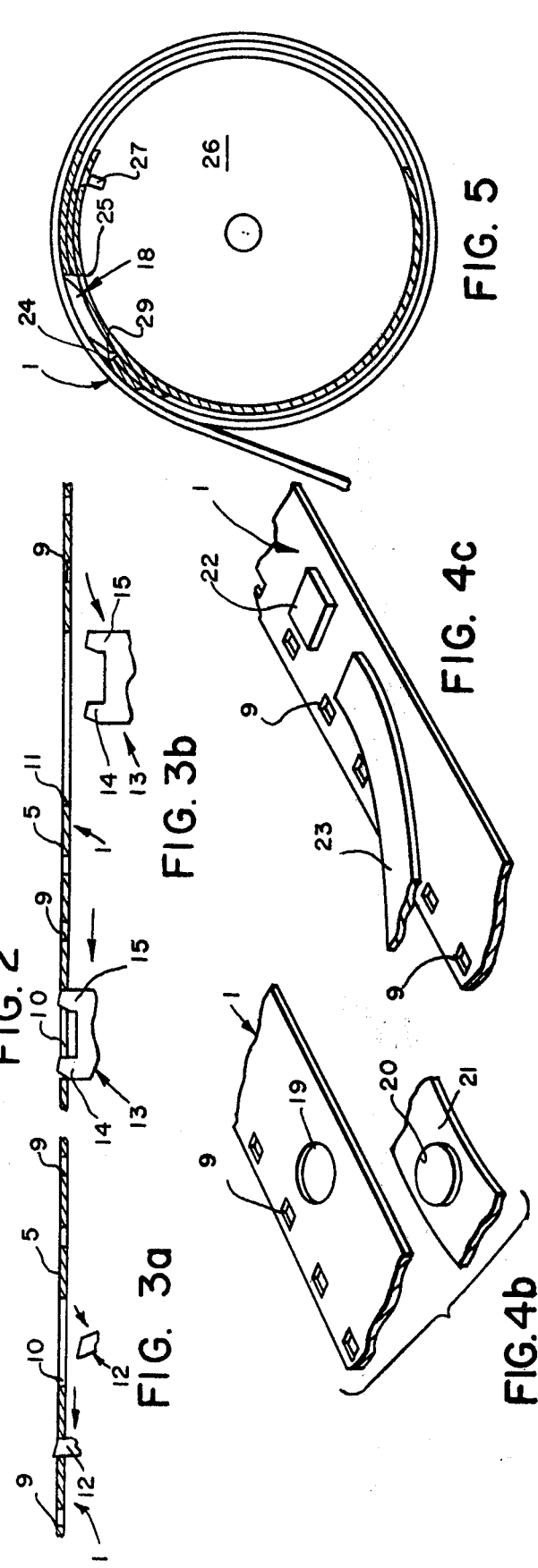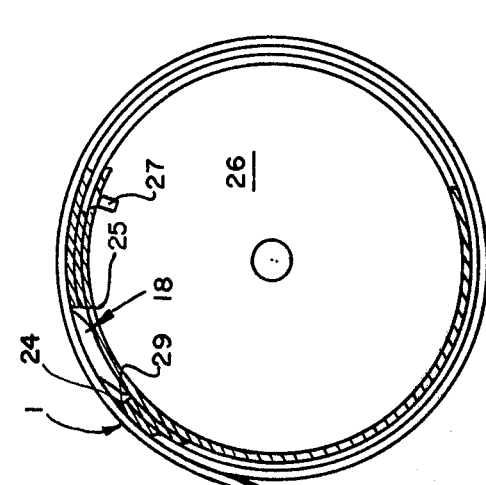

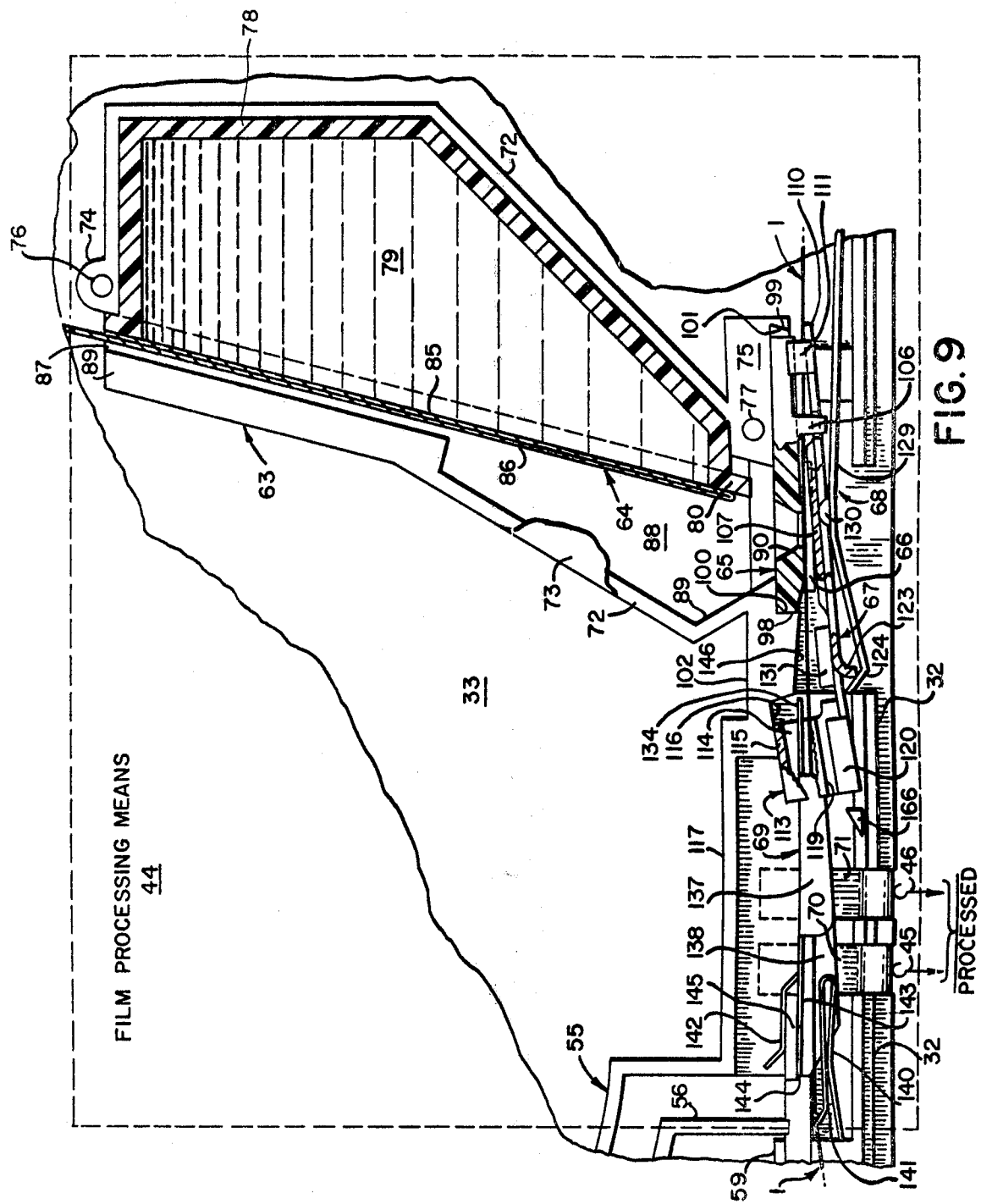

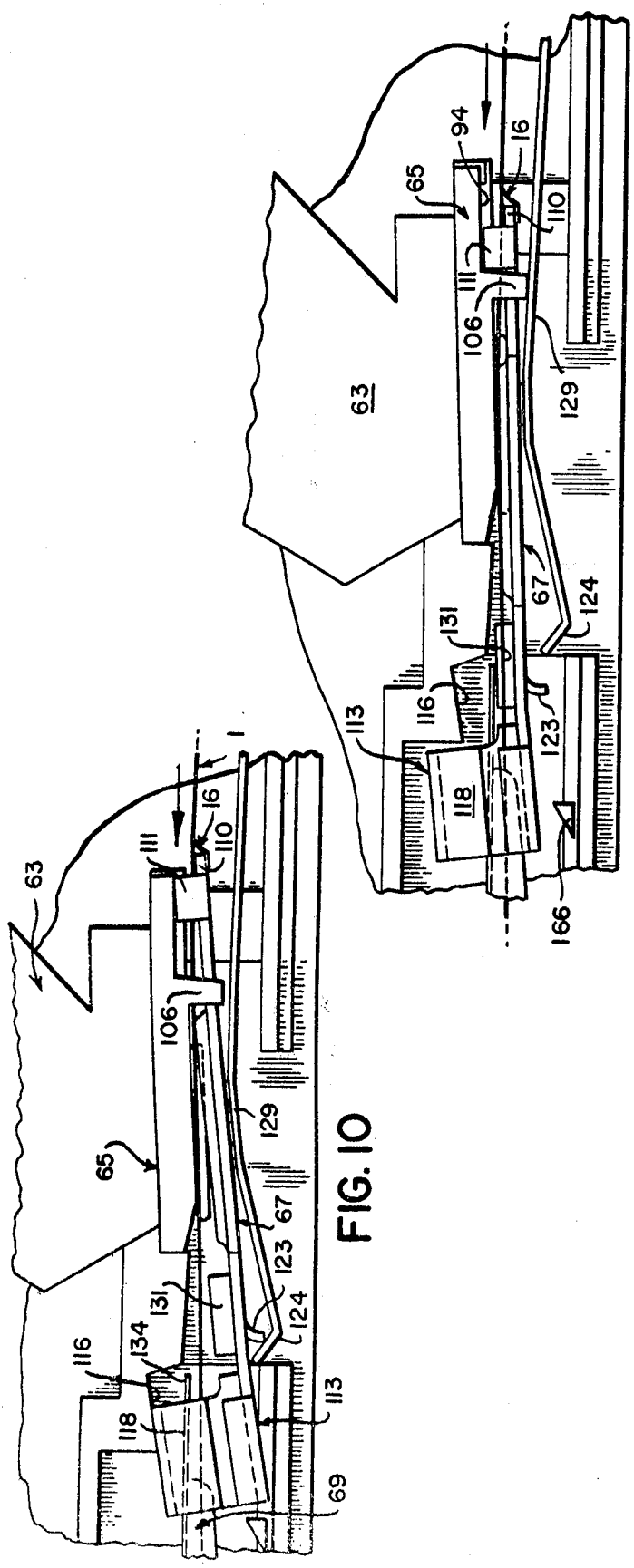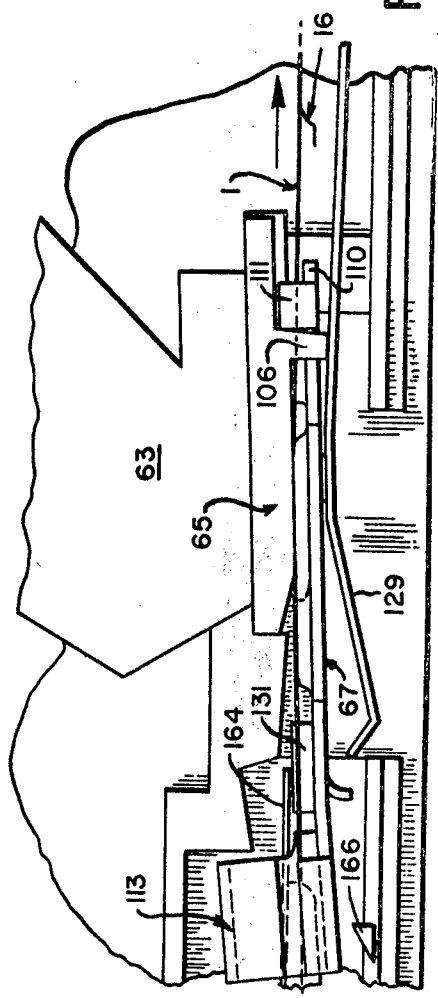

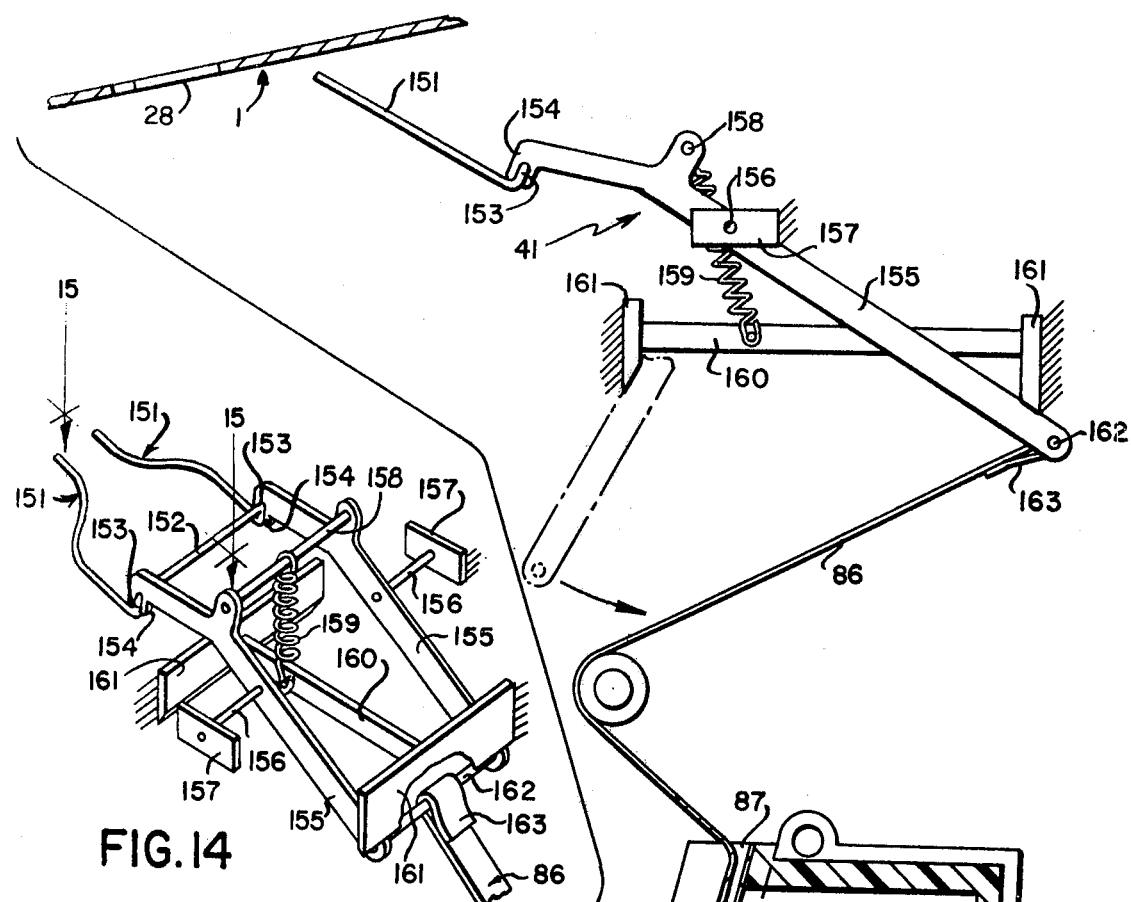
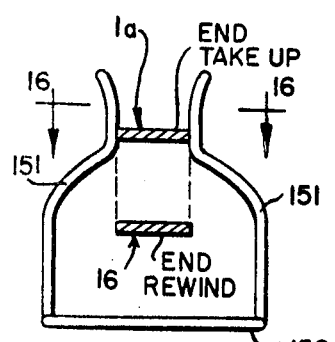
FIG.14
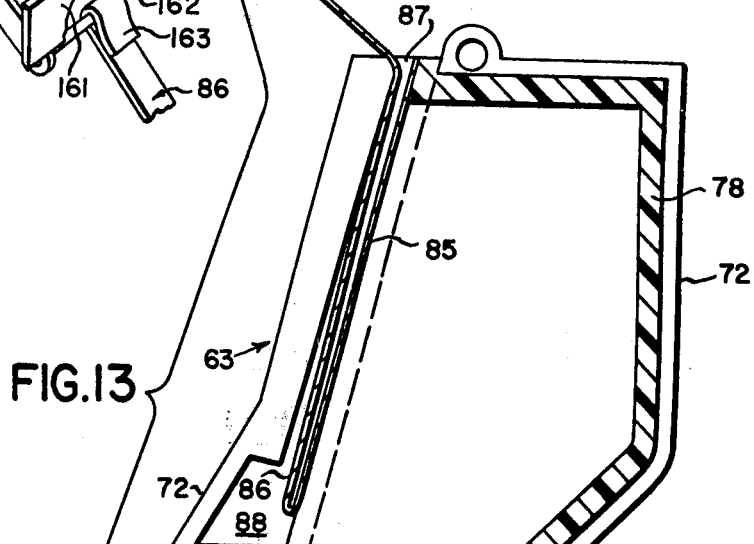
FIG.13
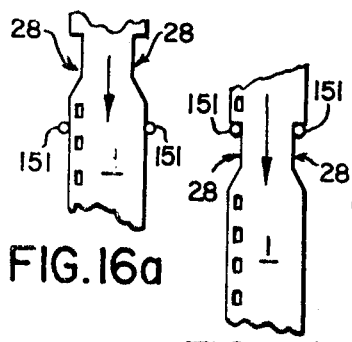
FIG.15
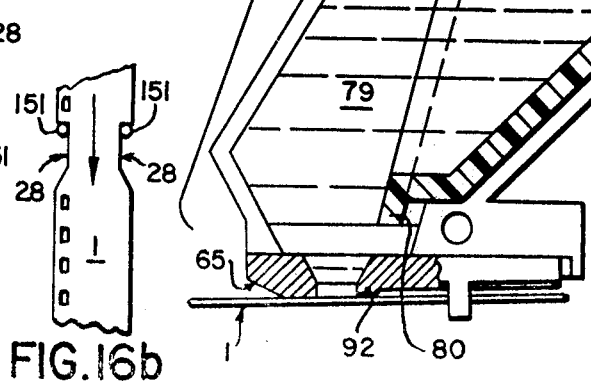
FIG.16a    FIG.16b

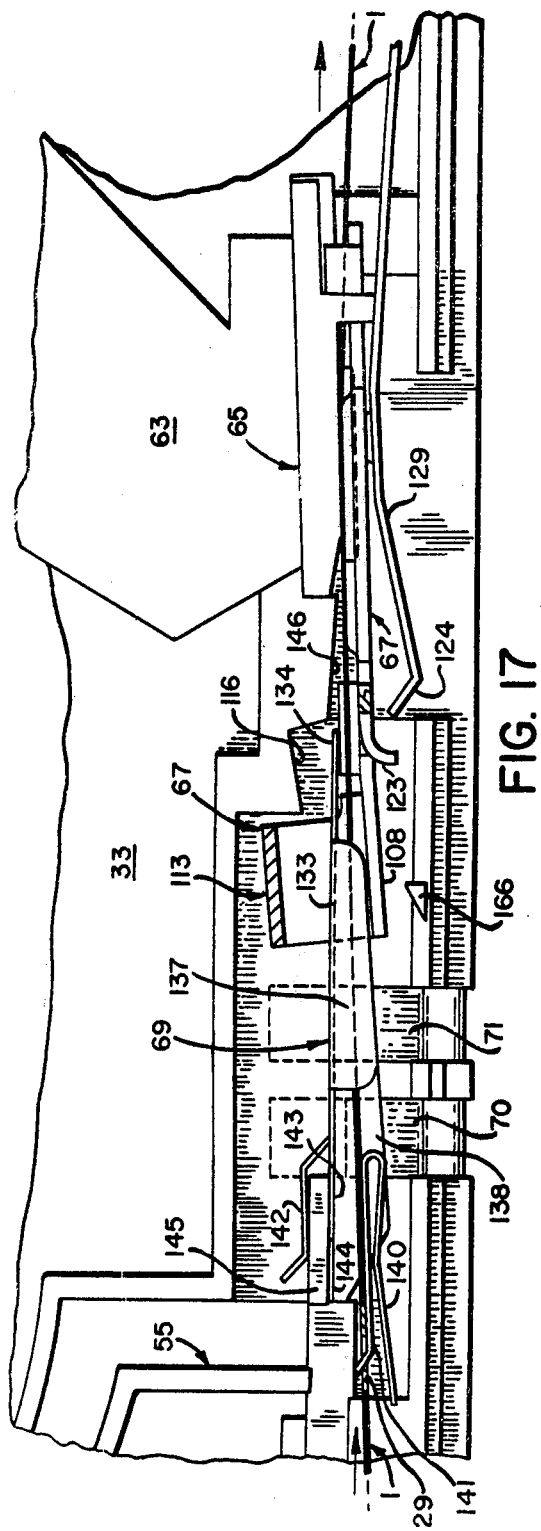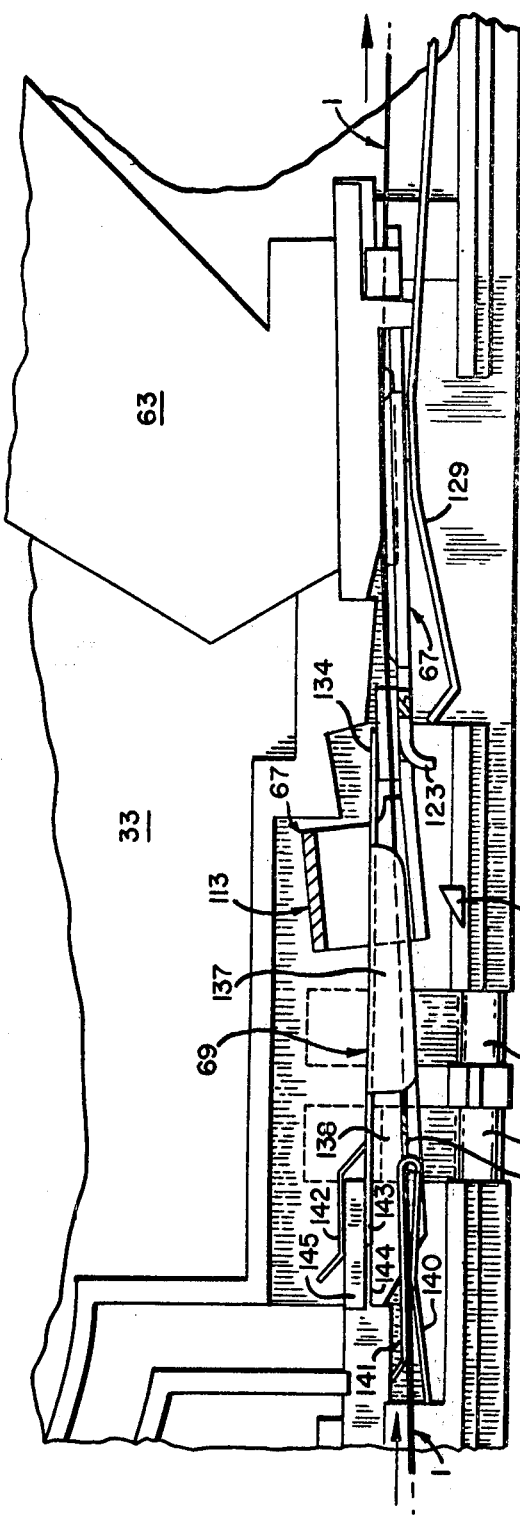

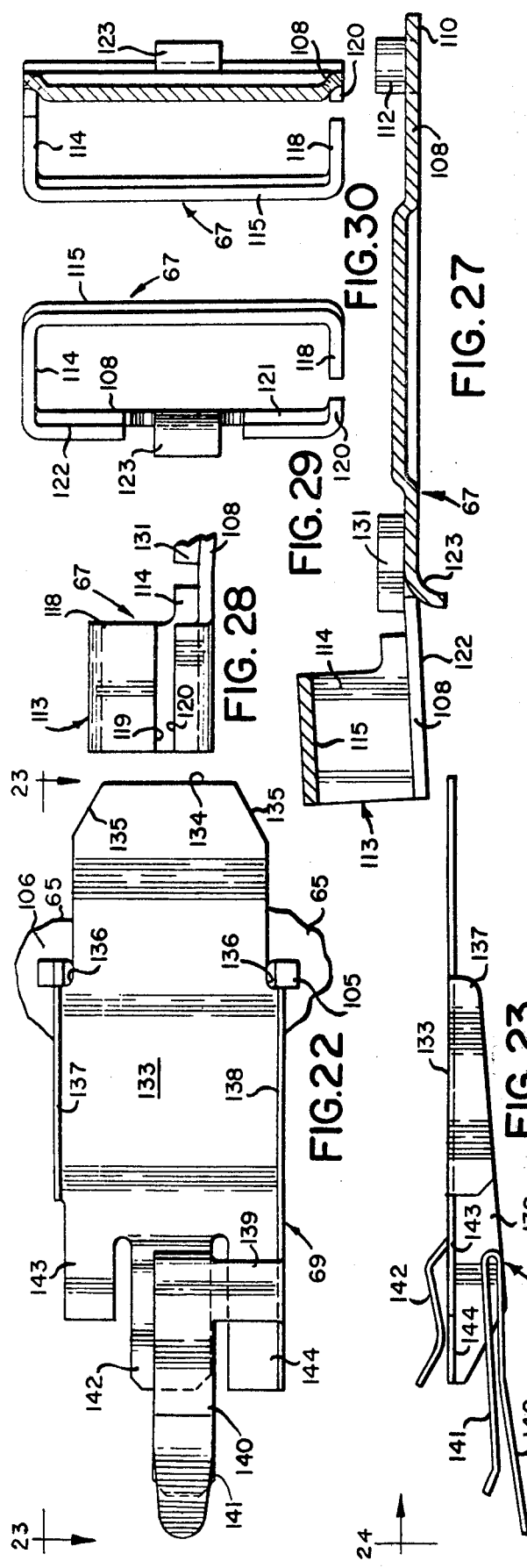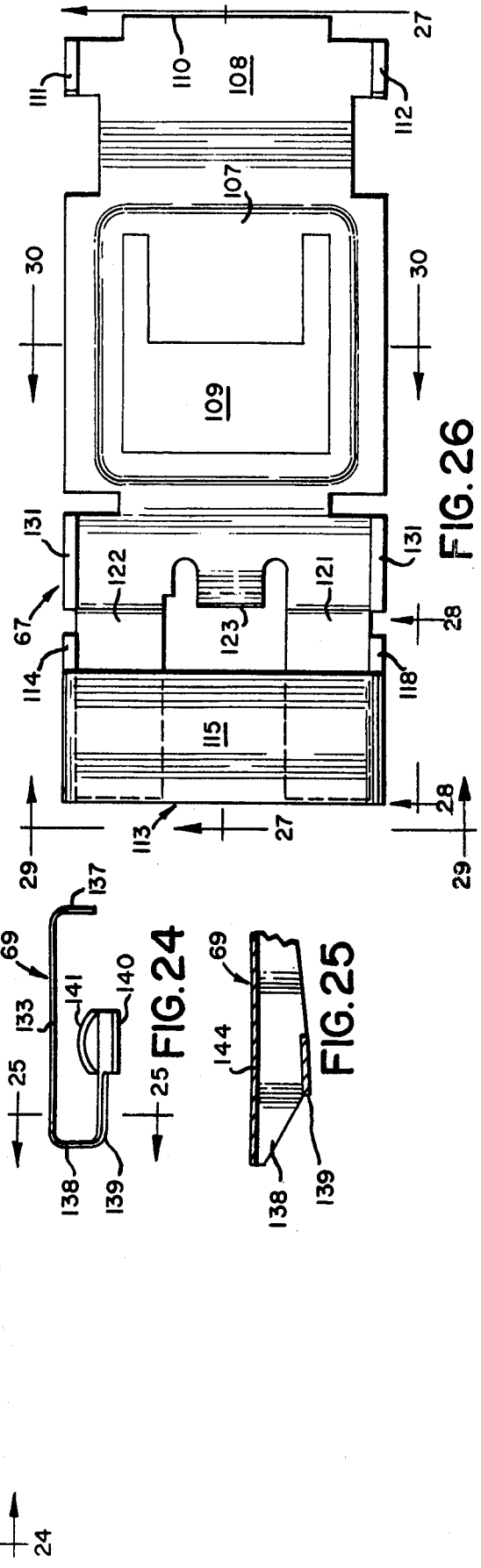

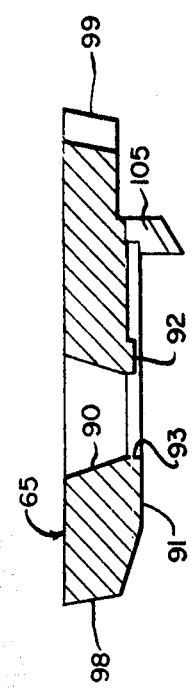
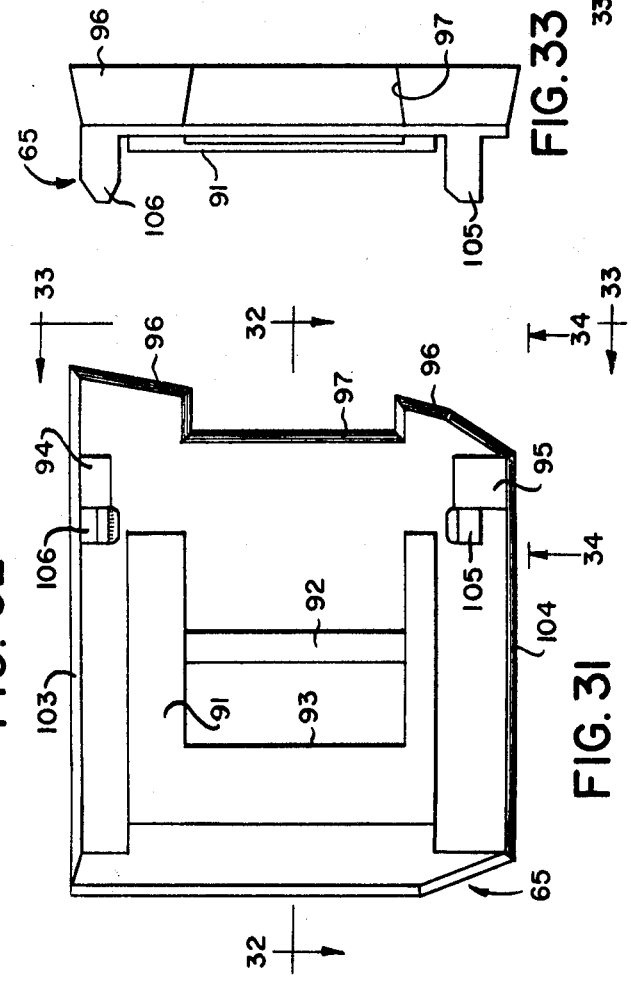
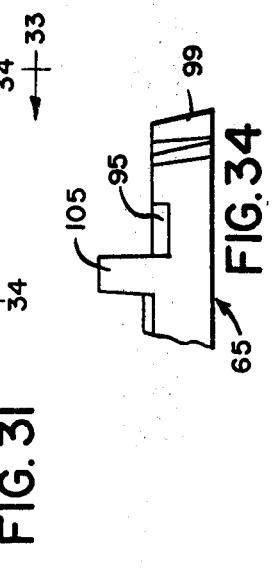
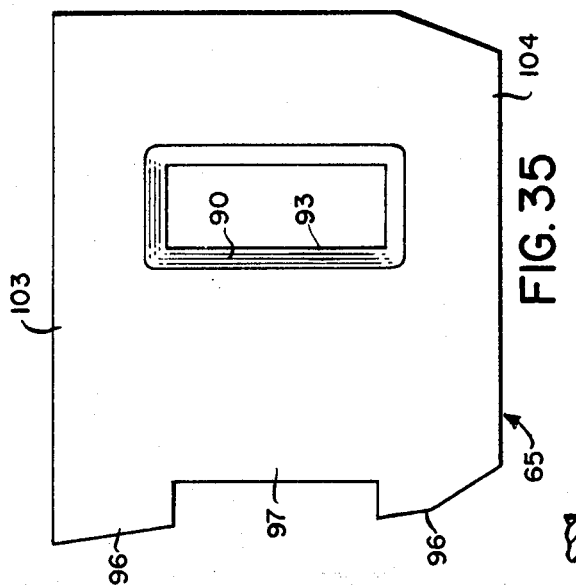
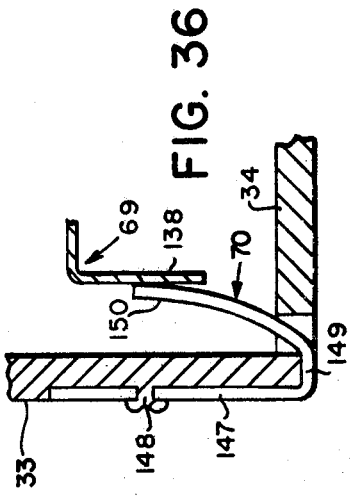

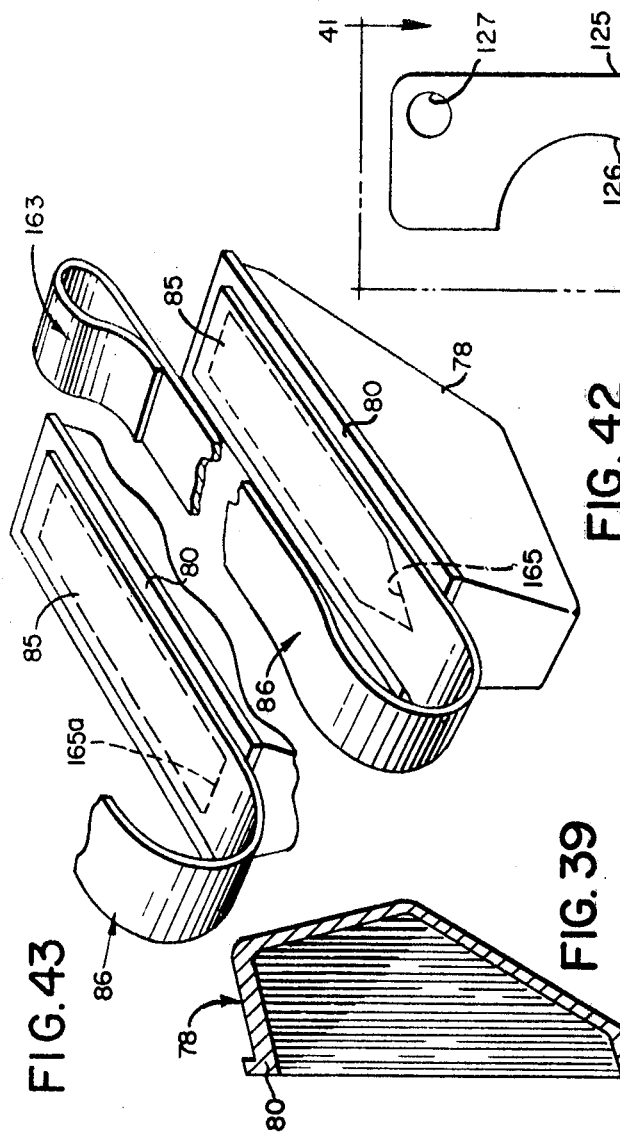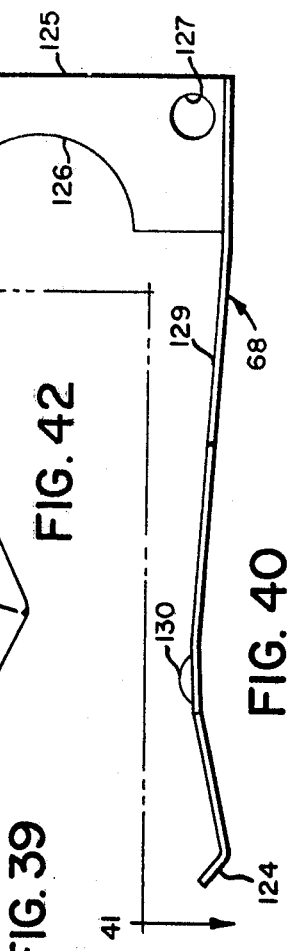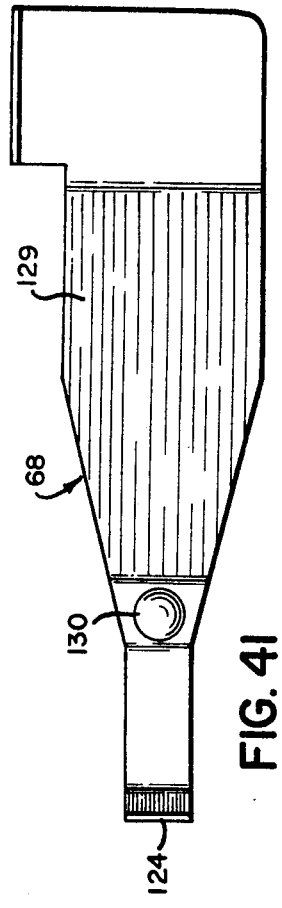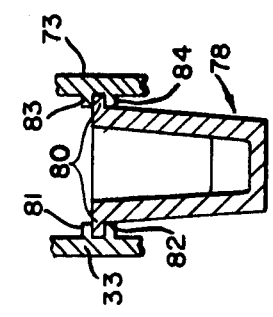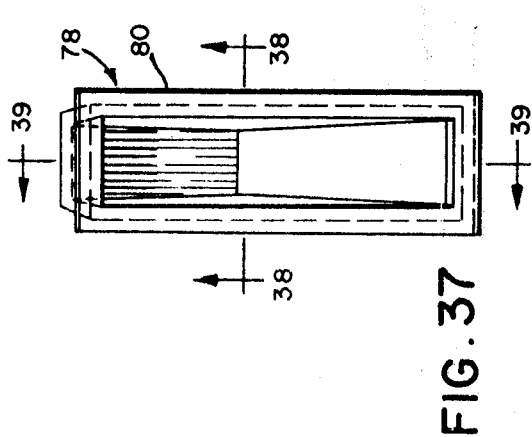

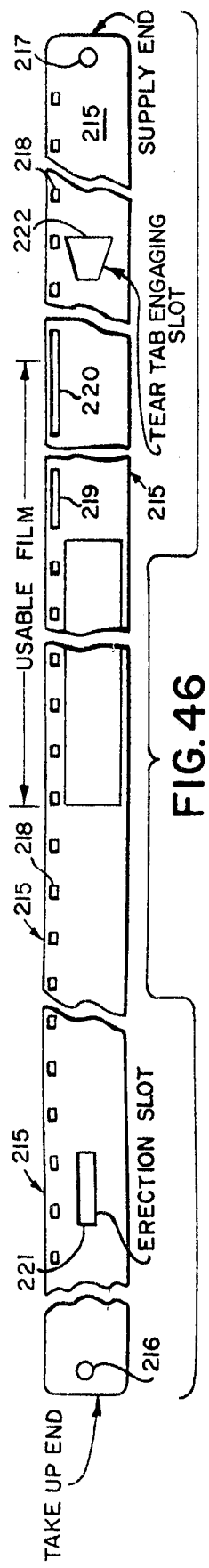
FIG. 46
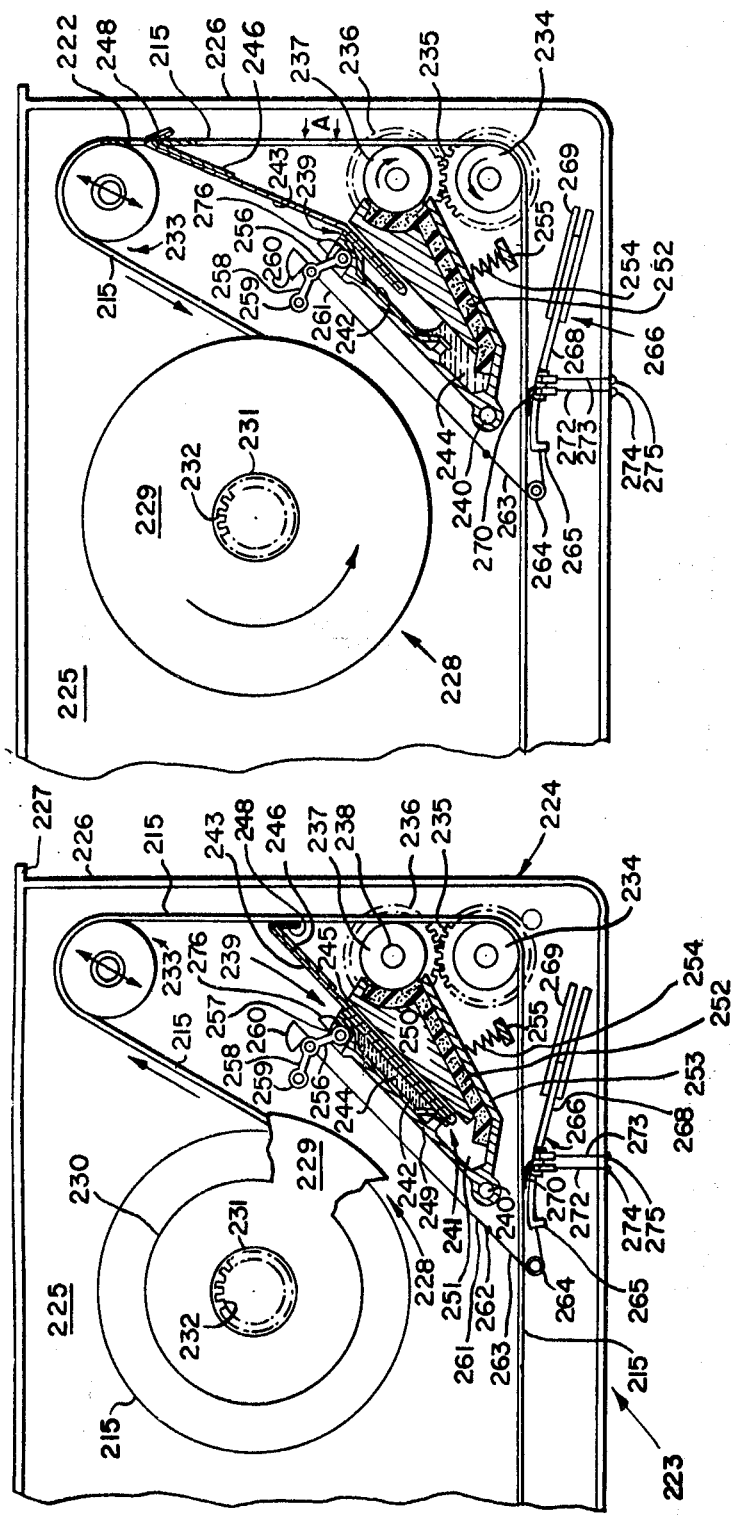
FIG. 47
FIG. 48

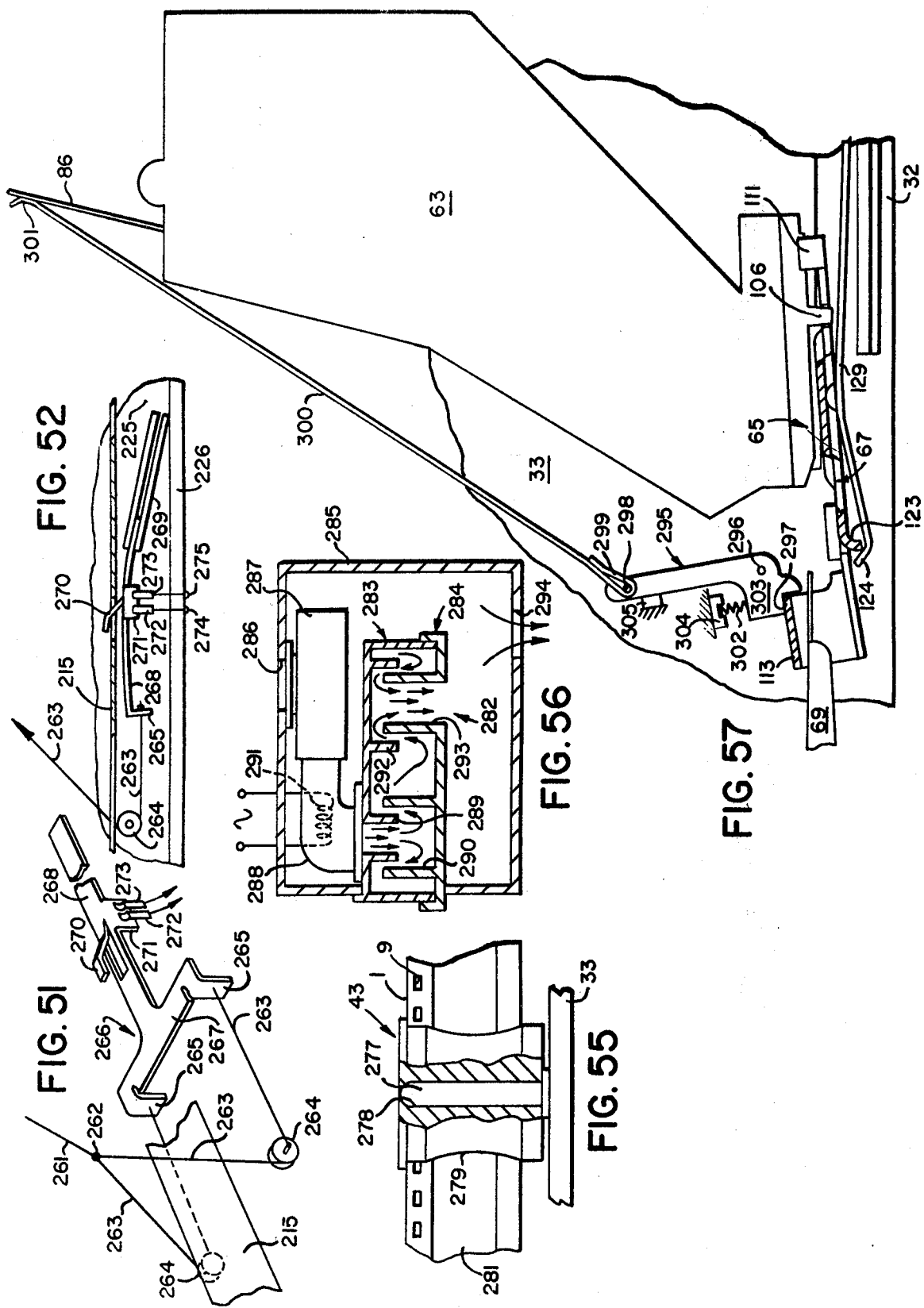

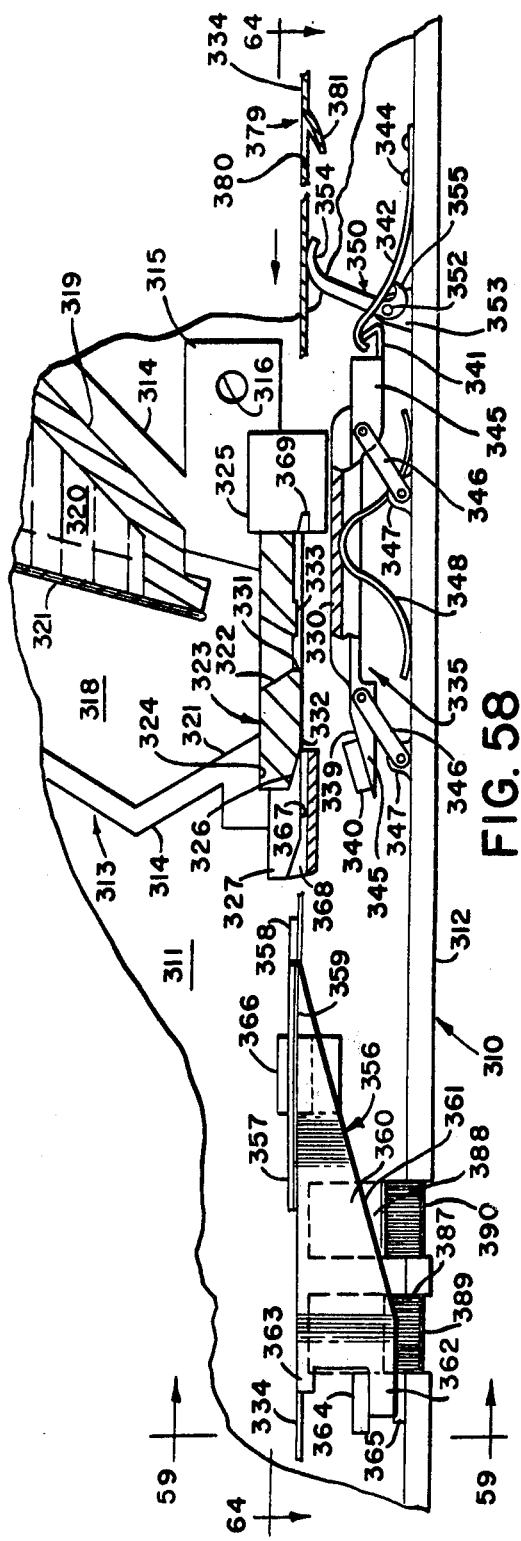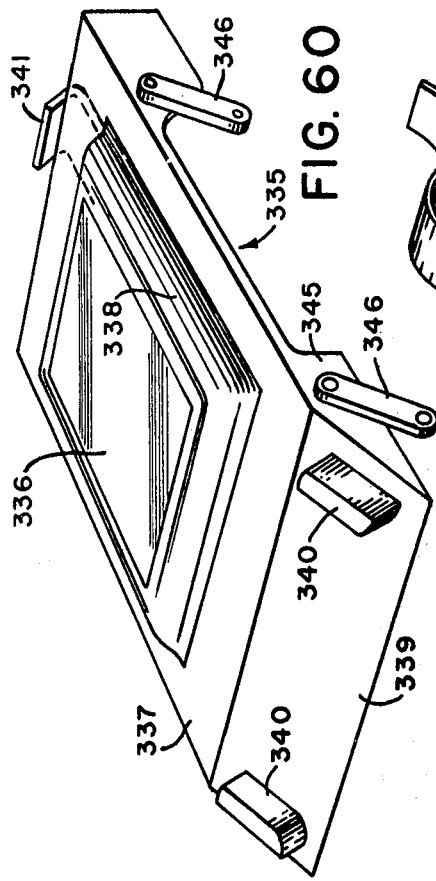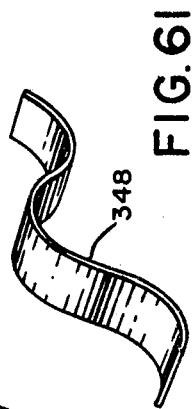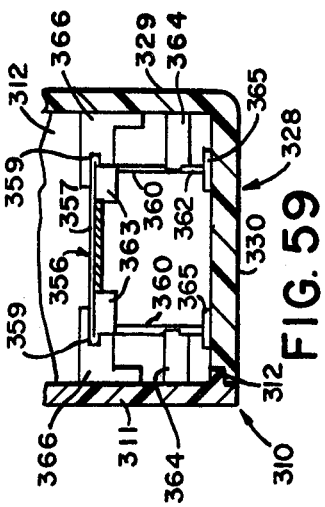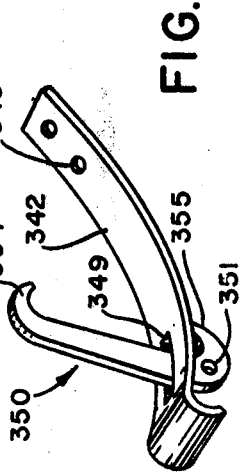

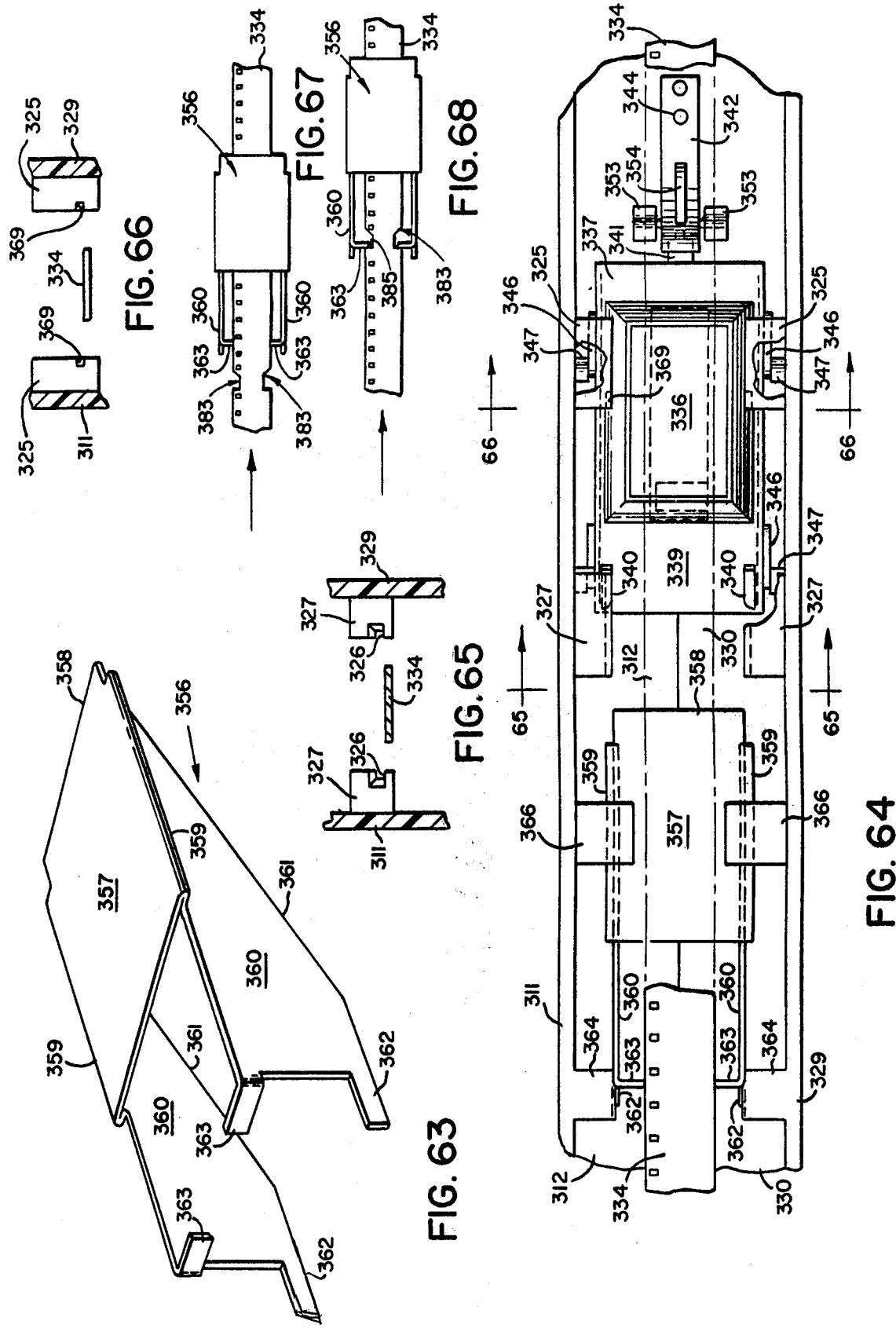

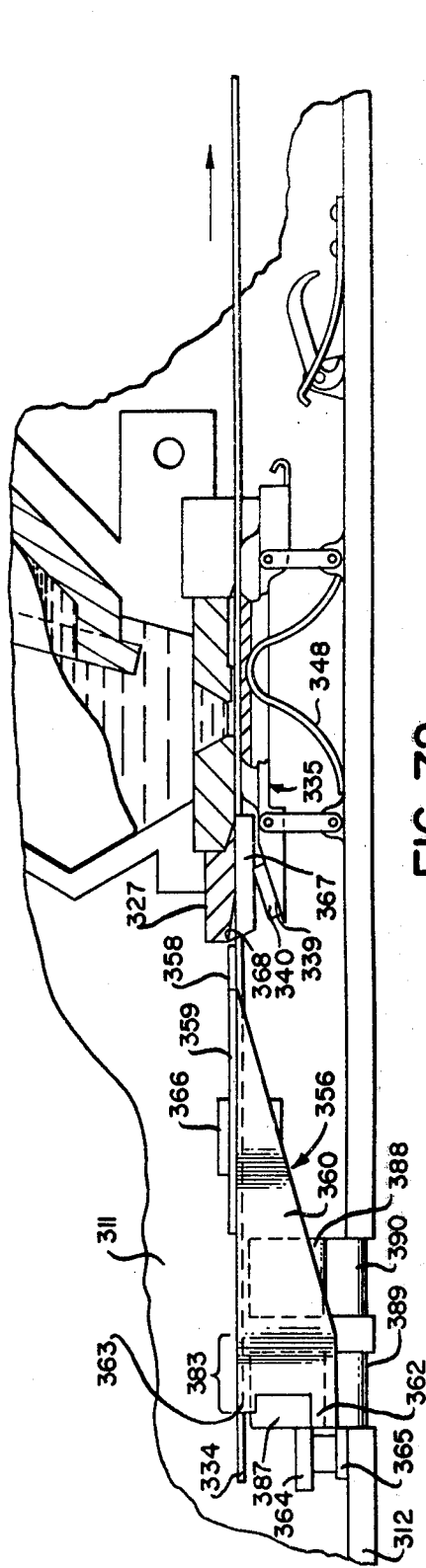
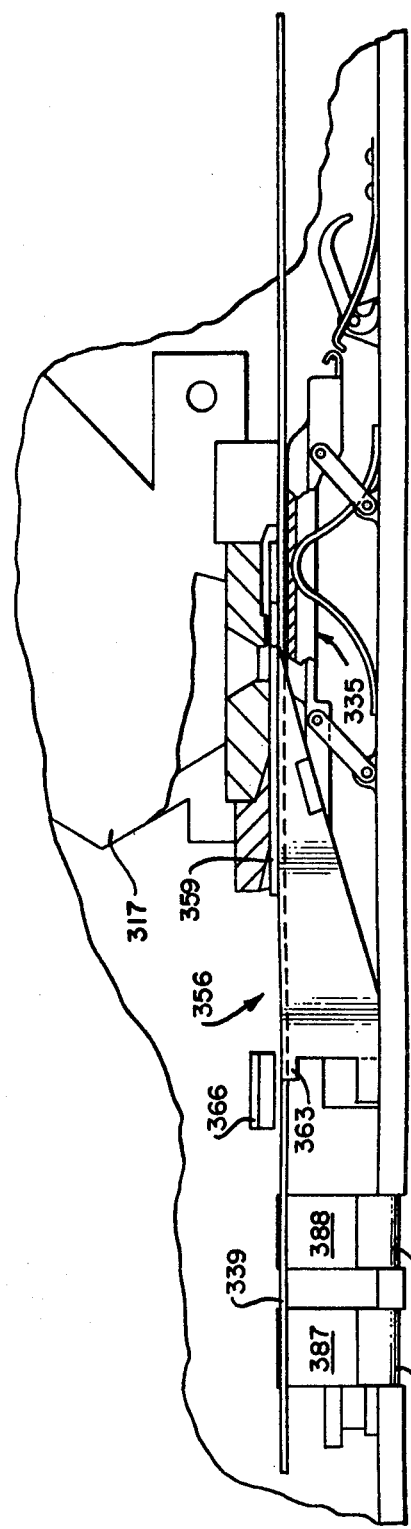

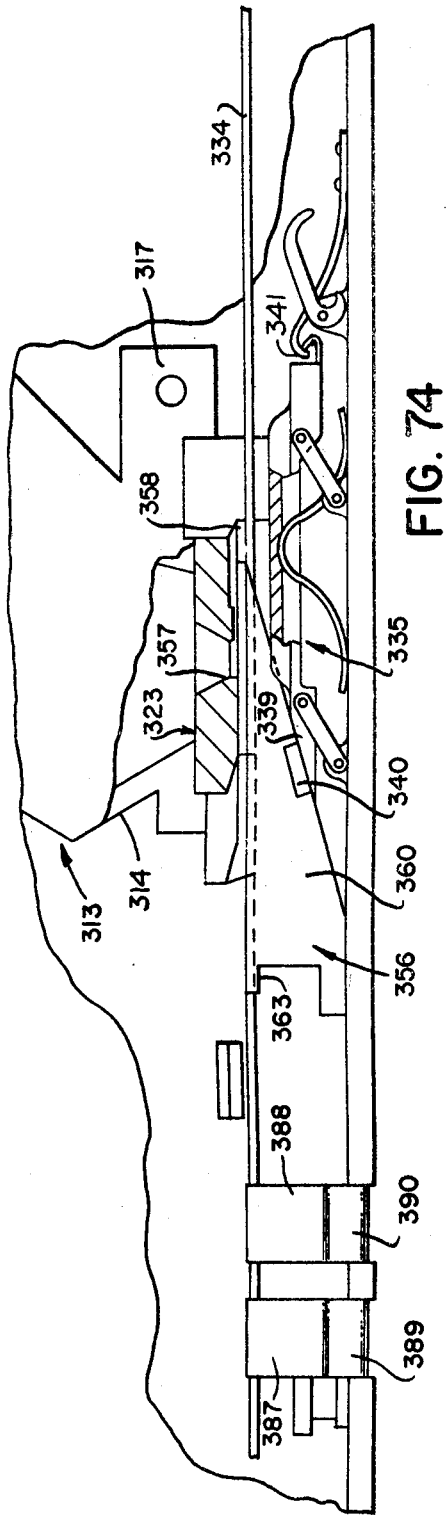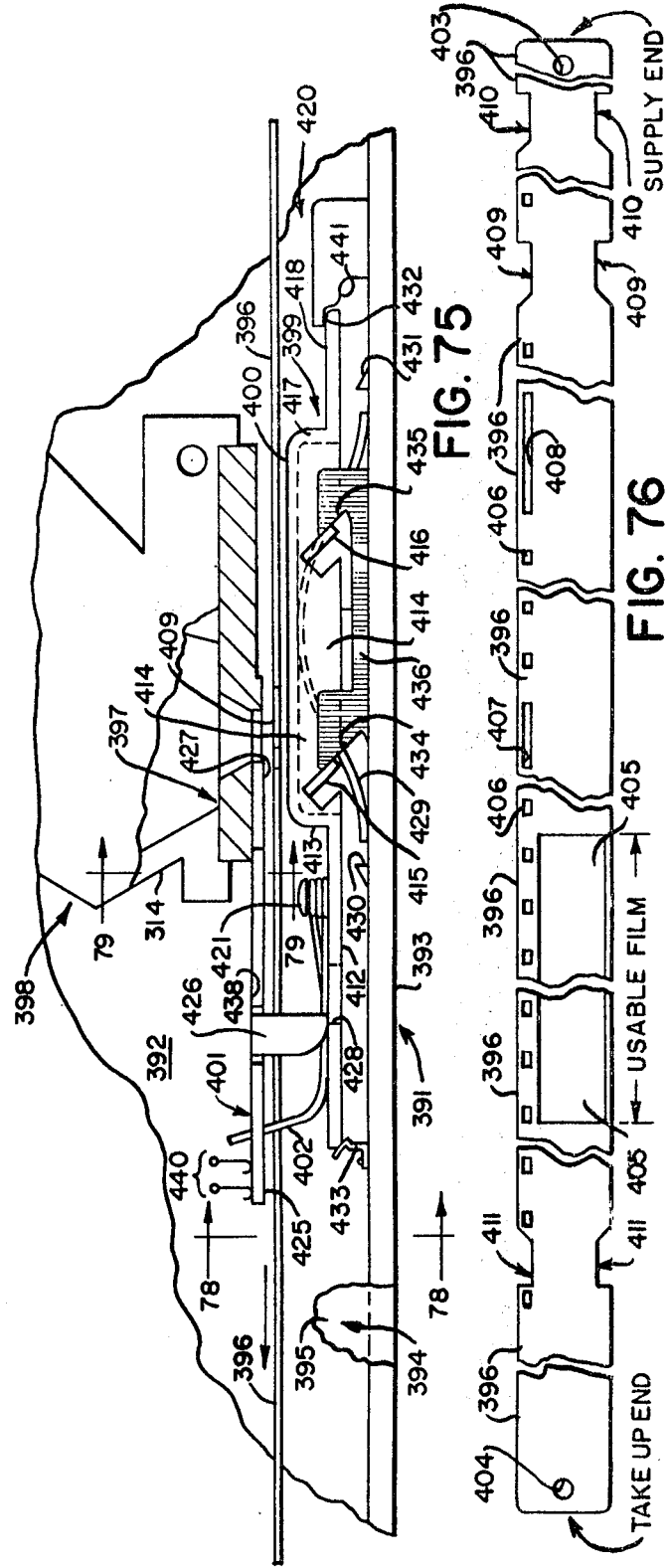

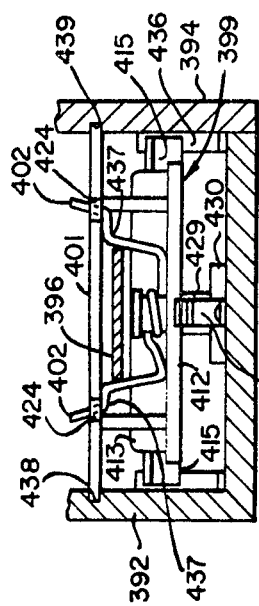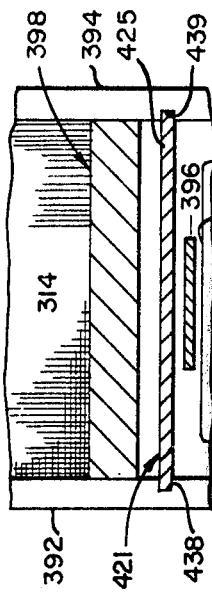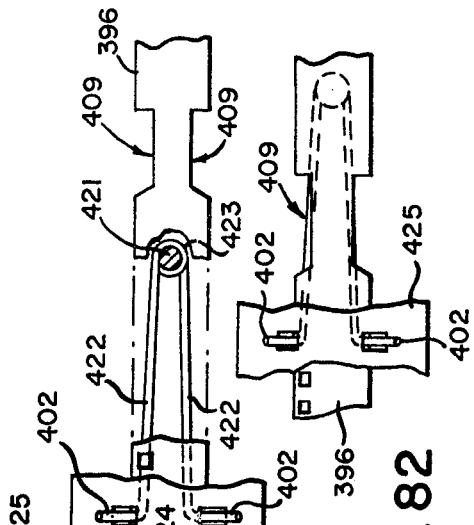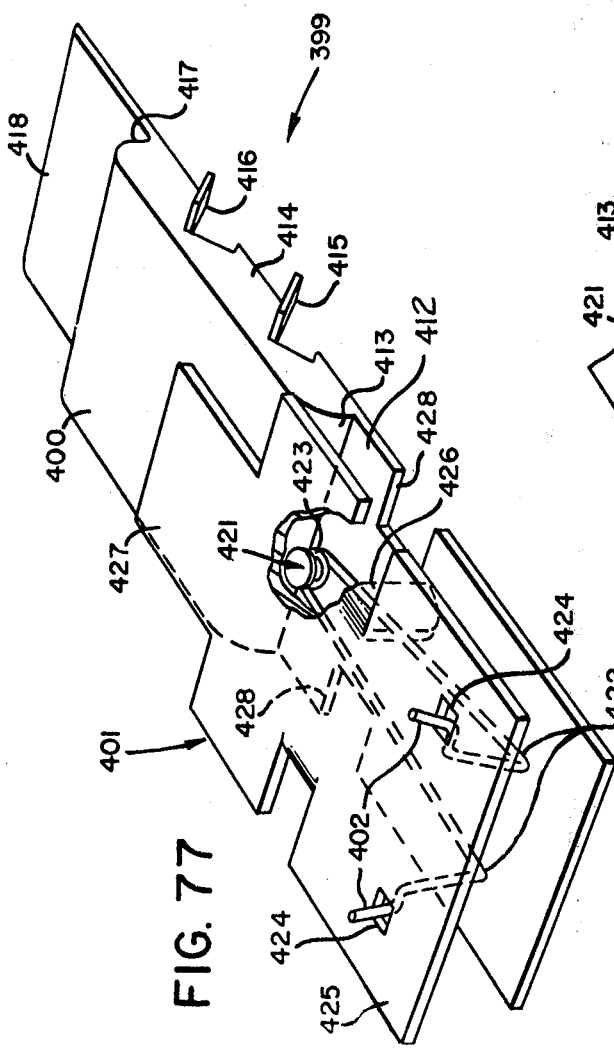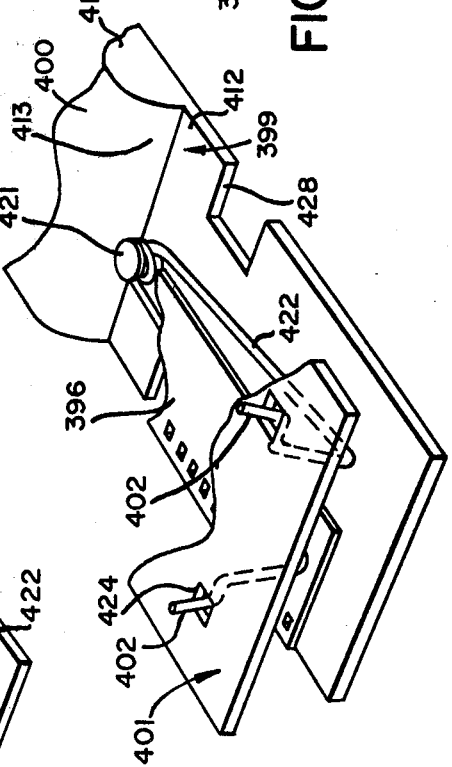

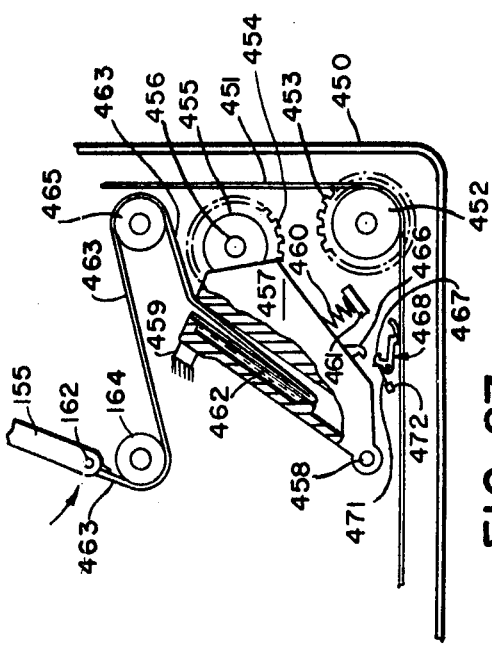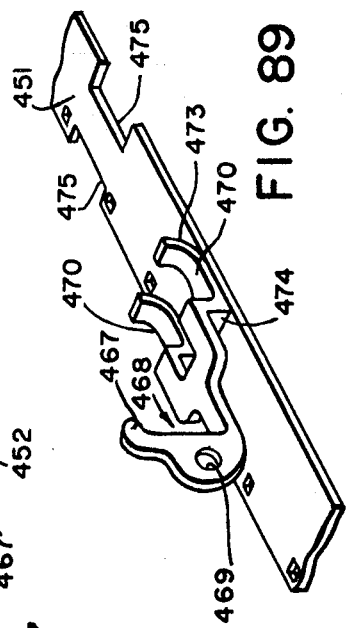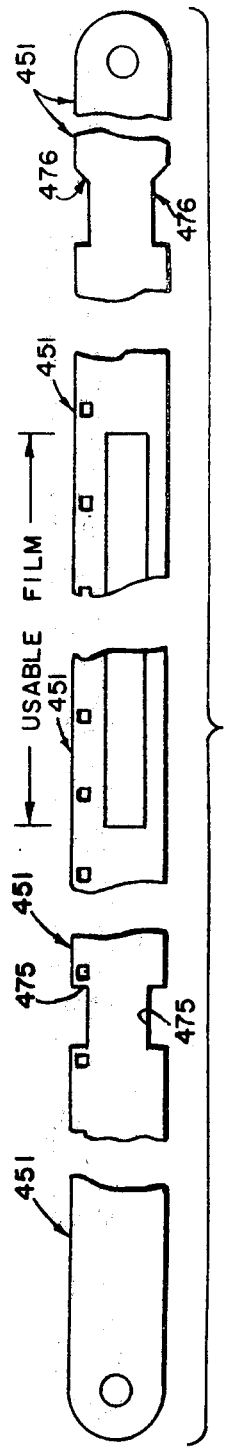

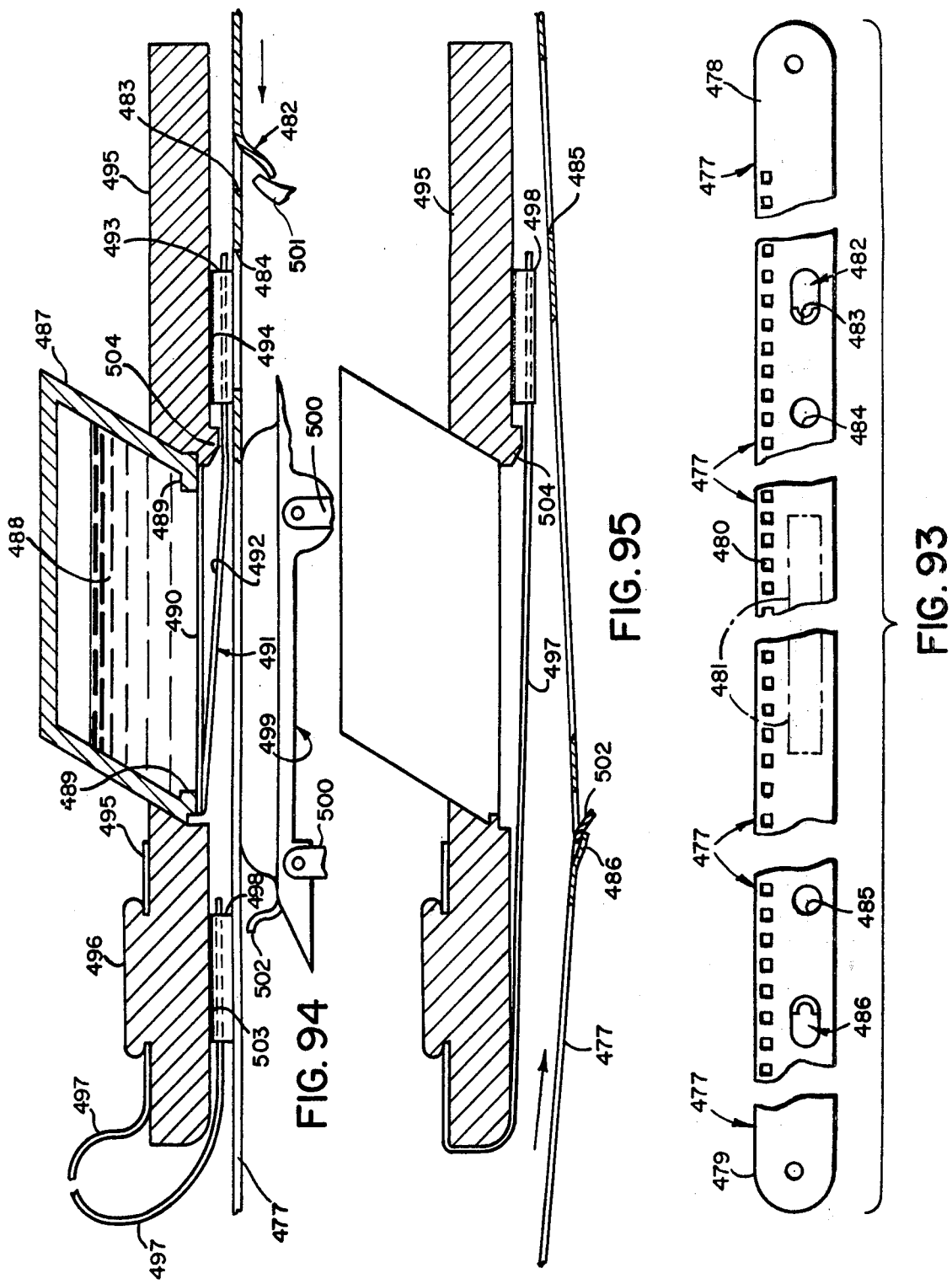

PHOTOGRAPHIC PROJECTING STRIP FILM IN A CASSETTE

This application is a division of my copending U.S. application patent Ser. No. 277,150, filed on Feb. 17, 1972, now abandoned, for Photographic System and assigned to the assignee of this application.

My invention relates to photography, and particularly to a novel photographic system comprising a film cassette including an internally programmed self-contained processing system cooperating with a film drive and projection system controlled by the cassette to process, project and rewind film in the cassette.

A widely adopted advance in the photographic arts has been the introduction of simple and convenient photographic systems which combine the camera and darkroom traditionally associated with the art into a compact assembly with which either professional or amateur can produce gratifying photographic results within seconds after an exposure is made. In such apparatus, the camera accepts "film" which, in fact, comprises a package containing not only photosensitive material for forming a latent image in the camera, but photofinishing materials whereby a finished black and white or color print can be produced from the latent image immediately following exposure. it has thus become a simple matter to produce prints of excellent quality.

It would be highly desirable to extend this facility to the production of photographic transparencies for projection, and particularly to the production of motion pictures. One approach to this goal has been the development of film cassettes for use in the production of motion pictures, especially in the 8 mm format preferred by the amateur for reasons of economy and the inherent compactness of the equipment required to handle it. However, so far as I am aware, prior to my invention, attempts to produce a compact self-processing motion picture system have not resulted in a solution to those problems involved in the form of apparatus of sufficient reliability and convenience to be preferred over more traditional systems. An appreciation of some of the problems involved in arriving at a satisfactory approach may be gleaned from a brief consideration of the desiderata involved, and the obstacles in the path of their attainment.

At least in the present state of the art, certain constraints are essential to the construction of a convenient photographic system for the production of visible images from photographic transparencies. Of these, the choice of a relatively small film format is perhaps the most fundamental. That allows the production of a large number of images on a relatively small area of photosensitive material with an immediate advantage in bulk over larger formats. An attendant advantage is the ability to use small lenses of short focal length with relatively large effective apertures and considerable depth of field. On the other hand, production of a satisfactory image for viewing requires considerable enlargement, implying the use of a viewing screen that is large compared with any of the components previously described, together with a relatively powerful light source requiring a substantial source of energy.

It is clearly convenient to compartment this system into three components; namely, a camera, a viewing system, and cassettes of photosensitive material, the cassettes each including an amount of processing composition adequate to process the film contained therein, and being adapted for insertion in the camera, for exposure, and for cooperation with the viewing system, for projection after processing. It is also a relatively straightforward conclusion that the camera should be required only to expose the film.

However, the division of responsibility between the cassette and the viewing system is another matter, and the problems involved in that determination are those to which my invention is primarily directed. In particular, while the camera and viewing system are essentially permanent components of the photographic system, the cassette is a replaceable element. Thus it is tempting to assign to the cassette as little responsibility as possible for processing the film, other than to contain the necessary processing composition and a suitable applicator therefor. But efforts to develop cassettes and viewing systems along those lines have proven less than completely satisfactory, because it is necessary to exchange both energy and information with the cassette in order to sequence its contents through the steps necessary to transfer the coating composition, initially sealed in a container in the cassette, to the film. The result is a relatively cumbersome construction provided with entrance and exit connectors, playing no part in the viewing operation, through which the required exchanges of energy and information can be made.

My invention results from efforts focused on the problem from a different point of view, from which the cassette is seen as the source of intelligence for directing both the processing operation which takes place within the cassette, and operations of the viewing system. When that approach is taken, the viewing system is required to operate in either of two modes, as directed by the cassette, but in either mode of operation is required to supply to the cassette only the energy necessary for that manipulation of the film inherently required whether the film is processed within the cassette or elsewhere. The objects of my invention are to reduce the weight and size of apparatus for the production and viewing of transparencies, while facilitating the use of such apparatus, and improving its reliability.

Briefly, the above and other objects of my invention are attained by a photographic system, constructed on the lines outlined above, which includes replaceable film cassettes. Each cassette contains a roll of film, connected at its ends to supply and take-up reels journalled for rotation in an opaque housing, and passing therebetween through a film gate formed in the housing for cooperation with a camera and a projection system. As supplied to the user, the film in the cassette is initially unexposed, and is disposed substantially on the supply reel. A film processing system is located within the cassette, and initially comprises a sealed container of processing composition, together with means for releasing the composition, and coating apparatus for applying the released composition in a uniform coat to the film.

A cassette in accordance with my invention further comprises programming apparatus responsive to manipulation of the supply and take-up reels to sequence the processing system through a cycle of operations during which the processing composition is released and coated on the film. A signal generator is provided that automatically produces an electrical signal, in response to operation of the processing system, serving to select the mode of operation of a film drive and projection system adapted to cooperate with the cassette. In accordance with the particular embodiment of my invention to be described, the signal generator comprises an element forming a part of the processing system that is moved to a unique position at the end of the processing cycle in which it thereafter remains, and in which it provides a signal indicating that the film has been processed.

In accordance with the preferred embodiment of my invention, the processing system within the cassette is programmed by singularities formed on the film strip that engage actuating elements in the housing to provide both information signals and process control energy for sequencing the processing system through a cycle of operation in response to manipulation of the supply and take-up reels by the film drive and projection system.

Another feature of the preferred embodiment of my invention is an initially sealed container of processing fluid which comprises a receptacle open at one side, containing processing composition, and enclosed on the open side by one end of a strip of flexible material sealed thereto. The flexible sealing strip extends to a connection with an actuating element that is movable to detach at least a portion of the sealing end of the strip, and thereby release the processing composition. A specific feature of a particular embodiment of my invention is the provision of a weakened region on the flexible strip that is readily torn upon the application of force to the strip, and thereby facilitates detachment of the strip from the receptacle containing the processing composition.

Still another feature of a specific and presently preferred embodiment of my invention is the provision of a process operating cycle in which the processing apparatus is caused to engage the film, prior to the release of the film processing composition, as the film is transported in one direction, and in which the processing composition is subsequently released to coat the film upon movement of the film in an opposite direction.

The system of my invention comprises a film drive and projection system including drive apparatus for the supply and take-up reels in the cassette, together with cylic sequential drive control means. The drive control means are effective upon the application of an operation initiating signal to cause the drive apparatus to first advance the film onto the take-up reel, and thereafter to rewind it onto the supply reel. The drive control apparatus then awaits a further signal before proceeding to repeat this cycle.

The mode control signal, referred to above, that is provided by the cassette, selects one of two modes of operation for the film drive and projection system. In a first mode of operation, carried out when a cassette containing unprocessed film is inserted into the film drive and projection system, the system provides a lighttight environment for the film in the casseette while the drive apparatus is carried through one cycle as described above. The film drive and projection apparatus is provided with a light source, for directing light through a portion of film exposed in the film gate of the cassette toward a projection aperture. In the projection aperture there is mounted a lens through which an image of the light transmitted through the film is focused on a suitable viewing screen.

The projection aperture is provided with a shutter. During operation of the system in response to a cassette containing unprocessed film in the manner just described, the shutter is closed and the light extinguished to provide the desired lighttight environment.

Following processing, the drive cycle is repeated, but with the light on and the shutter open during film advance of the takeup reel, so that the film just processed is projected. After projection, the film is rewound.

When a cassette containing previously processed film is inserted into the film drive and projection system, a second mode of operation is caused to occur. In that mode, the film drive apparatus operates through only one cycle, during at least the projection portion of which the lamp is energized and the shutter is open, so that the film is projected, and then rewound for storage and later reuse.

The above and other features of my invention, together with the manner in which the components of the system of my invention are constructed, and their mode of operation in the system, will best be understood in the light of the following detailed description, together with the accompanying drawings, of various illustrative embodiments thereof.

In the drawings,

FIG. 1 is a fragmentary schematic plan sketch of a strip of film used in the system of my invention in accordance with one embodiment thereof;

FIG. 2 is a schematic fragmentary plan sketch of a portion of the film shown in FIG. 1, on an enlarged scale;

FIG. 3a is a schematic fragmentary cross-sectional elevation of a portion of the film of FIG. 2, taken substantially along the lines 3—3 in FIG. 2, and illustrating the cooperation of the film with a camera drive pawl;

FIG. 3b is a schematic fragmentary elevational cross-sectional view, taken substantially along the lines 3—3 in FIG. 2, and showing the cooperation of a portion of the film of FIG. 2 with a projector pawl;

FIG. 4a is a schematic cross-sectional elevational view, taken substantially along the lines 4a—4a in FIG. 1, showing a portion of the film of FIG. 1 comprising a film singularity used in programming and energizing the processor;

FIG. 4b is a schematic fragmentary perspective sketch illustrating a modified film singularity in association with a cooperative actuating element;

FIG. 4c is a schematic perspective sketch of a fragment of film modified to incorporate another form of singularity, and shown in association with an actuating element cooperative therewith;

FIG. 5 is a schematic cross-sectional view, with parts shown in cross section and parts broken away, illustrating the manner in which the trailer portion of the film of FIG. 1 is connected to and wound about a storage spool;

FIG. 9 is a schematic plan sketch, with parts omitted, parts shown in cross section, and parts broken away, of film processing means forming a portion of the cassette of FIG. 6;

FIGS. 10–12 are fragmentary schematic plan sketches, with parts omitted, parts broken away, and parts shown in cross section, illustrating the sequence of operation of the apparatus of FIG. 9;

FIG. 13 is a schematic fragmentary plan sketch, with parts omitted, parts broken away, and parts shown in cross section, showing a portion of the apparatus of FIGS. 6 and 9 in more detail and on an enlarged scale;

FIG. 14 is a schematic perspective sketch, with parts omitted and parts broken away, of an actuator assembly forming a portion of the apparatus of FIGS. 6 and 13;

FIG. 15 is a schematic elevational view, taken substantially along the lines 15—15 in FIG. 14, showing a portion of the actuator assembly of FIG. 14 in its association with a portion of the film strip shown in FIG. 13 at different stages of manipulation of the film;

Figure 6:
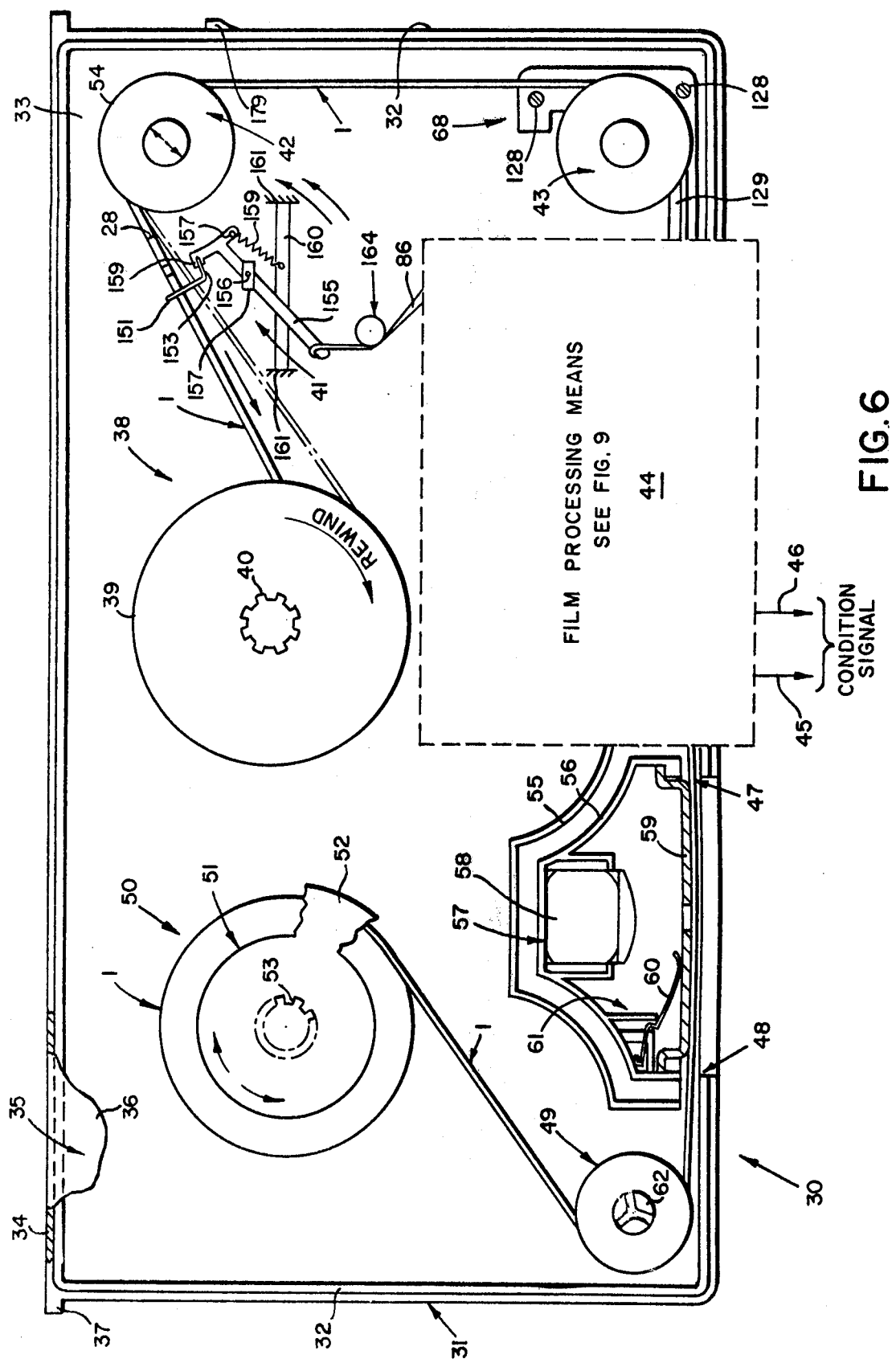
FIG. 6 is a schematic fragmentary plan sketch, with parts omitted, parts shown in cross-section, parts broken away, and parts shown in block form, of a film cassette in accordance with a first embodiment of my invention.
Figure 44:
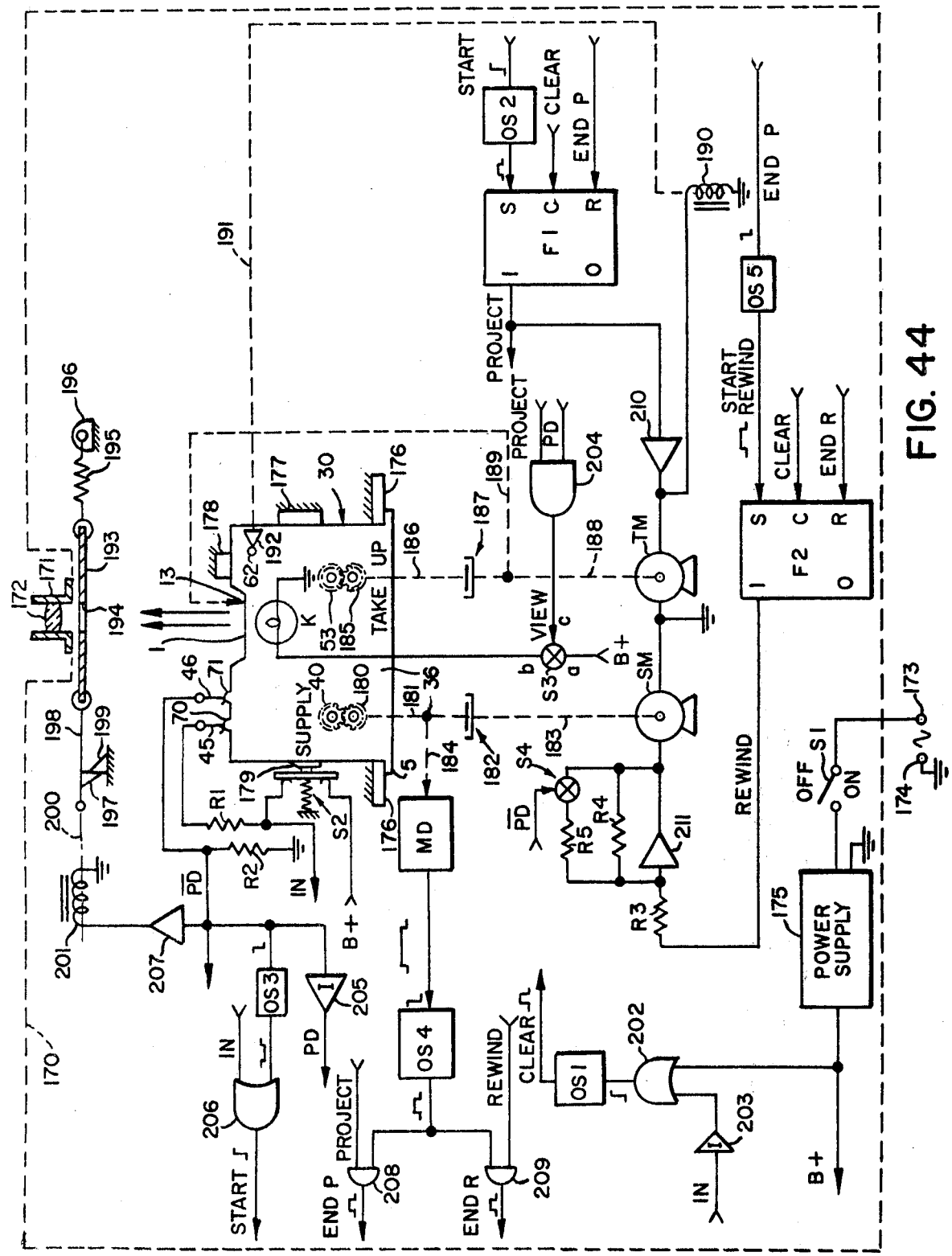
Figure 45:
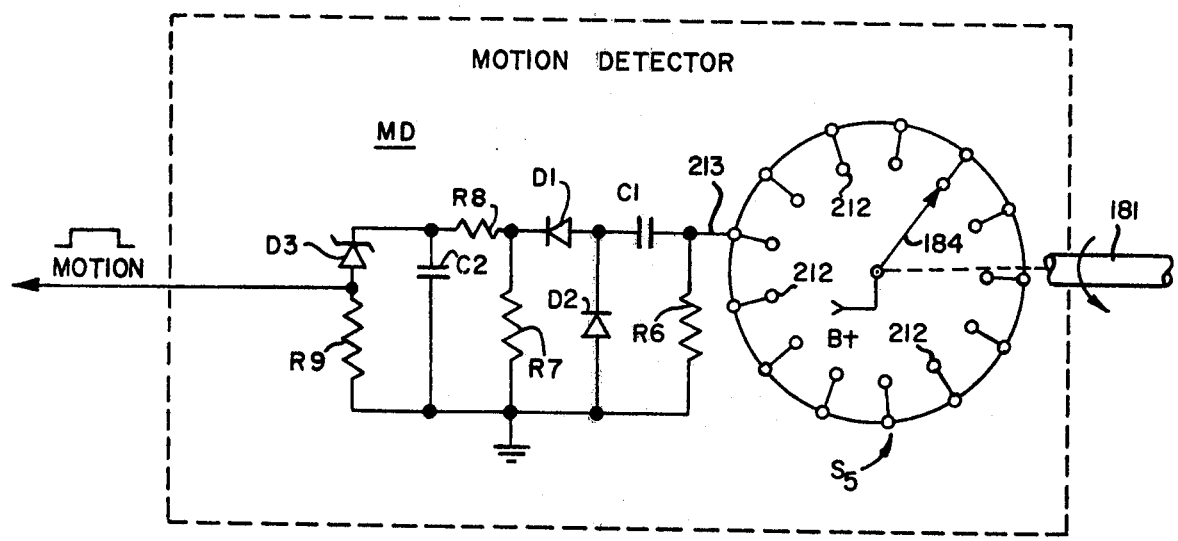
Figure 50:
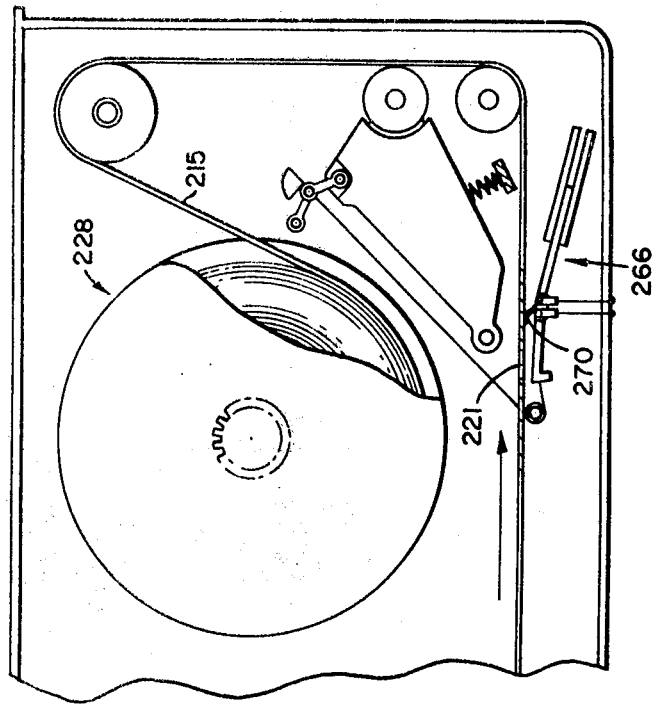
Figure 49:
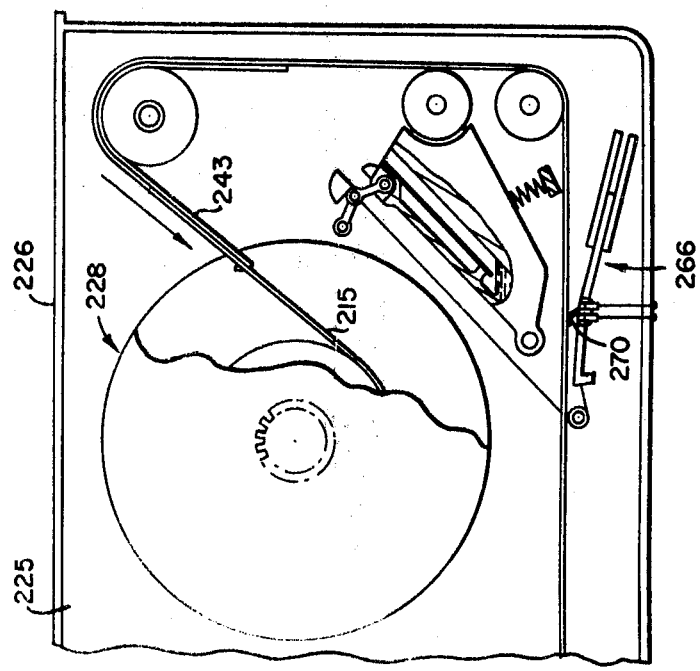
Figure 54:
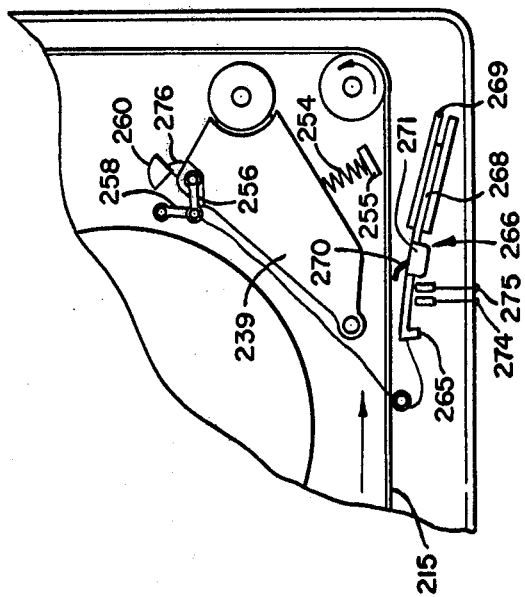
Figure 53:
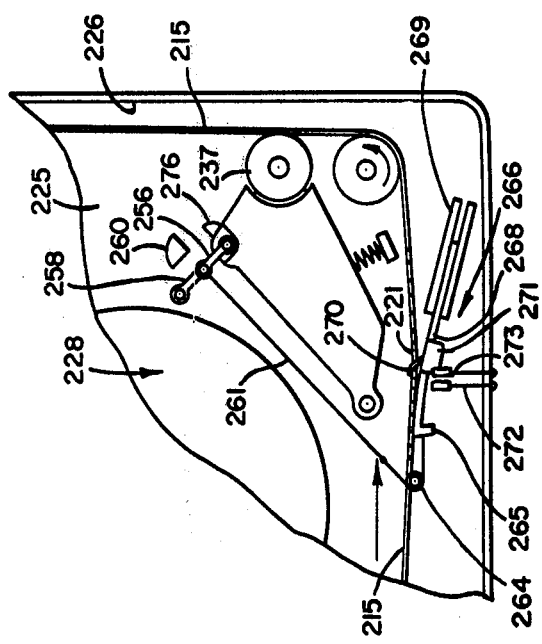
Figure 69:
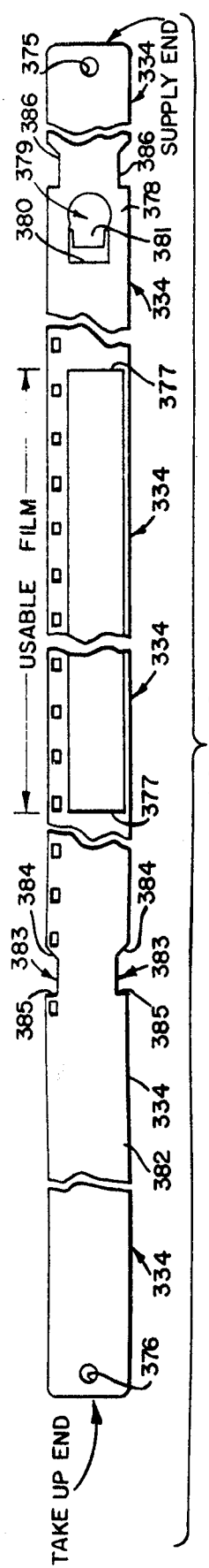
Figure 83:
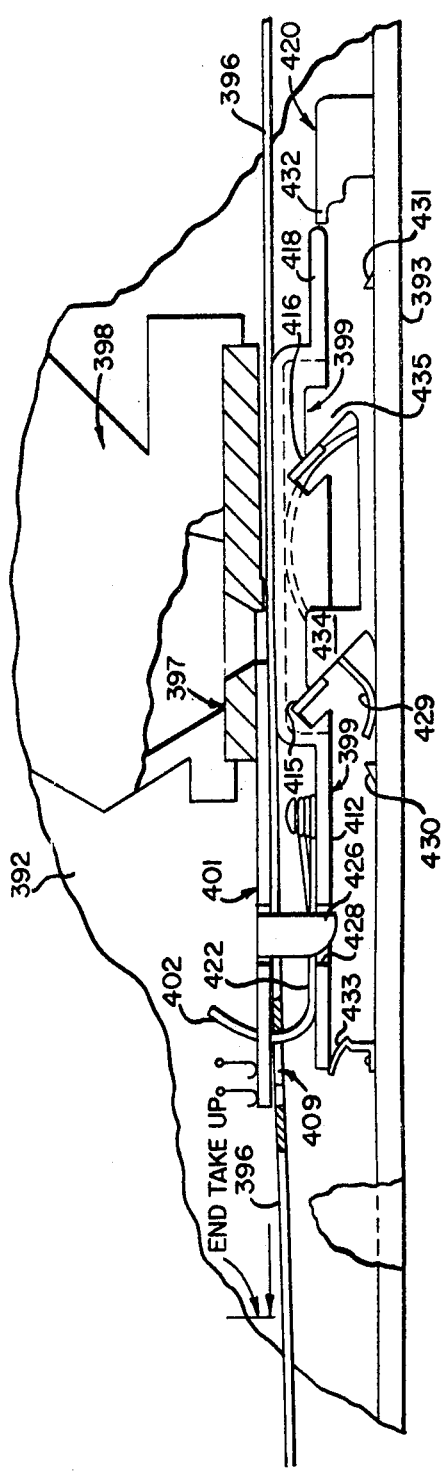
Figure 85:
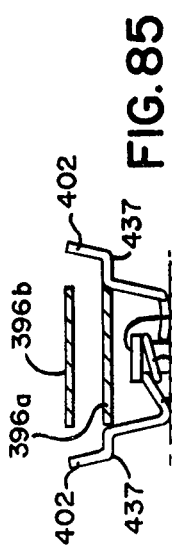
Figure 84:
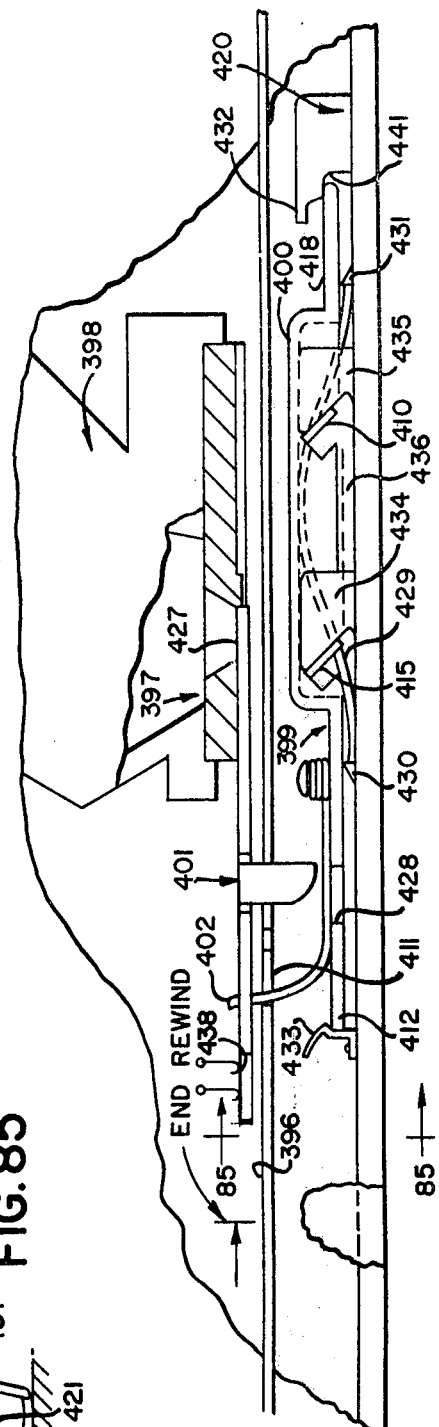
Figure 86:
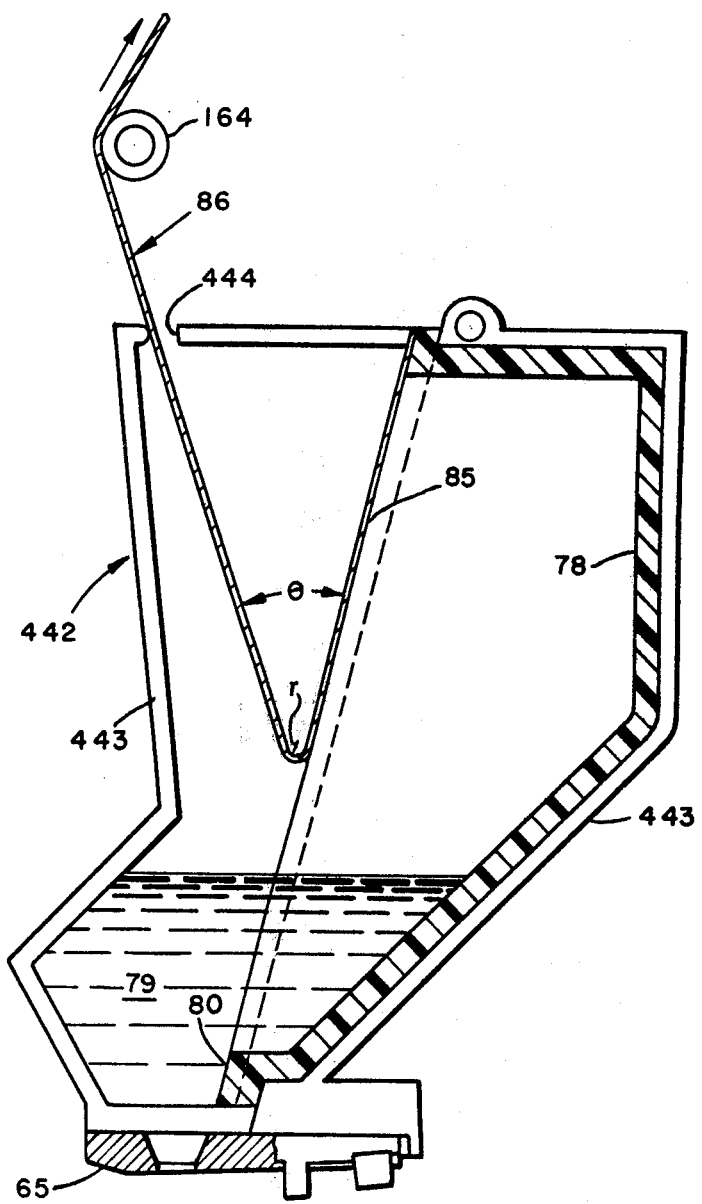
Figure 92:
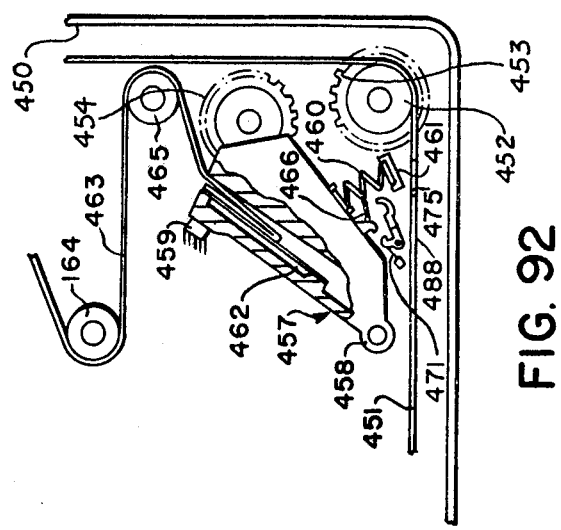
Figure 91:
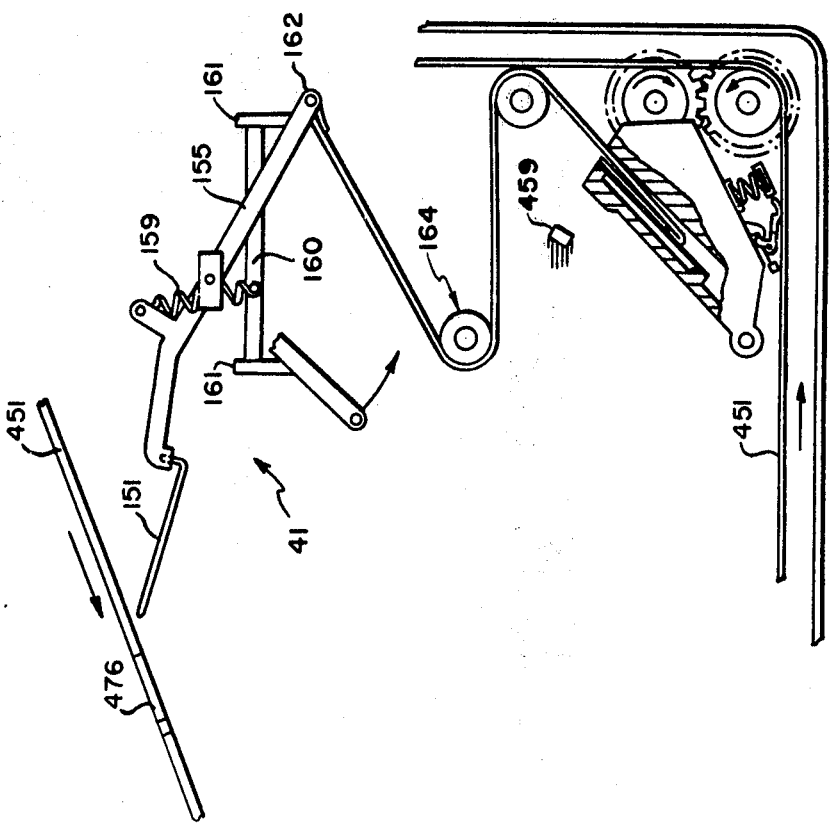

FIGS. 16a and 16b comprise schematic fragmentary plan sketches, with parts shown in cross section and parts broken away, illustrating the cooperation between a modified singularity forming a part of the film strip shown in FIGS. 1 and 13 with the actuating assembly best shown in FIG. 14;

FIGS. 17–21 comprise schematic fragmentary plan sketches, with parts omitted, parts shown in cross section, and parts broken away, illustrating further operations in the processing sequence carried out by the apparatus of FIG. 9;

FIG. 22 is a schematic plan view of a portion of the processing apparatus of FIG. 9, with parts broken away, comprising a combined pressure pad deflection cam and nozzle closure plate shown in its cooperative association with a portion of a coating nozzle;

FIG. 23 is an elevational view of the apparatus of FIG. 22, with the nozzle portions omitted, taken substantially along the lines 23—23 in FIG. 22;

FIG. 24 is a schematic end view of the apparatus of FIG. 23, taken substantially along the lines 24—24 in FIG. 23;

FIG. 25 is a schematic fragmentary cross-sectional view of the apparatus of FIG. 24, taken substantially along the lines 25—25 in FIG. 24;

FIG. 26 is a schematic plan view of a pressure pad comprising a portion of the apparatus of FIG. 9;

FIG. 27 is a schematic cross-sectional view of the pressure pad of FIG. 26, taken substantially along the lines 27—27 in FIG. 26;

FIG. 28 is a schematic fragmentary elevational view of a portion of the apparatus of FIG. 26, taken substantially along the lines 28—28 of FIG. 26;

FIG. 29 is a fragmentary end view of a portion of the apparatus of FIG. 26, taken substantially along the lines 29—29 in FIG. 26;

FIG. 30 is a schematic cross-sectional end view of a portion of the apparatus of FIG. 26, taken substantially along the lines 30—30 in FIG. 26;

FIG. 31 is a schematic plan view of a coating nozzle forming a part of the apparatus of FIG. 9;

FIG. 32 is a schematic cross-sectional view of the nozzle of FIG. 31, taken substantially along the lines 32—32 of FIG. 31;

FIG. 33 is a schematic end view of the nozzle of FIG. 31, taken substantially along the lines 33—33 of FIG. 31;

FIG. 34 is a fragmentary elevational view of a portion of the nozzle of FIG. 31, taken substantially along the lines 34—34 of FIG. 31;

FIG. 35 is a plan view of the other side of the apparatus of FIG. 31;

FIG. 36 is a fragmentary schematic elevational sketch, with parts shown in cross section, illustrating the construction of a contact element forming a part of the signal generator of the apparatus of FIG. 9, shown in association with housing parts with which it cooperates;

FIG. 37 is a schematic plan view of a receptacle forming a part of the apparatus of FIG. 9;

FIG. 38 is a schematic cross sectional view of the apparatus of FIG. 37, taken substantially along the lines 38—38 in FIG. 37 and showing in addition the cooperation of the receptacle with wall members forming a part of the apparatus of FIG. 9;

FIG. 39 is a cross sectional view of the apparatus of FIG. 37, taken substantially along the lines 39—39 in FIG. 37;

FIG. 40 is a schematic plan view of a spring forming a part of the apparatus of FIGS. 6 and 9;

FIG. 41 is an elevational view of the apparatus of FIG. 40, taken substantially along the lines 41—41 in FIG. 40;

FIG. 42 is a schematic fragmentary perspective sketch illustrating a sealed container and tear tab construction, suitable for use in the apparatus of FIG. 9;

FIG. 43 is a schematic fragmentary perspective sketch of a modified form of the apparatus of FIG. 42;

FIG. 44 is a schematic block and wiring diagram, illustrating the system of my invention incorporating a cassette in association with film drive and projection apparatus;

FIG. 45 is a schematic wiring diagram of a motion detector forming a part of the apparatus of FIG. 44;

FIG. 46 is a fragmentary schematic plan sketch, with parts broken away, of a strip of film usable in a second embodiment of my invention;

FIG. 47 is a fragmentary schematic plan sketch, with parts omitted, parts broken away, and parts shown in cross section, of a modified form of processing apparatus in accordance with my invention;

FIGS. 48, 49 and 50 are fragmentary schematic plan sketches, with parts omitted, parts shown in cross section, and parts broken away, showing the apparatus of FIG. 47 in various positions assumed during its cycle of operation;

FIG. 51 is a fragmentary schematic perspective sketch showing a portion of the apparatus of FIG. 47 in association with a fragment of the film cooperating therewith;

FIG. 52 is a schematic fragmentary elevational sketch, with parts omitted, parts shown in cross section, and parts broken away, showing on an enlarged scale a portion of the process apparatus actuating assembly of the apparatus of FIG. 47;

FIGS. 53 and 54 are fragmentary schematic plan sketches, with parts omitted, parts broken away, and parts shown in cross section, of the apparatus of FIG. 47, illustrating further steps in its cycle of operation;

FIG. 55 is a fragmentary schematic cross-sectional sketch illustrating the construction of a roller forming a portion of the apparatus of FIGS. 6, 9 and 47;

FIG. 56 is a schematic diagram illustrating a drying system that may be employed with the apparatus of FIGS. 6, 9 and 47;

FIG. 57 is a fragmentary schematic elevational view, with parts omitted, parts broken away, and parts shown in cross section, of another modification of the processing system of my invention;

FIG. 58 is a fragmentary schematic plan sketch, with parts omitted, parts broken away, and parts shown in cross section, of another modification of a film processing station in accordance with my invention;

FIG. 59 is a fragmentary cross-sectional view, taken substantially along the lines 59—59 in FIG. 58, showing a portion of the apparatus of FIG. 58;

FIG. 60 is a schematic perspective sketch of a pressure pad assembly forming a part of the apparatus of FIGS. 58 and 59;

FIG. 61 is a schematic perspective sketch of a spring forming a part of the apparatus of FIG. 58;

FIG. 62 is a schematic perspective sketch of a latching mechanism forming a part of the apparatus of FIG. 58;

FIG. 63 is a schematic perspective sketch of a combined pressure pad depressing and nozzle closure plate assembly forming a part of the apparatus of FIG. 58;

FIG. 64 is a diagrammatic fragmentary schematic elevational sketch, taken substantially along the lines 64—64 in FIG. 58, with parts omitted, parts shown in cross-section, and parts broken away;

FIG. 65 is a schematic fragmentary cross-sectional view of the apparatus of FIG. 64, taken substantially along the lines 65—65 in FIG. 64, with parts omitted and parts broken away;

FIG. 66 is a schematic end view of a portion of the apparatus of FIG. 64, taken substantially along the lines 66—66 in FIG. 64;

FIG. 67 is a fragmentary schematic plan sketch illustrating the cooperation of the apparatus of FIG. 63 in combination with a fragment of the film used in conjunction therewith;

FIG. 68 is a diagrammatic sketch showing the elements of FIG. 67 in a second position;

FIG. 69 is a fragmentary schematic plan sketch, with parts broken away, of a strip of film usable in the apparatus of FIG. 58;

FIGS. 70, 71, 72, 73 and 74 comprise fragmentary schematic plan views, with parts omitted, parts broken away, and parts shown in cross section, illustrating the operation of the apparatus of FIG. 58 in various positions assumed during its cycle of operation;

FIG. 75 is a fragmentary schematic plan sketch, with parts omitted, parts broken away, and parts shown in cross section, illustrating another modification of the processing apparatus of my invention;

FIG. 76 is a schematic plan view of a strip of film modified for use with the apparatus of FIG. 75;

FIG. 77 is a schematic perspective sketch of a portion of the apparatus of FIG. 75;

FIG. 78 is a schematic cross-sectional view of a portion of the apparatus of FIG. 75, with parts omitted and parts broken away, taken substantially along the lines 78—78 in FIG. 75;

FIG. 79 is a schematic cross-sectional view of another portion of the apparatus of FIG. 75, with parts omitted and parts broken away, taken substantially along the lines 79—79 in FIG. 75;

FIG. 80 is a fragmentary schematic perspective sketch of a portion of the apparatus of FIG. 75, taken from another point of view and with parts broken away, and showing a fragment of the film strip to illustrate its cooperation with the apparatus shown;

FIG. 81 is a fragmentary schematic plan view, with parts omitted and parts broken away, of a portion of the apparatus of FIG. 80;

FIG. 82 is a fragmentary schematic plan view, with parts omitted and parts broken away, showing the apparatus of FIG. 81 in another relative position of the parts;

FIGS. 83 and 84 are fragmentary schematic plan views, with parts omitted, parts shown in cross section, and parts broken away, illustrating the relative position of certain other parts of the apparatus of FIG. 75 during various stages of the operation of the apparatus;

FIG. 85 is a schematic end view of a portion of the apparatus of FIG. 75, illustrating the cooperation between the film strip and a pair of film engaging arms forming a part of that apparatus;

FIG. 86 is a fragmentary schematic plan sketch, with parts shown in cross section, parts broken away, and parts omitted, illustrating a modified form of process composition release mechanism in accordance with another embodiment of my invention;

FIG. 87 is a fragmentary schematic plan sketch, with parts omitted, parts shown in cross section and parts broken away, illustrating a normally disengaged reverse roll coater in accordance with another embodiment of my invention;

FIG. 88 comprises a fragmentary schematic plan sketch, with parts omitted, parts shown in cross-section, and parts broken away, illustrating the apparatus of FIG. 87 in another position assumed during its operation;

FIG. 89 is a fragmentary schematic perspective sketch of a hook forming a portion of the apparatus of FIG. 87 in association with the film and a singularity thereon;

FIG. 90 is a fragmentary schematic plan view, with parts broken away, of a film strip suitable for use with the apparatus of FIGS. 87 and 88;

FIG. 91 is a fragmentary schematic plan sketch, with parts omitted, parts shown in cross section, and parts broken away, illustrating the tear tab release mechanism of the apparatus of FIG. 87 in more detail, and showing the parts in another position;

FIG. 92 is a schematic fragmentary plan view, with parts omitted, parts broken away, and parts shown in cross-section, illustrating the operation of the apparatus of FIG. 87 in its final position;

FIG. 93 is a schematic fragmentary plan sketch of a film strip adapted for use in another modification of my invention;

FIG. 94 is a fragmentary schematic plan sketch, with parts shown in cross-section, parts omitted, and parts broken away, illustrating a film processing station adapted to cooperate with the film strip of FIG. 93 in accordance with another embodiment of my invention; and FIG. 95 is a sketch of a portion of the apparatus of FIG. 94 illustrating the parts in another position assumed in the operation of the illustrated processing station.

The photographic system of my invention preferably makes use of a photofinishing process in which a strip of film, following exposure in the camera, is contacted with a single processing composition to form a finished transparency from the latent image or images formed on the film during its exposure. The physical construction of such film, the nature of the photosensitive coating thereon, and suitable processing compositions therefor, will next be discussed in connection with FIG. 1.

Referring to FIG. 1, I have shown a film strip generally designated 1, which comprises a leader 2 terminating at an end formed with an aperture such as 3. The aperture 3 serves to connect that end of the film to a takeup reel to be described.

Behind the leader, which may be in the neighborhood of 18 inches in length, there is a strip 4 of photographically useful film, upon which projectable images may be formed. The strip 4, may be, for example, approximately 52 feet in length for 8 mm film.

Following the photographically useful portion of the film is a trailer region generally designated 5. The trailer 5 terminates at another end formed with an aperture 6 by means of which that end of the film is adapted to be connected to a supply reel, to be described.

The film 1 may comprise a base of any suitable transparent material of the kind conventionally used for film bases. On this base is applied, at least over the central portion of the photographically usable length of the film 4, an emulsion comprising a photosensitive coating, whereon a series of latent images illustrated by a series extending from a first frame 7 to a last frame 8 may be formed with a camera. The photosensitvie coating is preferably of one of the forms, next to be described, which can subsequently be processed to form a projectable image on the film base.

Photosensitive coatings usable in the practice of my invention may be of any conventional variety adapted to be developed by a monobath processing composition to form a positive transparency suitable for projection. In particular, a currently preferred embodiment of my invention makes use of a film structure, which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

In typical silver transfer reversal processes for the projection of black and white images, a silver halide developer and a silver halide solvent are applied in an aqueous alkaline solution to a photoexposed silver halide emulsion stratum, where they develop exposed silver halide to silver, and react with unreduced silver halide to form a soluble silver complex. This complex, in order to form a positive print, is transferred and reduced to silver on a silver-receptive stratum upon which the silver halide stratum has been superposed.

In one practice, in the completion of this process, the silver-receptive and silver halide strata have been separated in order to render the positive print visible. However, as indicated above, the positive print may be rendered visible without separation of the silver halide and the silver-receptive strata. For example, the silver-receptive stratum may be so constructed as to provide an unusually vigorous silver precipitating environment which causes the silver deposited upon it, in comparison with silver developed in the silver halide stratum, to possess very high covering power, i.e., opacity for a given mass of reduced silver. If the silver halide is in such a concentration as to give rise only when fully developed to a predetermined low maximum density, and if the silver complex is reduced to silver in a vigorous silver precipitating environment, the resulting negative and positive prints in superposition provide a composite print that presents a good image for projection purposes so long as they are contained on a transparent support. Since the silver halide stratum and the silver-receptive stratum need not be separated, an overall simplification of the silver transfer reversal process is achieved.

A composite film assembly of this type, as well as processing compositions for producing a fully developed black and white image without the necessity of removing the developed negative image after processing, are shown in prior U.S. Pat. No. 2,861,885 to Edwin H. Land, which issued on Nov. 25, 1958 for Photographic Processes And Products. Other composite film assemblies capable of producing developed full color images without the necessity of removing the developed emulsion are shown in prior patents of Edwin H. Land, U.S. Pat. Nos. 2,726,154, issued Dec. 6, 1955 for Photographic Product, and 2,944,894, issued July 12, 1960 for Photographic Processes Utilizing Screen Members.

It should be noted that my invention is not directed to the chemistry by which images are developed in a photosensitive emulsion and transferred to an image receiving strata. However, in the practice of my invention, whether the film employed is black and white or color film, at the present time the preferred embodiment of my invention employs film of a type not requiring the removal of a negative emulsion after it is developed.

Referring again to FIG. 1, the film 1 is formed along one edge with sprocket holes such as 9 at regular intervals adapted to cooperate with a drive pawl, in a manner to be described, in either camera or projector, for incremental advancement of the film. As best shown in FIG. 2, which illustrates an expanded portion 5a of the trailer 5 of the film, the series of sprocket holes 9 adjacent the trailing end of the film may be interrupted by a first elongated sprocket hole 10. This elongated hole 10 may span, for example, two of the sprocket holes 9.

Further along the film in the direction of the supply reel end, the series of sprocket holes 9 is again interrupted by a second elongated sprocket hole 11, longer than the sprocket hole 10, and, for example, spanning three of the sprocket holes 9. As will appear, the first elongated sprocket hole 10 establishes an exposure end point in the camera, whereas the second sprocket hole 11 determines a film takeup termination point in the film drive and projection apparatus to be described. FIGS. 3a and 3b illustrate the manner in which these termination points are established.

Referring first to FIG. 3a, I have shown a fragment of the trailer portion 5 of the film 1 including the elongated sprocket hole 10, and have shown in conjunction therewith a camera film advance pawl 12 in a first position in which it engages one of the sprocket holes 9 in a conventional manner to drive the film forward by one frame length. Toward the end of this advance stroke, as is conventional, the pawl 12 is cammed down out of engagement with the film.

As shown in the second position of the pawl 12, when it engages the elongated aperture 10, the camming down movement occurs before the film engages the leading edge of the elongated hole 10, and therefore the pawl may cycle repeatedly without further advance of the film. This serves to effect a termination of film advance for the purposes of exposure just beyond the region of photographically useful emulsion, to alert the photographer, by the somewhat different sound produced when the pawl skips the film, that his cassette should be replaced, and to effect proper sequencing of the processing system of my invention, to be described.

Referring now to FIG. 3b, for use in the system of my invention, it is preferred that the film drive and projection system be provided with a double pawl 13 comprising a leading pawl 14 and a trailing pawl 15, each of which may be of the same shape as the pawl 12 in FIG. 3a. As shown in the left-hand portion of FIG. 3b, when the first elongated aperture 10 is encountered, the leading pawl 14 serves to engage the leading edge of the aperture 10 to cause the film to be advanced without interruption. For normally spaced sprocket holes 9, both of the pawls 14 and 15 engage the film in sequential sprocket holes. However, when the second elongated sprocket hole 11 is encountered, the pawl 13 will pass through it without film engagement, and thereby terminate film advance in the same manner as did the single pawl 12 upon engagement of the double length sprocket hole 10.

Formed on the trailing end 5 of the film 1 beyond the advance termination portion 5a just described in the direction of the supply reel end of the film 1, is a singularity generally designated 16 comprising a detent engaging element here shown as an aperture 17 formed in the film, adjacent which a projecting bump 18 is formed, as by pressure, heat and pressure, or the like. The singularity 16 thus comprises a hook adapted to engage a detent in the form of a process control actuating element, to be described, as the film is moved with respect to the detent engaging element in the direction of the takeup reel. FIG. 4a shows the presently preferred embodiment of this detent engaging element, whereas FIGS. 4b and 4c show variations which may be employed within the broader aspects of my invention if so desired.

Referring to FIG. 4b, another form of detent engaging element that may be provided in the film is in the form of an aperture 19, here shown as of circular shape, adapted to receive and engage a cooperating circular disc 20 formed on an actuating element schematically shown at 21. The unidirectional character of the detent engaging assembly of FIG. 4a will be apparent from inspection; the assembly of FIG. 4b is inherently bidirectional in character in that engagement of the aperture 19 with the projection 20 will effect movement of the actuating element 21 in that direction determined by the direction of movement of the film 1.

FIG. 4c shows another form of essentially unidirectional detent assembly. As there shown, the detent engaging element may comprise a rectangular projection 22, formed either as a bump in the film 1, or by adhesively securing a piece of film base material to the upper surface of the film 1, as by a suitable adhesive or the like. The element 22 is adapted to engage an actuating element in the form of a resilient detent 23, that will engage the projection 22 when it is encountered upon movement of the film 1 in a direction generally downwardly and to the left in FIG. 4c, but which is adapted to pass over the projection 22 without effective engagement should the film be moved in the other direction as the projection 22 passes under the engaging element 23.

The bump 9 forming a part of the detent engaging assembly 16 in FIG. 1 projects from the film, and might be deformed, or might cause pressure marks on other parts of the film, as it is wound on the reel. To avoid that result, I prefer to provide suitable pockets, here shown as a pair of recesses 24 and 25, formed in the trailing end 5 of the film, and spaced at suitable intervals with respect to the radius of the supply reel spool, to be described, to receive the projection 18 as the film is wound onto the reel. This provision allows the film to be evenly wound on the spool, without deformation of the bump, as shown in FIG. 5.

Referring to FIG. 5, I have schematically shown a spool 26 adapted to form a portion of a reel on which the film may be wound. To the periphery of the reel is attached the film strip 1, as by a fastener schematically indicated at 27 engaging the recess 6. As illustrated, the bump 18 forming a part of the detent engaging element 16 is received in the recesses 24 and 25 as the film 1 is wound about the spool, so that even winding of the film on the reel may be accomplished.

Located on the trailing end 5 of the film 1, between the detent engaging means 16 and the supply end of the film, is a second detent engaging means comprising a pair of notches generally designated 28 formed in the edges of the film. The notches 28 are formed with tapering edges toward the supply reel end, and with edges normal to the path of movement of the film toward the takeup reel end, for purposes to appear.

Formed on the leader ed of the film 12 is another detent engaging means, here shown as an aperture 29 in the central region of the film. This aperture serves to actuate a valve member forming a part of the processing apparatus to be described, for purposes to appear.

FIG. 6 shows, in part fragmentarily and in part schematically, the pertinent elements of an internally programmed cassette adapted for use in the system of my invention. The cassette comprises a housing generally designated 30, formed of any suitable opaque material such as metal, plastic, or the like, and preferably manufactured in two cooperating parts.

Figure 7:
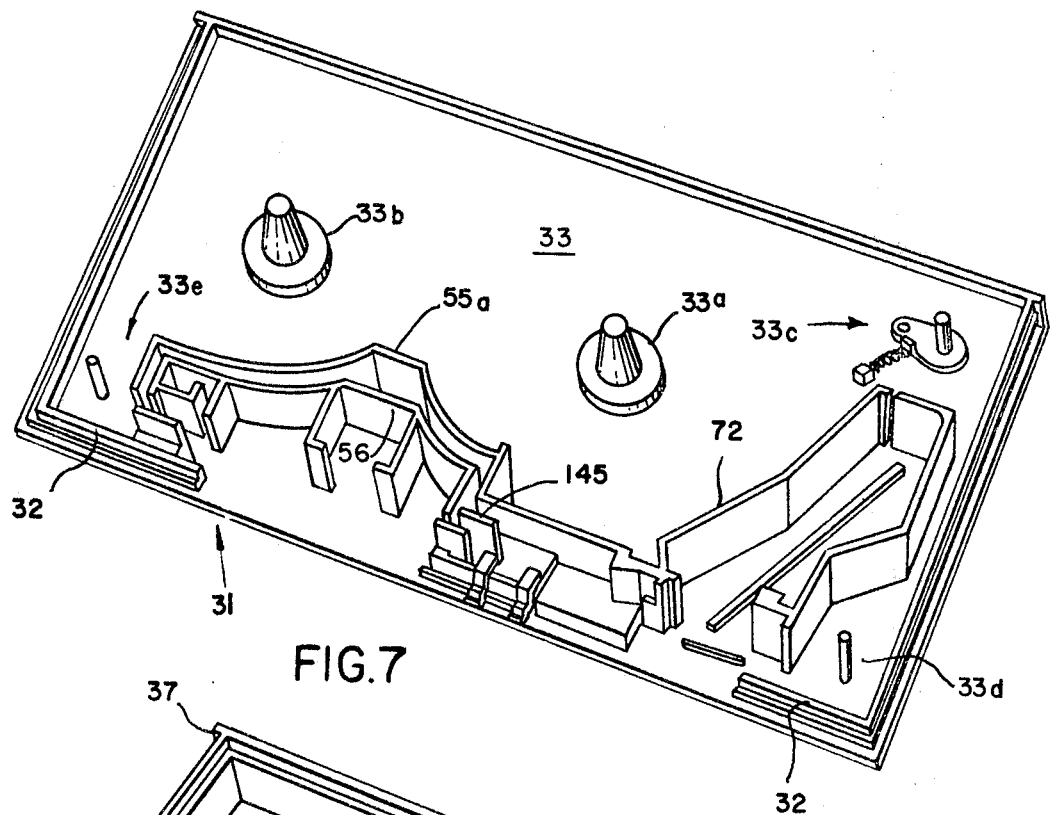
FIG. 7 is a schematic perspective sketch of a portion of a housing forming a part of the apparatus of FIG. 6.
Figure 8:
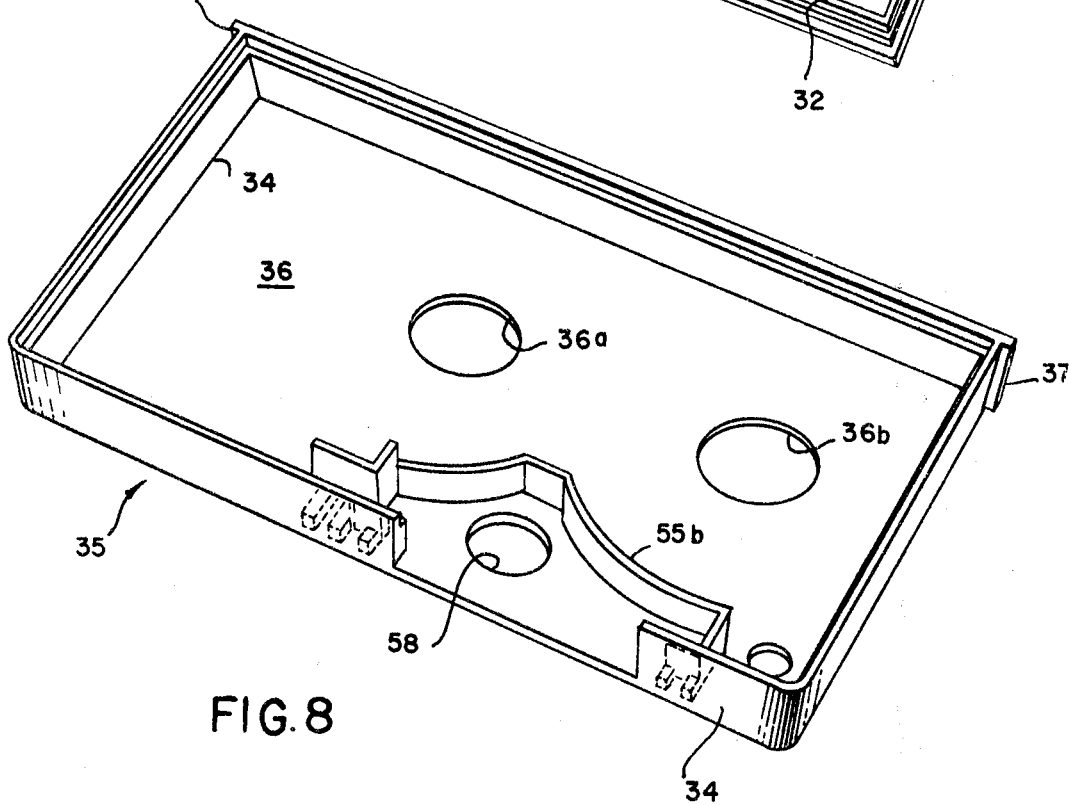
FIG. 8 is a schematic perspective sketch of another portion of the housing forming a part of the apparatus of FIG. 6.

Referring to FIGS. 6, 7 and 8, the housing parts comprise a base generally designated 31, comprising side walls 32 and a base plate 33. The base plate 33 extends across the base of the walls 32, and comprises one side of the housing. The walls 32 extend at least in part about the periphery of the base plate 33, and cooperate with interfitted walls 34 of a cover generally designated 35 that overlaps the corresponding segments of the walls 32 to form sides enclosing the housing of the cassette 30.

A cover plate 36 is formed integral with the walls 34, and completes the upper side of the housing as seen in FIG. 6. The terms "base", "cover", "upper", and "lower" are relative, and are adapted simply for convenience. Similarly, the selection of the parting lines between the walls 32 and 34 are a matter of convenience. In particular, the choice is preferably so made that the base 31 can serve as a support upon which all of the additional fixed and moving parts to be described may be assembled before the cover 35 is put in place.

When the cover is placed in position, it may be formed integral with the base 31 by heat sealing, or by a suitable adhesive, or the like. If of metal, the interfitting parts may be interlocked with cooperating detents formed therein, in a manner conventional and well known to those skilled in the art.

Preferably, the base and cover parts comprise, when assembled, an end flange 37 that serves to support and locate the cassette 30 in either a camera, or in the film drive and projection system to be described.

Rotatably disposed within the housing 30 is a supply reel generally designated 38 (FIG. 6). The reel 38 is provided with an upper flange 39, and a corresponding lower flange, not shown, to guide the film strip 1 as it is wound about the spool portion of the reel 38, not shown, to which the supply end of the film 1 (FIG. 1) is attached.

A sprocket schematically indicated at 40 may be formed integral with the reel 38 to adapt the reel to be driven about its axis of rotation. Access to the sprocket 40 may be provided through a suitable recess 36a in the cover plate 36 (FIG. 8), light-baffled by suitable conventional annular flanges, not shown, formed in cooperating relation on the cover plate 36 and on the upper surface of the flange 39 (FIG. 6). The lower flange of the reel 38 may be formed in a conventional manner with a cylindrical axial opening to receive a cooperating axle 33a formed integral with the base plate 33, as shown in FIG. 7.

Referring again to FIG. 6, the film 1 extends from the supply reel 38 over a path along which it first passes a process composition release mechanism generally designated 41, to be described below. Initially, the film 1 is in its unexposed state and coiled primarily about the supply reel 38. It is shown in FIG. 6 in the position assumed as it nears the end of its movement away from the supply reel, as toward the end of exposure in a camera, in which it is nearly exhausted from the reel 38.

In the position of the film shown in FIG. 6, approximately at the end point established by the film drive and projection apparatus when the second elongated aperture 11 (FIG. 2) is encountered by the pawl 15 (FIG. 3), the side notches 28 in the film are located just beyond engagement with the actuator 41 in the direction of movement of the film away from the supply reel 38, for purposes to appear.

In its path from the supply reel 38, the film 1 next encounters a conventional bobulator roll 42. The film engages a portion of the periphery of the bobulator roll, as shown, and passes therefrom around a conventional idler roll 43 journalled for rotation in the housing, and thence through film processing means generally designated 44, shown in block form in FIG. 6 and to be described below. In addition to the apparatus for processing the film in a manner to be described, the film processing means 44 comprises a signal generator for producing an external condition signal on terminals schematically indicated at 45 and 46, to indicate whether or not the processing means has been actuated.

Beyond its path through the film processing means 44, the film 1 extends through a conventional light-baffled aperture schematically indicted at 47 and forming a portion of a film gate in the housing. The film 1 reenters the housing through a second light-baffled aperture generally designated 48 and comprising a second portion of the film gate. The film 1 next passes over a conventional snubber roll, generally designated 49, and finally passes to a takeup reel generally designated 50, comprising a spool portion 51, to which the takeup reel end of the film is connected, and about which the film is wound as suggested in FIG. 6.

As fragmentarily shown in FIG. 6, in addition to parts corresponding to those parts described in connection with the supply reel 38, which may be identically duplicated for the takeup reel 50, the takeup reel comprises an external upper flange 52 protruding beyond the maximum radius of the film 1 when substantially stored on the takeup reel. On the flange 52 is formed a suitable drive sprocket 53, by means of which the film can be selectively advanced in a manner to be described.

The bobulator 42 may be of any conventional construction, and performs the known function of isolating the film drive pawl 12 associated with a camera, or the pawl 13 associated with the projector (FIG. 3), from the inertia of the supply reel 38. For this purpose, the bobulator 42 comprises a roller 54 mounted in any conventional manner on a pivot that is in turn mounted on a support movable with respect to the base plate 33 and biased by a spring, as schematically indicated at 33c in FIG. 7, such that the bobulator roll 54 can be moved backwards and forwards in the directions of the double arrow shown in FIG. 6.

The bobulator roll thus responds to increases or decreases in the tension of the film 1 by temporarily shortening or lengthening the film path, respectively. Such changes in film tension are produced by the actuation of the film drive pawl and are determined by the inertial forces exerted by the supply reel 38, together with the larger or smaller supply of film that may be on it at any given time. By that arrangement, as the film is advanced incrementally by the pawl associated with the camera or projector, it can rapidly move the bobulator roll against its relatively light spring without immediately affecting the supply reel, which can then more or less gradually allow the bobulator roll to relax while supplying the segment of film taken by the pawl.

A lighttight shield around the film gate formed by the apertures 47 and 48 is formed by a wall portion 55, comprising a segment 55a formed integral with the base plate 33 of the base 31, and a segment 55b formed integral with the cover 35, as shown in FIGS. 7 and 8. These wall segments are formed integrally, to comprise the wall 55, after assembly of the parts in the manner described above. An exposed chamber behind the film 1 is thus formed for the purpose of admitting projection light.

The appartus for this purpose is conventional, and will only briefly be described. In short, it comprises a prism generally designated 57 and comprising a mirror, not shown, but disposed at 45 degrees to the plane of FIG. 6. As schematically indicated, the prism 57 is mounted between extensions formed on a wall 56. The wall 56 is formed integral with the base plate 33.

Light enters the cassette, through an effective aperture schematically indicated at 58 and formed in the cover plate 36, in directions normal to the plane of FIG. 6. The mirror in the prism 57 directs this light downwardly through the film 1 in the film gate for projection of images on the film through a suitable lens assembly, to be described.

Also disposed in the chamber bounded by the wall member 55 and the film passing through the film gate is a conventional pressure plate 59, located between the prism and the film, and biased by a spring 60 into engagement with the film. The spring 60 is supported and retained by suitably shaped extensions of the support wall 56, as shown.

The pressure plate serves in the conventional manner to cooperate with the camera, by locating the focal plane of the film during exposure. A conventional framing aperture is also provided in the pressure plate 59, as schematically indicated, to pass light entering through the prism assembly 57 through a selected frame of the film 1, after the film is processed in a manner to be described.

The snubber roll 49 may also be of entirely conventional construction. As illustrated, it is provided with a hub portion schematically indicated at 62 that is adapted to protrude through a suitable light-baffled aperture in the cover panel 36 for engagement by a stop member, comprising a part of either the camera or of the film drive and projection system, that is engaged when the film is to be incrementally advanced by a pawl for exposure or projection purposes. The cooperation between the snubber roll 49 and the takeup reel 50 is conventional, but will be briefly described.

The drive sprockets 40 and 53 of the supply and takeup reels 38 and 50, respectively, are adapted to be engaged by corresponding drive sprockets comprising a part of a camera, or of the film drive and projection apparatus to be described. In the film drive and projection apparatus, both supply and takeup reels are adapted to be driven through slip clutches. In the camera, only a drive for the takeup reel need be provided. This drive comprises a slip clutch connected to a sprocket driving the takeup reel drive sprocket 53, in cooperation with a drive pawl such as 12 in FIG. 3a sequentially engaging a series of the sprockets 9 formed in the film 1, along a portion of the edge of the film in the film gate between the apertures 47 and 48.

When the snubber roll 49 is stopped by engagement of the hub 26 as described above, operation of either the camera or of the film drive and projection apparatus to incrementally advance the film towards the takeup reel, by engagement of a pawl with the sprocket holes in the film 1, will momentarily loosen the film from engagement with the stationary snubber roll 49 and allow the slip clutch driving the takeup reel 50 to take up that increment of the film advanced by the pawl. Between engagements of the pawl, the slip clutch prevents the takeup reel from advancing the film.

In the film drive and projection apparatus to be described, the snubber roll 49 is engaged only while the film is to be incrementally advanced onto the takeup reel. When the film is rewound onto the supply reel, the snubber roll 49 is disengaged and acts as an idler. As will appear, that may occur either during the processing of the film while rewinding, or during subsequent rewinding of the processed film after projection.

The film processing means 44, shown in block form in FIG. 6, will next be described, in its presently preferred embodiment, with reference to FIG. 9. As there shown, the apparatus generally comprises wall means comprising portions of, or formed integral with, the base plate 33 and the cover plate 36 (FIG. 6) which serve to guide, support and house the various elements of the processing apparatus to be described. Generally speaking, these comprise an outer film composition containing housing generally designated 63 and forming a chamber in which there is mounted an initially sealed container of processing composition generally designated 64. The container 63 communicates with a coating nozzle generally designated 65. These elements are mounted above the plane of the film 1.

Principally located below, but in part surrounding, the film 1 is a pressure pad assembly generally designated 67. The pressure pad assembly is acted on by a spring, generally designated 68 and to be described in detail below.

The basic elements of the processing station further comprise a combined pressure pad deflection cam and nozzle closure plate assembly generally designated 69, and a pair of electrical contact elements 70 and 71 which cooperate with the pressure pad deflection cam and nozzle closure plate assembly 69 in a manner to be described below to provide a signal indicating whether or not the film 1 has been processed.

More specifically, the outer container 63 comprises walls 72 formed integral with the floor plate 33 and extending upwardly therefrom in FIG. 9. The walls 72 and floor plate 33 form a container open on a side that is closed by a cover panel fragmentarily shown at 73 of the same general configuration as the region bounded by the walls 72 of the container 73.

The panel 73 is preferablly put in place prior to assembly of the cover 35 with the base 31, and serves as a support for the top plate 36 after final assembly. As schematically indicated, the walls 72 are formed with an upper lug 74, and a lower ledge portion 75, in each of which are formed locating recesses 76 and 77, respectively, adapted to receive corresponding locating posts, not shown, formed on the inside of the cover panel 73 to aid in locating the panel 73 during its installation as the cover of the container 63.

The initially sealed container 64, mounted within the outer container 63, comprises a tub-like receptacle 78, of a suitable plastic or the like, selected to resist interaction with the processing composition, or permeation thereof by ambient gases. The receptacle 78 initially contains a charge 79 of processing composition in an adequate amount to process the film 1.

Referring now to FIGS. 9, 37, 38 and 39, the receptacle 78 is formed on an open side with a circumscribing flange 80 adapted to fit between correspondning cooperating flanges 81 and 82, formed on the floor plate 33, and a mating pair of cooperating flanges 83 and 84 formed on the cover panel 73 as shown in FIG. 38. As shown in FIG. 9, the flange 80 rests against a shoulder formed on the lug 74 at the upper end of the wall 72, and projects over the ledge 75 formed at the lower end of the wall 72.

The container 78 is sealed to initially contain the processing composition 79 by one end 85 of a tear-tab generally designated 86. The tear-tab 86 may be made of any suitable form of plastic material selected to resist the action of the composition 79, and to avoid interaction therewith, as well as to prevent the diffusion into the composition of gases such as oxygen, carbon dioxide, carbon monoxide, water, oxides or hydrides of sulfur or nitrogen, or the like, that might modify its composition. The end 85 is sealed to the plane surface of the flange 80 surrounding the opening formed on the receptacle 78, and within the flange area extending into the mounting recesses described above, by any suitable means such as heat sealing, a suitable adhesive, or the like.

The tear-tab 86 extends from the end 85 sealed to the receptacle 78 back upon itself and out through an aperture 87 formed in the walls 72 to the actuating assembly 41 (FIG. 6), to be described below.

Outside of the sealed container 64, the walls 72 define a chamber 88 into which the processing composition 79 can flow when the tear-tab 86 is partially detached from the receptacle 78 in a manner to be described. The outer chamber 88 communicates with the coating nozzle 65 by way of a downwardly converging section 89 that communicates with a downwardly converging nozzle inlet passage 90 formed in the nozzle 65.

Referring now to FIGS. 9 and 31–35, the coating nozzle 65 may be formed in a conventional manner, as by precision molding or the like, from a suitable thermoplastic resin selected to form a dimensionally stable and accurate molding whose working surfaces can be kept to close tolerances. The most critical of these form a plane, generally U-shaped film engaging land 91 formed on the base of the nozzle, as best shown in FIG. 31, and a doctor bar 92, lying across the bend of the U-shaped land 91, and recessed beneath it as best shown in FIG. 32. The depth to which the doctor bar is recessed is greatly exaggerated in FIG. 32; it is selected to be twice the desired thickness to which the coating composition is applied to the film 1. The land 91 and the doctor bar 92 circumscribe a generally rectangular outlet aperture 93 formed in the nozzle and communicating with the downwardly converging passageway 90 through which the processing composition is received from the outer container 63, described above.

The nozzle 65 is preferably formed in the generally asymmetric shape shown, both to facilitate correct orientation of the nozzle during assembly, and to lock the nozzle in place after assembly. For that purpose, the nozzle is formed with locking recesses 94 and 95 at the sides, as shown in FIGS. 31 and 32; with a sloping end 96, as shown in FIGS. 31 and 35; and, in the sloping end, with a locking recess 97, tapered as shown in FIG. 33, to further confine the nozzle in place. As best shown in FIGS. 32 and 34, the ends 98 and 99 are tapered downwardly to serve the same purpose.

Referring to FIG. 9, these ends 98 and 99 engage corresponding notches 100 and 101 formed in an extension 102 of the wall 72, and in the ledge 75, respectively, to receive the nozzle 65. The nozzle 65 is confined at its base by a wall 66 formed integral with the base plate 33. The sides 103 and 104 of the nozzle 65 are retained by the base plate 33 and cover plate 36 of the housing.

The nozzle 65 is provided at the sides with posts 105 and 106 that provide guidance for the film in its path over the coating gap. These posts also serve at times to stop the nozzle closure plate portion of the element 69, to be described. Referring now to FIG. 31, when engaged with the film in the manner to be described below, the film is adapted to pass over the nozzle outlet port and between the posts 105 and 106, with the emulsion side of the film in engagement with the land 91. During this engagement, coating takes place while the film moves, so that the emulsion surface leaves the coating aperture 93 as it passes over the doctor bar 92 and carries with it a coating of processing composition established by the depth to which the bar 92 is recessed below the land 91.

The nozzle could be formed integral with the walls 72, but is preferably made as a separate piece. That relaxes the requirements on the base, and simplifies the manufacture of the nozzle to close tolerances. Together with the pressure pad, next to be described, the nozzle forms a self-aligning coating station for the film, whereby a coating gap can be established to greater precision than reasonable tolerances on the other parts would otherwise permit.

As shown in FIG. 9, the film 1 normally passes below the nozzle 65, and above a normally disengaged film engaging pad surface 107. The pad surface is formed on an upwardly extending and generally rectangular protrusion in a base plate 108, as shown in FIGS. 26 and 27. The pressure pad assembly 67 may be made of any suitable material, such as stainless steel or the like. The raised surface 107 is ground or otherwise finished with a generally U-shaped, plane film engaging surface 109, that is adapted to mate, through the film 1, with the plane of the land 91 of the nozzle (FIGS. 26 and 31) and generally conform to the working area of the nozzle 65 encompassing the rectangular opening 93 through which the fluid composition passes.

As shown in FIGS. 9, 26 and 27, the pressure pad assembly 67 is formed with an end 110 that is adapted to lightly engage the base side of the film 1 in the initial position shown in FIG. 9. Formed adjacent the end 110 on the plate 108 are a pair of ears 111 and 112, extending up past the film 1 on either side and ultimately engaging the underside of the nozzle 65 in the recesses 94 and 95 (FIGS. 31 and 32).

The pressure pad 67 is formed at its other end with a shroud generally designated 113 comprising a side wall 114 formed integral with the plate 108 and extending upwardly past the film in FIG. 9 to an upper plate 115 that passes over the film 1 and engages a sloping ledge 116 formed in the lower side of an extension 117 of the walls 72 and 102. The extension 117 is formed integral with the base plate 33 and joins the wall 55 defining the projection aperture.

Referring again to FIGS. 26–30, as well as to FIG. 9, the top plate 115 continues over to a second side wall portion 118 that extends toward the base plate 108, but terminates short thereof at an end 119. The end 119 of the wall portion 118 confronts a wall portion 120 extending upwardly from the base plate 108 and separated from the end 119 to form a slot through which the film 1 can initially be threaded in assembling the apparatus. As will appear, the side walls 114, 118 and 120 of the shroud 113 also serve at times as guides for the combined pressure pad depressing cam and nozzle closure plate assembly 69, to be described.

The base plate 108 of the pressure pad is divided into legs 121 and 122, which are bent downwardly somewhat in the region of the shroud 113 as indicated in FIG. 27. Between the legs 121 and 122 is formed a downwardly depending hook element 123 that initially serves as a detent to hold the pressure pad 67 in an inactive position in the housing. For that purpose, as best shown in FIG. 9, the hook 123 is engaged in the initial position shown by an upwardly bent end 124 formed at the end of the spring 68.

The spring 68, shown in part in FIG. 6 and in part in FIG. 9, is best shown in FIGS. 40 and 41. As there shown, the spring 68 comprises a base portion 125 that is cut out as indicated at 126 to clear the idler 43 as shown in FIG. 6. Referring again to FIGS. 40 and 41, the base portion 125 is further provided with a pair of mounting apertures 127 in which suitable fasteners, shown as a pair of screws 128 in FIG. 6, can pass for securing the base 125 to the base plate 33. In practice, the base 125 of the spring 68 may be secured by heat staking it to the thermoplastic material of the base plate 33, as by heating and melting a portion of the base plate 33 through the apertures 127. Alternatively, the spring may be secured by rivets, or other fasteners or the like could be employed.

From the base portion 125 a resilient spring arm 129 extends, in planes normal to the base, into engagement with the film-engaging portion of the pressure pad 67, and thence to its termination 124 initially engaged with the hook 123. Intermediate the ends of the arm 129 is formed a pressure pad engaging button 130 that serves to engage the lower surface of the raised portion 107 of the pressure pad 67 and urge it toward engagement with the film 1.

Referring again to FIGS. 9, 26 and 27, the pressure pad 67 is formed at either side of the hook 123 with a pair of upstanding ears 131. The ears 131 serve as further guides for the pressure pad depressing cam and nozzle closure plate assembly 69.

Referring now to FIG. 9 in conjunction with FIGS. 22–25, the pressure pad depressing cam and nozzle closure plate assembly 69 will next be described. Referring first to FIGS. 22–25, the assembly 69 comprises a plane base plate 133 formed at one end 134 with tapering sides 135 to guide entry of the end 134 into a position covering the outlet port 93 in the nozzle 65, in a manner to appear, to close the nozzle at the end of the processing operation. In that position, a pair of shoulders 136 on the plate 133 cooperate with the stops 105 and 106 on the nozzle 65, as suggested in FIG. 22, to stop the nozzle in its final position.

Formed as orthogonal extensions on the sides of the base plate 133 are a pair of cams 137 and 138 that serve at times to depress the pressure pad, described above, in a manner to appear below. The cam 137 is shorter than the cam 138, to cooperate with the slot formed in the shroud 113 of the pressure pad, described above, to facilitate threading of the film 1 during assembly of the cassette.

Toward the left end of the plate 133, as best shown in FIGS. 22 and 23, the cam 138 is formed with a normally extending arm 139 that extends generally parallel to the plate 133 and is formed with a pair of spring arm extensions 140 and 141. As best shown in FIG. 23, these arm extensions taper away from each other towards the ends, to allow entry of a film aperture in a manner to appear.

A central portion 142 is bent upwardly and away from leg extension portions 143 and 144 of the base plate 133, as best shown in FIG. 23, to form a hook having as its upper portion the extension 142 and as its lower portions the arms 143 and 144. Referring again to FIG. 9, these hook elements initially engage a ledge portion 145 formed integral with the base plate 33 to hold the assembly 169 in the position shown. In that position, the cams 137 and 138 extend into and are guided by the walls of the shroud 113, and the nozzle closing plate end 134 of the assembly 169 confronts but does not engage a downwardly sloping guide ledge 146 formed on the wall extension 102 referred to above.

The upper spring arm 141, of the hook comprising that arm and the lower arm 140 formed on the assembly 69, lightly engages the base of the film 1 in the initial position of the parts shown in FIG. 9. The upwardly bent end of the arm 141 thus serves as a unidirectional detent that is adapted to engage an aperture in the film, in a manner to be described below, towards the end of the processing cycle to be described.

The cam portion 138 of the assembly 69, or metallic conducting material, cooperates with the contacts 70 and 71 in FIG. 9 to form a signal generator indicating whether or not the film 1 has been processed. For this purpose, in the initial position of the parts shown in FIG. 9 assumed before the processing cycle is started, the cam 138 engages both contacts 70 and 71 and thus bridges them to supply an external signal to contacts 45 and 46, forming a part of the film drive and projection apparatus to be described, which indicate by their bridged condition that the film is not processed.

The construction of the contacts 70 and 71 may be identical. Thus, only the construction and mounting of the contact 70 will be described in detail. Referring now to FIG. 36, the contact 70 is shown to comprise a strip of metal having one end 147 extending across the base plate 33, and heat-staked to the base plate as indicated at 148. The contact 70 then extends around the edge of the base plate 33 to form a terminal portion 149 adapted to engage a cooperating contact such as 45 in FIG. 9, and thence extends back over the edge of the base plate 33, and beneath the cooperating side wall portions 32 and 34 of the housing, as through suitable recesses formed therein, to an upstanding and inwardly inclined portion 150 that engages the cam 138. As will appear, at the end of the processing cycle, the assembly 69 will be carried to the right in FIG. 9, opening the contacts 70 and 71 to cause an open circuit to be presented to the contacts 45 and 46, indicating that the film has been processed.

The construction of the film composition release mechanism will next be described with reference to FIGS. 1, 4a, 6, 9, and 13–16. Referring first to FIG. 1, it will be recalled that the notches 28 formed on the trailer 5 of the film 1 were formed with tapering edges towards the supply reel end and with normal edges toward the takeup reel end.

FIG. 6 shows the general disposition of the film 1 on the supply and takeup reels in the position assumed after exposure of the film, and following a further motion of the film from the exposure termination point reached by the camera to the termination point established by the second elongated sprocket hole 11 (FIG. 2), such that the film 1 is disposed primarily on the takeup reel 50 and is substantially exhausted from the supply reel 38. In that position, the notches 28 are in the position shown in FIG. 6, having been advanced slightly beyond a pair of spring-engaging arms 151.

The arms 151 engage the sides of the film 1 in the position shown in FIG. 6, in a manner best shown in FIG. 15. As there shown, the arms 151 are formed integral with a central arm 152, from which they extend outwardly and are bent together, so that at the end of the takeup movement, when the film is substantially exhausted from the supply reel 38 as shown in FIG. 6, the arms 151 engage the film 1. As indicated by the dotted lines in FIGS. 6 and 15, towards the end of the rewind stroke, when the film assumes a position in which it is substantially stored on the supply reel, it will be carried out of engagement with the arms 151 in its path from the bobulator roll 42 to the supply reel 38.

Adjacent their juncture with the central arm 152, the arms 151 are formed with bends indicated at 153 (FIGS. 6, 13 and 14) which adapt the spring arm assembly to be carried in cooperating notches formed in the ends 154 of a pair of identical levers 155. The levers 155 are fulcrumed about a common axis by a pair of stub shafts 156, each fixed in a different one of a pair of supports 157 formed integral with the housing parts in any conventional manner. It will be apparent that one of these shafts could be put in place during assembly of the base and cover parts described above.

The levers 155 are joined by a first transverse shaft 158 secured thereto. The shaft 158 supports an over-center spring 159. The spring 159 is connected at its other end to a cross piece 160 extending between the levers 155 and mounted on a pair of supports 161, each fixed with respect to the housing, as by being formed integral with the floor plate 33. The stops 161 may serve to limit the excursions of the levers 155 in the manner suggested in FIG. 13.

A cross-piece 162 joins the levers 155 at their ends opposite the ends 154. The cross-piece 162 engages a loop 163 formed on the tear-tab 86 by folding the latter over itself and joining it together by heat-sealing, or by a suitable adhesive, or the like.

Comparing FIGS. 6, 9 and 13, the portion of the tear-tab 86 extending out of the outer container 63 through the slot 87 passes over an idler 164 journalled in any conventional manner to the floor plate 33, and thence to the loop 163 engaging the cross piece 162. In the initial position of the parts shown in FIG. 6, the spring 159 is over center in a clockwise sense with the spring arms 151 engaging the sides of the film 1.

The relationship illustrated in FIG. 1 is shown in FIG. 16a, as the notch 28 approaches the spring arms 151 with the film 1 beginning to be rewound from its extreme position substantially fully stored on the takeup reel back to the supply reel. As the notch 28 passes and engages the arms 151, in the manner illustrated in FIG. 16b, the lever arms 155 will be pivoted counter-clockwise as seen in FIG. 6 to carry the spring 159 over center in the opposite direction, as shown in FIG. 13, and detach at least a portion of the end 85 of the tear-tab 86 that is initially detachably sealed to the flange 80 on the receptacle 78. That allows the processing composition 79 to escape from the receptacle 78 and flow into the chamber 88, and thence down through the nozzle 65 to coat the film 1.

The levers 155 are carried by the over-center spring 159 to a position in which the arms 151 are out of engagement with the film 1, even in the extreme position illustrated by the dotted lines in FIG. 6, when the film is substantially fully stored on the supply reel 38. Thus, following detachment of the tear-tab the actuating mechanism 41 plays no further part in the operation of the cassette.

FIGS. 42 and 43 show alternate forms of attachment of the tear-tab end 85 to the receptacle 78. The detachable seal, which may be a heat seal or an adhesive seal or the like, may converge in a generally V-shaped region terminating in an apex at the first point of detachment, as shown at 165 in FIG. 42. That forms a weakened seal at the end, facilitating detachment when the tear-tab 86 is engaged by the actuating mechanism 41 described above without significantly affecting the integrity of the seal before a detaching force is applied. Alternatively, the seal may extend normal to the force acting to disrupt it, as shown at 165a in FIG. 43. The latter mode of attachment may be preferred for certain purposes, as in the modification of FIG. 87, to be described, in which forces on the tear-tab are used first to erect the processor and then to open the container.

Having described one embodiment of the cassette of my invention, its operation will next be described in connection with FIGS. 6 and 9–21.

Referring to FIG. 6, it will be assumed that an initially unexposed strip of film 1 stored primarily on the supply reel 38 has been exposed in a camera, so that it has been advanced onto the takeup reel 50 to the exposure termination point determined by the first elongated sprocket hole 10 on the film (FIG. 2). In that position, the tear-tab release notches 28 will not be in the position shown in FIG. 6, but will still be on the supply reel 38. Next, assume that operation has continued by further rotation of the takeup reel 50 counterclockwise as seen in FIG. 6 to bring the film 1 farther onto the takeup reel.

FIG. 9 shows the parts of the processing apparatus in their initial position, which is maintained during exposure of the film and during the first increment of motion just described from the exposure termination point to the second termination point in which the film is substantially exhausted from the supply reel. In that position, the cam and nozzle closure plate assembly 69 is held in place by engagement of the arms 142 and 143 with the ledge 145, and the upper resilient arm 141 of the film engaging hook formed on the assembly 69 is lightly engaging the base of the film 1. The pressure pad 67 is initially held in place by engagement of its hook 123 with the detent 124 formed on the spring 129. In that position, the end 110 of the pressure pad 67 is lightly engaging the base of the film 1, and the shroud 113 is in engagement with the ledge 116 formed on the wall segment 117.

The parts will remain in the position shown in FIG. 9 until, during the further advance of the film 1 towards the takeup reel, the film engaging hook 16 approaches and engages the end 110 formed on the hook 67 as shown in FIG. 10. When that occurs, near the second termination point established by the second elongated hole 11 in the film (FIG. 2), the hook 16 will move the pressure pad to the left in FIG. 10, to the position shown in FIG. 11. In that position, the shroud 113 has moved out of engagement with the ledge 116, and upwardly under the influence of the spring 129. The ears 111 on the pressure pad 67 will come into engagement with the posts 106 and 105 forming a part of the nozzle 65, and the pressure pad 67 will swing up into engagement with the film 1 and carry the emulsion side of the film into coating engagement with the nozzle 65.

At the same time, the tear-tab detaching notches 28 in the film 1 will be moved to the position shown in FIG. 1. The notches 28 will pass from the supply reel 38 to the position shown in FIG. 6 without actuation of the assembly 41, as the arms 151 will not engage the normal edges of the notches during movement in that direction, but will move in and out of the notches over the tapered edges thereof to allow passage of the notches without operation of the tear-tab.

Next, assume that the first rewind operation is begun, by rotating the supply reel 38 clockwise in FIG. 6, to advance the notches 28 towards the arms 151. Referring to FIG. 12, this motion will bring the hook 16 out of engagement with the end 110 of the pressure pad 67, as shown. The pressure pad will now urge the film 1 into coating engagement with the nozzle 65 under the influence of the spring 129.

As the pressure pad 67 is moved to the left, the detent 124 formed on the spring 129 will be disengaged by the hook 123. The purpose of the detent 124 is primarily to prevent premature movement of the pressure pad 67 in the housing prior to its positive disengagement from the initial position shown in FIG. 9 by the hook 16.

Referring next to FIGS. 6 and 13, as the notches 28 move towards the supply reel 38, the arms 151 of the actuating assembly 41 will be engaged and the levers 155 will be carried to the position shown in FIG. 13, detaching the tear-tab 86 in part from the receptacle 78 to allow the composition 79 to flow down into coating engagement with the nozzle and the film 1. The composition will then be uniformly coated on the emulsion side of the film 1 to a thickness determined by the doctor bar 92.

I prefer a doctor bar coater to other conventional forms of coaters for the purpose of coating the film, because it is inherently insensitive to changes in the viscosity of the processing composition, and to changes in linear film speed with respect to the doctor bar, over a reasonable range that makes the process relatively insensitive to these variables. In particular, as is well known in the art in other contexts, a doctor blade or doctor bar coater inherently will lay down a uniform coating of one-half the distance between the doctor bar and the coated substrate under conditions in which a uniform meniscus can be formed on the coating liquid adjacent its interface with the substrate.

The coating operation begun with the parts in the position shown in FIGS. 12 and 13 will continue until the composition 79 is substantially exhausted and the film is stored substantially all on the supply reel 38. Toward the end of that operation, the aperture 29 (FIG. 1) will approach and engage the hook finger 141 formed on the valve and cam assembly 69 as shown in FIG. 17.

As the film 1 continues to move onto the supply reel, engagement of the aperture 29 of the film of the spring arm 141 will carry the film along the arm and downwardly, as suggested in FIG. 18, into the bight formed between the arms 141 and 140. Further movement of the film 1 towards the supply reel will carry the cam and valve member 69 to the right of the position shown in FIG. 18, causing the spring arms 142, 143, and 144 to disengage the ledge 145, and bringing the cams 137 and 138 into contact with the base plate 108 of the pressure pad 67 in the region of the shroud 113, with the cam assembly 69 being guided by the shroud 113, as the assembly 69 moves to the position shown in FIG. 19.

During this movement, the end 134 of the cam and valve assembly 69 is guided by the cam 146 formed on the wall extension 102 of the housing, and moves below the nozzle 65 towards a nozzle closing position. The pressure pad 67 begins to move downwardly, out of engagement with the film 1. The film is still held down out of its normal plane of movement by engagement with the bight formed between the spring arms 140 and 141, as shown in FIG. 19.

Figure 19:
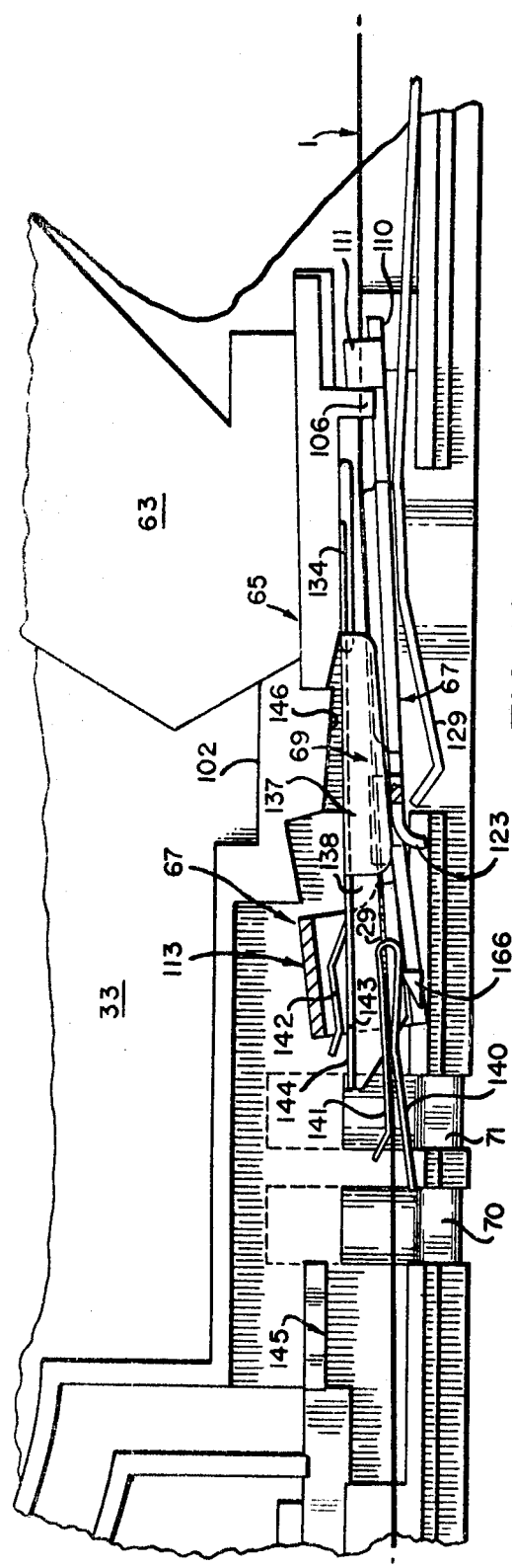
Figure 20:
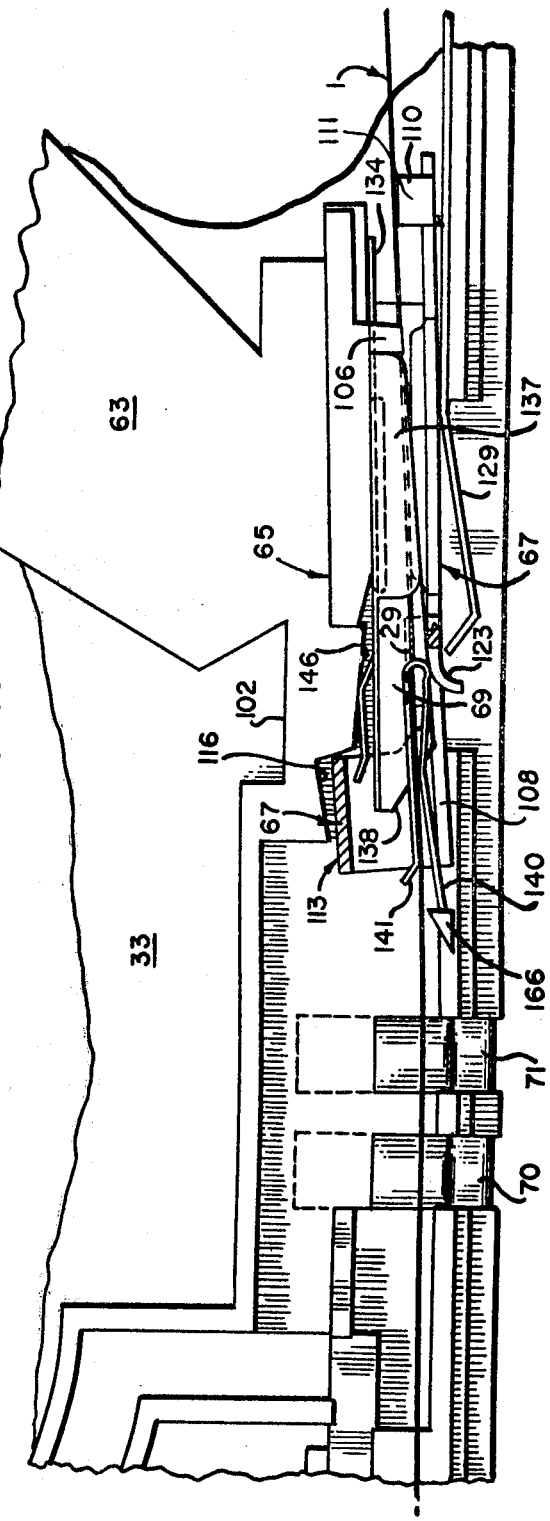

Movement in this direction will continue to move the assembly 69 to the right in FIG. 19, as it goes to the position shown in FIG. 20 in which the end 134 of the valve assembly 69 closes the nozzle 65 and the shoulders formed on the assembly 69 engage the stops 105 and 106 formed on the nozzle 65. The lower spring arm 140 glides over and engages the stop 166, which may conveniently be formed on the cover wall portion 34, to latch the cam assembly 69 against movement to the left as shown in FIG. 20.

During its movement from the position shown in FIG. 18 to the position shown in FIG. 19, the cam 138 disengages the contact 70, and thus provides a signal indicating that the film has been processed. Further movement to the position shown in FIG. 20 will completely disengage the contacts 70 and 71.

Figure 21:
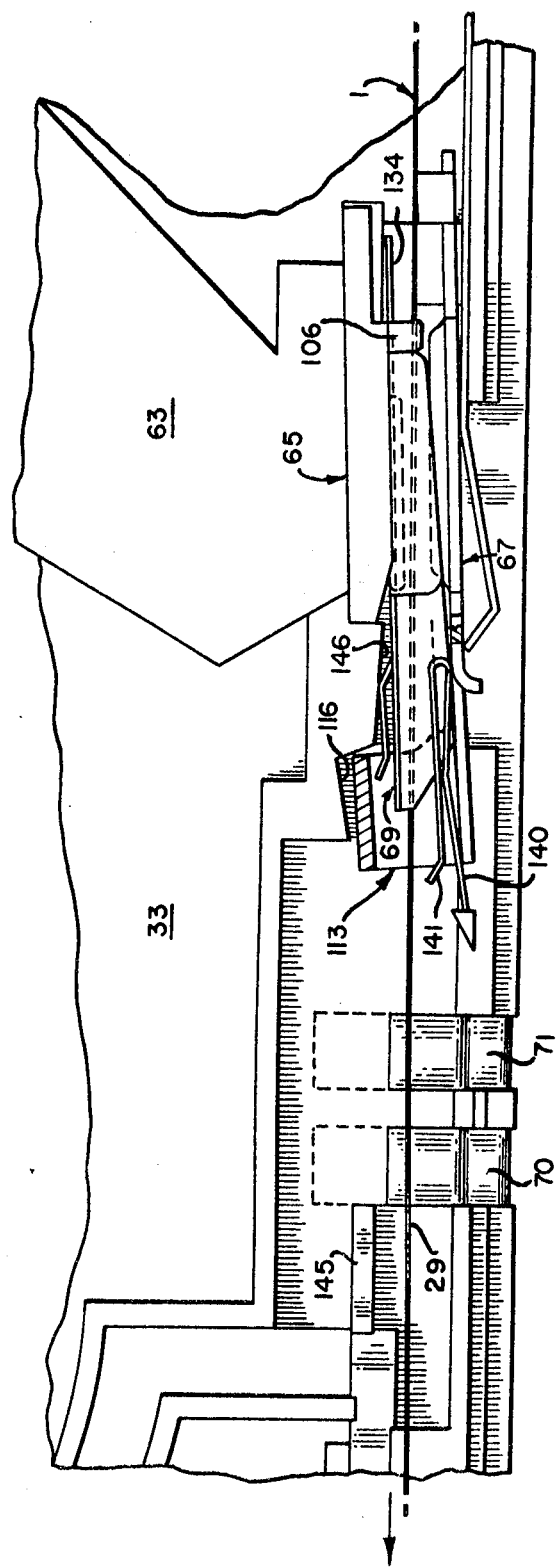

FIG. 20 shows the final disengaged position of the processor parts, with the film 1 still engaged with the hook elements 141 and 140. The next significant relative movement of the parts will not occur until the film is again moved toward the takeup reel, as during projection of the processed film. When that occurs, as illustrated in FIG. 21, the aperture 129 will disengage the arm 141, and the film will rise to its initial plane of movement, in which it is free of all of the elements of the processing apparatus, for subsequent cycles of projection and rewinding.

The nozzle 65 is now closed except for the small passage between the doctor bar and the upper surface of the valve end 134 of the assembly 69. Since this is quite a small aperture, on the order of several ten-thousandths of an inch, it will quickly be sealed by the evaporation of the vehicle from the processing composition, with concomitant drying and hardening of the composition in the gap. Contamination of the apparatus is further prevented by the fact that any leakage of processing composition that may occur will be primarily upon the upper surface of the end 134 of the assembly 169, where it will be exposed to drying without further contact with the film.

Referring next to FIG. 44, I have shown a film drive and projection system in conjunction with a cassette 30 of the form just described. In this system, the processing operations described above, together with projection and rewinding operations, can be automatically carried out so that exposed film in the cassette may be rapidly processed and projected by the user immediately after it is exposed in the camera.

As shown in FIG. 44, a film drive and projection system in accordance with my invention may comprise an outer housing schematically indicated at 170 of opaque material, pierced by a projection aperture defined by the barrel schematically indicated at 171 of a lens assembly comprising a lens 172. The system is adapted to be supplied with electrical energy from any convenient source, here schematically shown as a source of alternating current connected between a pair of terminals 173 and 174, the latter being shown for convenience as connected to a reference ground. The source may be a conventional 60Hz 120 volt supply.

Energy from the source is supplied through a conventional on-off switch S1, preferably mounted on the exterior of the housing 170 for convenient access by an operator, to a conventional power supply 175. The power supply 175 may comprise any conventional apparatus for converting the alternating current supplied to a convenient DC voltage, here illustrated as a DC supply and control voltage at a potential B+ with respect to reference ground. This voltage is not critical, but is preferably available at some relatively substantial voltage, such as 24 volts, so that interrogation of the contacts such as 70 and 71 on the cassette 30 may be decisive in spite of such dry contact resistances as may occur across these contacts when bridged by the cam 138. As well known in the art, such contact resistances may be the result of very thin films developed on the contact surfaces prior to the flow of current through the contacts, which resistances rapidly fall to very low values once current has been established.

As suggested in FIG. 44, the housing 170 is provided with a receptacle adapted to receive a cassette 30 and comprising suitable ledge members schematically indicated at 176 for engagement with the flange 5 formed on the cassette 30. Additional guide means, schematically indicated by the guide 177, and stop surfaces, indicated schematically by the stop 178, are provided in the cavity in the housing adapted to receive the cassette 30 to locate and support the cassette. As illustrated, the contacts 70 and 71 associated with each cassette 30 are adapted to be engaged by contacts 45 and 46 in the housing 170, for purposes to appear.

A normally open, spring-biased switch S2 is adapted to be closed by the cam 179 formed on the housing of the cassette 1 when the cassette is inserted in the housing, as shown in FIG. 44. This switch S2 has one terminal connected to the supply terminal at B+, and when closed provides a signal labelled IN that is positive with respect to ground and indicates that a cassette is present in the housing 170.

When a cassette 30 is inserted in the housing 170, its supply reel drive sprocket 40 is engaged with a drive sprocket 180 driven by a shaft schematically indicated by the dotted line 181. The shaft 181 is connected to one side of a conventional slip clutch schematically shown at 182.

The slip clutch 182 has an input shaft schematically indicated at 183 and comprising the output shaft of a conventional DC motor SM. When energized in a manner to be described, the motor SM drives the supply reel sprocket 40 through the slip clutch 182, with consequent rotation of the shaft 181.

As schematically indicated at 184, the shaft 181 is connected to a motion detector MD, schematically shown in block form in FIG. 44, and to be described in more detail in connection with FIG. 45 below. The motion detector MD responds to rotation of the shaft 181 in either direction to produce a positive output signal above ground, which rises abruptly when motion starts, and falls abruptly when motion ceases. This signal may be produced upon rotation of the drive shaft 181 in one direction in response to energization of the motor SM. It may also be produced upon rotation of the shaft in the opposite direction in response to drive of the takeup reel sprocket 53, with concomitant rotation of the supply reel drive sprocket 40, as the film is taken from the supply reel.

The takeup reel drive sprocket 53 engages a drive sprocket 185 when the cassette 30 is inserted in the housing. The sprocket 185 is connected through a shaft 186 to a conventional slip clutch 187. The clutch 187 is connected to the output shaft 188 of a conventional DC drive motor TM.

When energized in the manner to be described, the motor TM rotates the shaft 188 to drive the sprocket 53 through the slip clutch 187. At the same time, the sprockets in the film 1 exposed in the film gate in the cassette 30 are arranged to be incrementally advanced by means schematically indicated by the dotted line 189 and comprising a conventional incremental drive mechanism for a film advance pawl schematically indicated at 13, of the form described above in connection with FIG. 3b.

During incremental advance of the film as just described, a solenoid having a winding schematically indicated at 190 is energized to attract an armature schematically indicated at 191 to engage a stop schematically shown at 192 with the hub 62 of the snubber roll described above. That action causes the takeup drive slip clutch 187 to slip, except when film is released by engagement of the pawl 13.

The projection aperture defined by the opening in the barrel 171 of the lens 172 is adapted to be closed at times by a normally open curtain shutter 193 pierced by an aperture 194. The aperture 194 is normally in registry with the aperture in the barrel 171, and is held in that position by a tension spring 195 acting between the curtain shutter 193 and a suitable support 196 fixed with respect to the housing 170. The spring 195 holds the shutter 193 in place by resiliently urging a stop 197, connected to the shutter 193 by means schematically indicated at 198, against a corresponding stop 199 fixed with respect to the housing 170.

The element 198, carrying the stop 197 and connected to the shutter 193, may be connected to or formed integral with an armature schematically indicated at 200 forming a part of a solenoid having an energizing winding 201. When energized in a manner to be described, the solenoid winding 201 attracts the armature 200 to close the projection aperture defined by the lens barrel 171 by drawing an opaque portion of the curtain shutter 193 across it. When a cassette 30 is inserted in the housing, and the shutter is closed as just described, the housing 170 and cassette 30 comprise a light tight housing about the portion of the film 1 exposed in the film gate, to facilitate processing operations.

The power supply output terminal at B+ is connected to one input terminal of a conventional OR gate 202. The rising leading edge of the supply voltage, as it approaches B+ when the switch S1 is first closed, is applied through the gate 202 to trigger a conventional one-shot multivibrator OS1 to produce a CLEAR pulse. The CLEAR pulse is employed to set a pair of registers, to be described, to a reference state each time the switch S1 is closed to energize the film drive and projection system.

The IN signal produced when the switch S2 is closed is applied through a conventional inverter I to a second input terminal of the OR gate 202. The trailing edge of the positive IN signal thus produces a positive transition through the OR gate 202 to trigger the multivibrator OS1 when a cassette 30 is removed from the housing 170. That provides a positive reset of the apparatus to its reference state after each use of the system, or in the event that a cycle of operation is interrupted by premature removal of the cassette. When so triggered, a second CLEAR pulse will be produced by the multivibrator OS1 to restore the registers, to be described, to their initial states.

The film drive and projection system comprises a projection lamp K adapted to supply collimated light, through a conventional condenser, not shown, to the prism 57 (FIG. 6) through the aperture 58 in the cover panel 36 when a cassette 30 is received in the housing 170. The lamp K is arranged to be energized during projection of processed film by a circuit which extends from the supply terminal at B+ through a conventional electronic switch S3, and thence through the filament of the lamp K to ground.

The switch S3 may be of any conventional construction, and is schematically shown as comprising a pair of load terminals $a$ and $b$ which provides a closed circuit path when a positive signal is applied to a control terminal $c$. When a ground level signal is applied to the control terminal $c$, the load terminals $a$ and $b$ present an open circuit. The switch S3 may comprise a transistor, or any other form of electronic switch of the types well known in the art.

A positive signal labelled VIEW is at times applied to the control terminal $c$ of the switch S1 when an AND gate 204 of any conventional construction responds to the presence of both a positive PROJECT level, and a positive level PD that indicates that the film in a cassette in the housing has been processed. These signals are produced at times in a manner to be described.

A cassette interrogation circuit extends from the supply terminal at B+ over the contacts of the switch S2, when closed by a cassette present in the housing, through a current limiting resistor R1, through contacts 46 and 45 that engage the cassette contacts 70 and 71 when a cassette is in the housing, and thence through a voltage determining resistor R2 to ground. The resistor R1 is selected to limit the current flowing through the contacts 70 and 71, when they are bridged by the cam element 138, to a low value once current flow has been established by application of the full supply voltage across the terminals 70 and 71. The resistor R2 is selected to produce a voltage across it, labelled $\overline{PD}$, that is positive when the contacts 70 and 71 are bridged and has a value suitable for use in low level logic circuits, such as integrated circuits or the like. The voltage may be, for example, on the order of magnitude of from 3 to 5 volts.

The signal $\overline{PD}$ will be present when a cassette that contains unprocessed film is in the housing, and will at other times be absent. At such times, the signal $\overline{PD}$ will be absent and the signal PD will be present. The positive voltage level PD is formed by a conventional inverter 205 in response to the absence of the signal $\overline{PD}$.

The positive signal IN is applied to one input terminal of another conventional OR gate 206. The leading edge of this signal, occurring when a cassette is inserted in the housing 170, produces a positive-going transition labelled START that triggers a conventional one-shot multivibrator OS2 to produce an output pulse that sets a conventional flip-flop F1.

The flip-flop F1 may be of any conventional construction. It is arranged to be set when a positive signal is applied to its input terminal S, and to be reset when either a CLEAR pulse is applied to its input terminal C or an END P pulse, produced in a manner to be described, is supplied to its reset input terminal R. The flip-flop F1 has a logic 1 output terminal which produces a positive level PROJECT when the flip-flop is set.

A second START signal for setting the flip-flop F1 is at times produced when a cassette containing unprocessed film is inserted in the housing so that the level $\overline{PD}$ is initially present at a positive level, and that level is subsequently removed during processing in a manner to be described. The trailing edge of the signal $\overline{PD}$ triggers a conventional one-shot multivibrator OS3 to produce a negative output pulse.

It will be recalled that the contacts 70 and 71 are bridged by the cam 138 until the film has been processed, and the cam and valve assembly 69 (FIG. 9) has been moved to its final position (FIGS. 20 and 21). The contacts 70 and 71 are opened, as shown in FIGS. 19 and 20, before the final position of the cam and valve assembly is reached. The duration of the pulse produced by the multivibrator OS3 is selected to bridge this interval, during which it is still desired to keep the film moving. At the trailing edge of the pulse produced by the multivibrator OS3, a positive transition is supplied through the gate 206 to trigger the one-shot multivibrator OS2 and produce another START pulse to set the flip-flop F1.

The presence of the signal $\overline{PD}$ at a positive value causes a conventional amplifier 207 to supply energizing current to the winding 201 of the solenoid that closes the shutter 193. The result is that the shutter 193 remains closed, to close the projection aperture defined by the lens barrel 171, during processing.

As noted above, the motion detector MD produces a sharply rising and falling voltage level that remains positive with respect to ground so long as the shaft 181 is rotated in either direction. The trailing edge of the signal produced by the motion detector MD triggers a conventional one-shot multivibrator OS4 to produce a positive output pulse. The output pulse produced by the multivibrator OS4 is supplied to one input terminal of a conventional AND gate 208, and also to one input terminal of another conventional AND gate 209.

A second input terminal of the ANd gate 208 receives the level PROJECT from the logic one output terminal of the flip-flop F1. When that level is present and the multivibrator OS4 produces its output pulse, a pulse labelled END P will be produced by the gate 208 that will reset the flip-flop F1.

The trailing edge of this pulse END P will trigger a conventional one-shot multivibrator OS5 to produce a positive pulse labelled START REWIND that sets a conventional flip-flop F2.

The flip-flop F2 may have the characteristics described above in connection with the flip-flop F1. It is arranged to be reset by the CLEAR pulse, produced as described, or by an END R pulse, produced in a manner to be described.

When the flip-flop F2 is set, it produces a positive signal labelled REWIND at its logic one output terminal. That signal is applied to a second input terminal of the gate 209, causing the gate 209 to produce an output pulse when the one-shot multivibrator OS4 produces a pulse during the time that the flip-flop F2 is set. The output signal from the gate 209, labelled END R, causes resetting of the flip-flop F2.

The takeup reel drive motor TM is at times supplied with energizing current by an amplifier 210, of any conventional construction, which produces energizing current for the motor TM when the level PROJECT is present at the logic one output terminal of the flip-flop F1. The amplifier 210 also provides energizing current for the solenoid winding 190 at this time, to engage the stop 192 with the snubber roll hub 62. It will be apparent to those skilled in the art that buffering could be provided between the motor TM and the solenoid winding 190, but such details will be understood by the artisan without further elucidation, and will not be dwelt upon.

Current for energizing the supply reel drive motor SM is at times provided by a conventional operational amplifier 211. The amplifier 211 has an input resistor R3, and a selectively adjustable feedback path comprising a fixed resistor R4 and a resistor R5 that is connected in parallel with the resistor R4 when a conventional electronic switch S4 is closed.

The switch S4 may be of the same construction as the switch S3 described above, and is arranged to be closed when the signal $\overline{PD}$ is applied to its control input terminal. With the resistor R5 in the feedback circuit, as will be apparent to those skilled in the art, the amplifier 211 will operate at relatively low gain in response to the REWIND signal supplied when the flip-flop F2 is set. That will cause the motor SM to be driven at a relatively slow speed selected to be appropriate for processing the film in the manner described above. For processed film, a higher rewind speed is normally desirable. For that purpose, when the signal $\overline{PD}$ is absent, the resistor R4 alone provides higher gain for the amplifier 211, and correspondingly increased current to drive the motor SM at a higher speed for rewinding.

FIG. 45 shows the details of the motion detector MD. As shown, the apparatus receives a mechanical input from the shaft 181 by means of a connection to a commutator wiper 184 forming a portion of a rotary switch S5 that includes a plurality of interconnected contacts 212 adapted to be sequentially engaged by the wiper 184 as the shaft 181 is rotated in either direction. Alternatively, as will be apparent to those skilled in the art, the contacts 212 can be formed as lands on the shaft 181, spaced by intermediate grooves filled with a suitable insulating material, such as an epoxy resin or the like. The commutator arm 184 may then be formed as a slidable contact sequentially engaging these lands on the shaft as it rotates.

The arm 184 is connected to the supply terminal at B+, and thereby supplies that voltage over any engaged one of the contacts 212 to a lead 213. The lead 213 is connected to ground over a first path extending in series through a capacitor C1, a diode D1, and a resistor R7. These components are so selected that the capacitor C1 is substantially fully charged, each time the wiper 184 engages one of the contacts 212, during the minimum dwell time of such engagement.

The minimum dwell time will occur at the most rapid shaft speed encountered, which occurs during the rewinding of processed film. Typically, for example, processing rewind may take from 30 to 40 seconds, projection about 3 ½ minutes, and storage rewind about 10 seconds. Designing the capacitor circuit for essentially full charging during each contact engagement makes the average voltage across the resistor R7 proportional to the angular velocity of the shaft.

A resistor R6 completes a second path from the lead 213 to ground. A third path extends through the capacitor C1 and from the cathode to the anode of a diode D2 to ground. A discharge path for the capacitor C1 thus extends from one side of the capacitor through the resistor R6, and thence from the anode to the cathode of the diode D2 and then to the other side of the capacitor C1. This discharge path is effective to discharge the capacitor C1 between engagements of the wiper 184 and the contacts 212.

A charging path for a second capacitor C2 extends from the lead 213 through the capacitor C1, through the diode D1 in its forward direction, through a resistor R8, and thence through the capacitor C2 to ground. The resistor R7 is connected between ground and the juncture of the resistor R8 and the diode D1. An output circuit path extends across the capacitor C2, from its upper terminal through the cathode to the anode of a zener diode D3, and thence through a resistor R9 to ground and the lower terminal of the capacitor C2.

The capacitor C2 is thus charged through the resistor R8, each time the capacitor C1 is charged, to a voltage that increases with shaft speed and may approach B+ at higher shaft speeds. Between charging intervals, the capacitor C2 discharges through the resistor R7 in series with the resistor R8. The discharge time constant is selected to be long compared to the charging time constant. When the voltage across the capacitor C2 reaches and exceeds the breakdown voltage of the zener diode D3, current continuously flows through the zener diode and the resistor R9 to produce a positive MOTIOn signal across the resistor R9.

The components of the motion detector circuit are selected by conventional design methods such that when the wiper 184 is rotated by the shaft 181 at a speed at least equal to the slowest operational speed, which in general will be the projection takeup speed, the capacitor C2 will be charged through the capacitor C1 and the resistor R8 in series at a rate sufficient to exceed the breakdown voltage of the zener diode D3, causing an output signal to appear across the resistor R9 as long as the motion continues. When motion of the shaft 181 stops, the zener diode D3 will be blocked, causing the voltage across the resistor R9 to drop abruptly to ground. The output signal across the resistor R11 will thus exhibit sharp rise and fall times, although the amplitude of the signal during motion will be determined by the rate of motion. Since it is the fall time of this signal that is utilized in the circuit of FIG. 44, the amplitude of the signal produced during motion is not critical.

Operation of the system of FIG. 44 will next be described. Since the processing operation occuring in the cassette has been described in considerable detail above, in terms of the effects produced upon manipulation of the supply and takeup reels, and of the film drive pawl and snubber roll, attention will be primarily directed to the operation of the components of the film drive and projection system which effect those manipulations.

Discussion of the operation of the system of FIG. 44 will proceed on the initial assumption that no cassette 30 is in the housing 170, and that the switch S1 is open. All of the electrical apparatus within the housing 170 is accordingly de-energized, and the shutter 193 is open. Next, assume that the switch S1 is closed. The power supply 175 will now produce the supply voltage at B+, and the multivibrator OS1 will be triggered through the gate 202 to produce a first CLEAR pulse that will reset the flip-flops F1 and F2. No further operation will occur until a cassette 30 is inserted in the housing.

Assume next that a cassette 30 containing unprocessed film is inserted in the housing. It will be further assumed that the film 1 in the cassette is at the exposure end point determined by the first elongated aperture 10 shown in FIG. 2 in the manner described above, with the film being primarily stored on the takeup reel 50 in FIG. 6 but still having a sufficient distance to go onto the takeup reel to cause erection of the pressure pad in the processor as described above.

With the cassette 30 in the state just described, the contacts 70 and 71 will present a closed circuit. Thus, a circuit will be closed between the contacts 45 and 46 when the contacts 70 and 71 engage them.

Engagement of the various film control elements on the cassette with corresponding elements of the film dirve and projection system may occur in a sequence that is not especially critical so long as engagement is approximately simultaneous. However, it is preferred that the contacts 45 and 46 engage the contacts 70 and 71, and that the supply and takeup sprockets engage the corresponding supply reel and takeup reel drive sprockets 40 and 53, respectively, with the snubber roll stop 192 in position to engage the snubber roll hub 62, just before closure of the switch S2 by the cam 179. Any substantial lead in the closure of the contacts of the switch S2 could cause premature operation of the takeup motor TM, as well as a flickering of the lamp K. Such flickering would be functionally insignificant, but would have a deleterious effect upon the life of the lamp.

Assuming that the cassette is engaged in the housing 170 with its input elements engaged with the corresponding elements of the film drive and processing system as described above, the levels IN and PD will be produced simultaneously as the switch S2 is closed.

The leading edge of the IN pulse will trigger the one-shot multivibrator OS2 through the gate 206 to set the flip-flop F1.

With the level $\overline{PD}$ present, the level PD will be absent and the switch S3 will remain open. Thus, the lamp K will not be illuminated. However, the solenoid winding 201 will be energized through the amplifier 207 and the shutter 193 will be closed.

As soon as the flip-flop F1 is set, the solenoid winding 190 will be energized to engage the snubber roll stop 192 with the hub 62 of the snubber roll. The takeup reel drive motor TM will be operated to cause the film drive pawl 13 to incrementally advance the film, and the takeup reel drive sprocket 53 will be rotated to take up increments of film loosened from the snubber roll by the film drive pawl. As the film is taken up, the supply reel sprocket 40 will rotate, causing the motion detector MD to produce its output signal.

During the film advance operation commenced in the manner just described, the hook 16 on the film 1 will engage the end 110 of the pressure pad 67 as shown in FIG. 10, erecting the pressure pad and causing engagement of the film with the nozzle 65 in the manner described in detail above. The film will continue to advance until the drive pawl 13 encounters the elongated notch 11, as described above in connection with FIGS. 2 and 3b.

With the snubber roll stopped, the takeup reel drive clutch 187 will slip. Accordingly, the supply reel drive sprocket 40 will stop, because the film is no longer being taken up. That will cause the level of the output signal produced by the motion detector Md to drop and trigger the multivibrator OS4.

With the flip-flp F1 set, the gate 208 will now produce the pulse END P to reset the flip-flop F1. That will cause the takeup motor TM to stop, and the solenoid winding 190 to be de-energized, releasing the snubber roll.

The duration of the pulse END P, determined by the time constant of the multivibrator OS4, should be selected to allow the various moving parts to come to a complete stop. At the end of this pulse, its trailing edge will trigger the multivibrator OS5 to produce the START REWIND pulse, setting the flip-flop F2.

The level REWIND will now cause the motor SM to be operated through the amplifier 211, to begin rewinding of the film onto the supply reel. That will occur at the selected processing speed, with the resistor R4 in parallel with the resistor R5 because the switch S4 is closed in the presence of the signal $\overline{PD}$. As the motor SM operates the supply reel drive sprocket 40, with concomitant rotation of a shaft 181, the motion detector MD will again produce its output signal.

Toward the beginning of the rewinding operation commenced as just described, the notches 28 in FIG. 6 will engage the arms 151 of the tear-tab actuating mechanism 41, to at least partially detach the tear-tab from the receptacle 78 in FIG. 9 and allow processing fluid to flow into the nozzle as shown in FIG. 13. Coating of the film, in the manner described, will continue during most of the rewind operation.

Toward the end of the rewind operation, the slot 29 in the film will engage the arm 141 as shown in FIG. 17, and subsequent motion of the film will carry the cam and valve member 69 to the right in FIG. 17. That will cause termination of the coating operation by lowering the pressure pad 67 and sealing the nozzle 65 in the manner described in detail above. During this operation, the contacts 70 and 71 will cease to be bridged by the cam 138, and the level $\overline{PD}$ will drop. The transition thus produced will trigger the multivibrator OS3 to produce its output pulse. The switch S4 will be opened when the level $\overline{PD}$ disappears.

During the interval in which the output pulse from the multivibrator OS3 is present, the end of the film on the takeup reel will be reached, preventing further rotation of the supply reel 38 and causing the sprocket 40 to stop. That will cause the shaft 181 to stop, with consequent slippage of the slip clutch 182, and the motion detector MD will cease to produce its output signal.

The trailing edge of the motion detector signal will trigger the one-shot multivibrator OS4. With the flip-flop F2 set, the REWIND level and the multivibrator pulse supplied to the gate 209 will produce the END R pulse that resets the flip-flop F2. The supply motor SM will accordingly stop. At the trailing edge of the pulse produced by the multivibrator OS3, the multivibrator OS2 will be triggered through the gate 206, and the flip-flop F1 will again be set.

With the level $\overline{PD}$ absent and the flip-flop F1 set, the gate 204 will be enabled to close the switch S3 and cause the lamp K to be illuminated. At the time the level $\overline{PD}$ disappears, the solenoid winding 201 will be de-energized, and the shutter 193 will be opened.

The film 1 in the cassette 30 is now in its processed state. As the takeup motor TM begins to operate in response to the PROJECT level produced by the flip-flop F1 in its set state, the solenoid winding 190 will be energized to stop the snubber hub 62. The film drive pawl 13 will be operated to cause incremental advance of the film as before. This incremental advance from the supply reel onto the takeup reel will now occur concomitantly with the projection of the processed film, through the lens 172, upon any selected viewing surface.

Such a viewing surface may be provided in the form of a diffusion screen spaced from the lens 172 and connected through an extension of the housing 170 to receive light only from the lens, to form an image which can be viewed from the outside of the apparatus. Alternatively, it may comprise a screen supported independently of the housing 170, as on a tripod. A conventional shutter, not shown, may be provided to operate in a conventional manner, in conjunction with the film drive pawl 13, to cause appropriate framing of the projected images and intermittent blanking of the screen to allow a conventional motion picture sequence to be displayed.

At the end of the projection run, the film pawl 13 will again slip in the second elongated aperture 11 of FIG. 2, and the supply reel drive sprocket 40 will again stop to cause cessation of motion of the shaft 181, with a consequent drop in the output signal of the motion detector MD. The multivibrator OS4 will again be triggered. As before, with the flip-flop F1 set, that will cause the gate 208 to produce the END P pulse that resets the flip-flop F1.

The trailing edge of this pulse will again trigger the multivibrator OS5 to produce another START REWIND pulse. That will set the flip-flop F2, and the film will now be rewound by operation of the motor SM. This rewinding operation will occur at the higher rewind speed obtained when the feedback resistance of the amplifier 207 is at the higher value of the resistor R4, established when the level $\overline{PD}$ is absent so that the switch S4 is open.

During the rewind operation, the motion detector will produce its output signal as before. At the end of the rewind operation, when the slip clutch 182 slips, the motion detector signal will fall, the multivibrator OS4 will be triggered again, and the gate 209 will produce another END R pulse. That will reset the flip-flop F2. The apparatus will remain in this state until a cassette is removed from the housing 170, without further operation.

Assuming that the entire sequence just described is properly carried out, and that the cassette 30 is not prematurely removed, when it is removed, the only effect will be the production of another CLEAR pulse by triggering the multivibrator OS1. That will be done through the gate 202 and the inverter 203 when the IN level drops. With both flip-flops F1 and F2 reset, the CLEAR pulse will have no effect on those circuits.

Operation of the system of FIG. 44 in response to the insertion of a cassette 30 that contains film which has previously been processed is essentially the same as the operation described above in connection with the second cycle following the processing of unprocessed film. The difference is that the contacts 70 and 71 will initially present an open circuit. Thus, the shutter 193 will never be closed, and the second START pulse produced by the multivibrator OS3 will not be produced. The first START pulse produced at the leading edge of the IN signal when the switch S2 is closed will cause operation to begin with a project cycle, with the lamp K lit and the shutter 193 open. Projection of the processed film will continue until the projection termination notch 11 in the film is encountered. Thereafter, the film will be rewound as described above, and operation will stop with the film in its rewound state and substantially stored on the supply reel.

Referring next to FIG. 46, I have shown a strip of film 215 modified for use in another embodiment of my invention. The film strip 215 may be identical in construction, and in the manner in which it is coated and processed, to the film 1 described above, except to the extent that it is modified in a manner and for the purposes described below.

As before, the film 215 has one end adapted to be connected to the takeup reel and formed for that purpose with a suitable aperture 216. The other end is adapted to be connected to the supply reel, is correspondingly formed with an aperture 217. Along one edge of the film is formed a series of regularly spaced sprocket holes 218, serving the same purpose as the sprocket holes 9 in the film 1 of FIG. 1. Similarly, a first elongated sprocket hole 219 and a more greatly elongated sprocket hole 220, corresponding to the elongated holes 10 and 11 in FIG. 2, respectively, may be incorporated in the same manner and for the same purposes as in the film strip of FIG. 1. However, in accordance with this embodiment of my invention, these elongated sprocket holes, which establish two different termination points, one in the camera and one in the film drive and projection apparatus, do not affect the processing operation, but are primarily used to allow the cassette, to be described, to function in the system of FIG. 44 without modification of that system. As will appear, all of the processing operations occur during the first rewind of the film.

The film strip 215 may further include a processor erection slot 221 of the same character as the slot 29 in FIG. 1. Toward the supply end of the film, and beyond the photographically usable portion of the film, is a tear-tab engaging aperture 222, serving in a manner to be described to open an initially sealed container of processing fluid for coating on the film 215.

FIG. 47 illustrates in pertinent part a cassette modified in accordance with my invention to make use of a normally engaged reverse roll coater programmed by the film strip of FIG. 46. The apparatus comprises a cassette generally designated 223 that may be constructed in the same general manner described above, with exceptions to be noted. As described above, the cassette comprises a housing preferably formed from base and cover portions of which only portions of the base 224 are shown. As illustrated, the base 224 may comprise a base plate 225 upon which other components are mounted for assembly before the cover, not shown, is installed. The base 225 is formed integral with side walls 226 that cooperate with corresponding wall portions on the cover to form an enclosed housing and, at the top of the cassette as shown in FIG. 47, a flange 227 that serves the same purpose as the flange 5 described above.

In the housing is rotatably mounted a supply reel generally designated 228 and comprising an upper flange 229 formed integral with a spool portion 230 on which the film 215 is connected and wound. A hub 231 is formed integral with the upper flange 229 and extends to a drive sprocket 232 for the supply reel that serves the same purposes as the drive sprocket 40 earlier described.

As before, the film 215 passes over a conventional bobulator roll 233, and thence downwardly over an idler generally designated 234. The film is redirected by the idler 234 to pass to the left in FIG. 215, towards a light-baffled aperture forming a portion of the film gate, not shown, in the manner and for the purposes described above. The remainder of the path of film to the takeup reel may be the same as described above.

As suggested in FIG. 47 at the base of the idler 234, and formed integrally with the idler and adapted to extend outwardly therefrom below the path of the film 215, is a drive sprocket 235 adapted to engage and drive a corresponding sprocket 236 formed integral with a coating roll 347. The coating roll 237 is affixed to a shaft 238 journalled in any conventional manner in an outer coater chamber 239. The chamber 239 is journalled for rotation in the cassette housing by means here shown as a shaft 240 formed integral with the base plate 225, and if desired extending upwardly into a corresponding and cooperating bearing recess in the cover plate, not shown.

The container 239 comprises walls made of any suitable conventional material, such as plastic or the like, which will resist interaction with the processing composition. It contains an initially sealed receptacle 241 of such processing composition.

The container 241 comprises a generally tub-like receptacle 242 of the type described above, initially sealed by one end of a tear-tab 243 in the manner described above to contain a charge 244 of processing composition adequate to process the strip of film 215. At least the end of the tear-tab 243 protruding from an aperture 245 in the container 239 is preferably made of relatively stiff material, as by laminating it to a stiffening strip 246, not shown but to be emplied in some of the remaining figures.

The end of the strip 243 that is sealed to the container 241 may thus be of relatively flexible material, as is desirable, whereas the end protruding from the aperture 245 may be sufficiently stiff to cause an effective hook portion 248 to be formed thereon. The hook 248 serves to engage the aperture 222 in the film strip, described above, to tear the strip 243 away from the receptacle 242 when the film is advanced in the proper direction.

Wall portions 249 and 250 of the container 239 form a compartment 251 generally below the container 241 of processing composition, which chamber is adapted to receive the charge 244 when the tear-tab 243 is detached from the receptacle 242. The composition 244, when so released and contained, is supplied to a wick 252. The wick 252 is made of capillary material wettable by the composition 244, and controls the supply of the composition deposited in the chamber 251 to the coating roll 237. The wick 252 is disposed in a passage between the wall member 250 and a lower wall member 253 forming a part of the container 239.

In the initial position of the parts shown in FIG. 47, the coating roll 237 is adapted to lightly engage the emulsion side of the film 215. The drive sprocket 236 for the coating roll 237 is in engagement with the drive sprocket 235 formed on the idler 234, so that the coating roll 237 will rotate in the opposite direction from the idler 234 in response to movement of the film 215 in either direction. Such rotation will not affect the film 215 so long as the container 241 remains sealed.

The container 239 is held in the initial position shown in FIG. 247 by a spring 254 in compression between the lower wall 253 of the chamber 239 and a suitable support 255 fixed with respect to the base plate 225. This spring 254 urges the container 239 upwardly against an over-center linkage comprising a first link 256 pivoted at one end to a cooperating lug 257 formed integral with the container 239, and at the other end pivoted to a link 258. The link 258 is pivoted at its opposite end to a suitable support 259 formed integral with the floor plate 225.

As shown, the end of the link 258 that is pivoted to the link 256 initially engages a stop 260 formed integral with the base plate 225, and thereby stops motion of the container 239 under the influence of the spring 254 in the position shown in FIG. 47. Connected to the pivot joining the links 256 and 258 is a cable 261, of metal, a synthetic resin monofilament, or the like. The other end of the cable 261 is connected to a juncture 262 with a yoke, best shown in FIG. 51, comprising a pair of cables 263 extending from the juncture 262 about a pair of idlers 264 journalled in the housing.

From the idlers 264, the cables 263 extend to connections with a pair of downwardly depending arms 265 formed on an actuating element 266. Referring to FIGS. 47 and 51, the actuating element 266 is formed from any suitable material, such as metal or the like, and comprises a crosspiece 267 joining the depending arms 265.

The crosspiece 267 is formed intermediate its ends with an extending arm 268 that is slidably received in a suitable guide 269 formed integral with the base plate 225. A hook 270 is formed integral with the arm 268 intermediate its ends, and extends upwardly into light engagement with the base side of the film 215 in the position of the parts shown in FIG. 47. In that position, it is adapted to ride in and out of any aperture in the film, without engagement, as the film moves in the direction of the arrow in FIG. 47. However, the hook 270 will engage an aperture such as 221 in the film when the film is moved, to the right in FIG. 47, towards the supply reel 228.

A conductive contact engaging element 271 is formed integral with the arm 268 and adapted to engage and bridge a pair of electrical contacts 272 and 273 in the position of the parts shown in FIGS. 51, 52, and 47. The contacts 272 and 273 provide a signal indicating whether or not the film has been processed, for use in the system of FIG. 44 in the manner described above in connection with the similar signal provided by the contacts 70 and 71. For this purpose, the contacts 272 and 273 extend to external terminals 274 and 275 formed on the exterior of the housing in any conventional manner and adapted to cooperate with the contacts 45 and 46 in the system of FIG. 44.

Having described this embodiment of my invention, its operation will next be described with reference to FIGS. 46–54. For the purpose of the discussion, it will be assumed that the film is initially in the position shown in FIG. 47, being unexposed and stored substantially all on the supply reel 228.

Assume next that the film is exposed in the camera, while being transferred incrementally from the supply reel to the takeup reel with the film 215 moving in the direction of the arrow shown in FIG. 47, until the exposure end point determined by the location of the slot 219 in FIG. 46 is reached. The cassette is then removed from the camera, and placed in the film drive and projection system of FIG. 44.

The bridged condition of the terminals 274 and 275 will be detected, and a preprocessing advance will take place, in the manner described above, to carry the film further onto the takeup reel until the second elongated slot 220 is encountered by the double film pawl in the film drive and projection system. During that movement, and comparing FIGS. 47 and 48, as during the preceeding advance movement during exposure, the hook 248 formed on the tear-tab 243 and the hook 270 formed on the actuating element 266 will glide over the emulsion and base sides, respectively, of the film without engagement.

During the increment of movement between the exposure end point determined in the camera and the advance end point determined in the film drive and projection apparatus by the elongated sprocket hole 220, the tear-tab engaging slot 222 will move past the tear-tab hook 248, to the location A shown in FIG. 48. Next, as described above, the system of FIG. 44 will begin to rewind the film and restore it to the supply reel 228.

The location A of the tear-tab engaging hole 222 will then move toward the supply reel, until the hook 248 formed on the tear-tab engages the slot 222 and the tear-tab 243 will be carried with the film as suggested in FIG. 48. During that movement, the portion of the tear-tab 243 initially sealed to the open side of the receptacle 242 will be detached, allowing the processing composition 244 to flow out into the outer container 239, and thence up through the wick 252 to load the coating roll 237.

The coating roll 237 will be rotated at this time oppositely to the direction of the idler 234, and against the movement of the film 215 towards the supply reel 228. As shown in FIG. 49, as the rewind movement continues, the film 215 will carry the tear-tab 243 entirely out of engagement with the roll coater, and onto the supply reel 228. The portion of the tear-tab 243 wet by the composition 244 will adhere to the film 215, causing the tear-tab to remain in position on the film thereafter.

Referring next to FIG. 50, as the film 215 nears its end on the takeup reel and is stored substantially on the supply reel 228, the processor erection slot 221 will approach the hook 270 formed on the actuating element 266. Referring to FIG. 53, as the hook 270 engages the slot 221 and is carried with the film toward the supply reel 228, the arm 268 of the actuating element 266 will move down into the guide 269, drawing the cable 261 downwardly and to the left in FIG. 53 through the cables 263 running over the idlers 264. That movement of the cable 261 will erect the links 256 and 258 as shown in FIG. 53, initially causing a slightly more positive engagement of the coating roll 237 with the film 215.

Further movement of the arm 268 with the hook 270 engaged in the slot 271 will draw the film downwardly from the plane shown in FIG. 53 toward the guide 269 as the arm 268 is buried in the guide. The links 258 and 256 will be moved over center to the position shown in FIG. 54, causing a stop 276 formed on the container 239 to engage the stop 260, where the container 239 is held by the spring 254.

As the arm 268 moves to the right in FIG. 53, the contact engaging element 271 moves off of the contact 272, and ultimately away from the contact 273, whereupon the terminals 274 and 275 will present an open circuit indicating that the film has been processed. As described above, this contact opening takes place slightly ahead of the time at which the film reaches its rewind termination point when it is substantially exhausted from the takeup reel. The interval between the disengagement of the contacts and the end of the rewind movement is bridged by the pulse produced by the multivibrator OS3 in FIG. 44, as described above.

At the end of the first rewind operation, the film will be down in engagement with the hook 270, with the arm 268 being carried down to a storage position in the guide 269. On the projection cycle that will follow processing, the film will be carried to the left in FIG. 54, disengaging the aperture 221 and allowing the film to rise to its normal plane of travel. Thereafter, no subsequent engagement of the film with the hook 270 will occur, because the hook has been carried below its initial film engaging position. The processing apparatus will thus remain out of engagement with the film during subsequent use of the processed film in the cassette.

FIG. 55 shows a detail of the rollers which may be typical of the bobulator roll 42, idler 43, and snubber roll 49, except that the manner of mounting of the rollers has been shown in FIG. 55 only for the idler 43. That simply comprises a suitable bearing post 277 formed integral with the base plate such as 33 of the cassette and protruding into a suitable central recess 278 formed in the idler 43, to journal the idler on the post for rotation in the housing. The significant point is that the film engaging surface of the roller 43 is formed with a central recess 279, so that the roller surface only engages the film at the edges, and not in the central region 281 on which the emulsion is deposited. That prevents engagement of the roller surface with the film when the processing compositiion on it is still wet, following the processing operation as described above.

FIG. 56 illustrates a further feature that may be incorporated in a cassette in accordance with my invention to facilitate drying of the film following processing. In FIG. 56, I have illustrated quite schematically a cassette generally designated 282 that may otherwise be in accordance with any of the embodiments described above, but in particular, comprises a cover protion 283 interfitted with a base portion 284 to form a lighttight housing for the purposes described above. The cassette 282 is adapted to be received within a suitable recess formed in a housing 285 for the film drive and projection apparatus, which may be of the kind described in connection with FIG. 44 above.

As shown, the housing 285 is provided with an air inlet port 286 adapted to admit air to a conventional fan 287 for supply through a conduit 288 to a baffled inlet port in the housing in the cassette 282. The inlet port comprises a first passage 289 formed in the cover 283 and communicating with an overlapping blind cylinder 290 formed integral with the base 284 to allow air to flow into the cassette without admitting light. A conventional heating element 291 may be included in the passage 288 to heat the air if desired, so that it will rapidly dry film during processing in the cassette 282. A baffled air outlet port is provided in the cassette comprising a cylindrical wall 292 formed on the cover 283 and communicating with an outlet passage 293 formed integral with the base 284 to allow air to exit from the cassette and thence pass out from the housing 285 through a suitable exhaust port 294.

FIG. 57 shows a modification of the apparatus of FIG. 9 wherein the erection of the pressure pad 67 is accomplished during the same movement that actuates the tear-tab 86 to open the container of processing fluid in the outer container 63. For that purpose, the shroud 113 on the pressure pad 67 initially is held in the inactive position shown on FIG. 9 by means shown in FIG. 57 as a bellcrank generally designated 295. The bellcrank 295 is pivotally mounted by means shown as a pin 296 fixed to the base plate 33 and formed with a notch 297 that initially engages the shroud 113 of the pressure pad 67 and holds it down against the spring 129, where it is initially retained by the detent 124 formed on the spring 129 and engaging the hook 123.

The opposite end of the bellcrank 295 is connected, by means here shown as a link 298, to a loop 299 formed on one end of a flexible strip 300. The strip 300 is adhesively or otherwise secured at its other end 301 to the tear-tab 86. The bellcrank 295 is initially held in the position shown by a spring 302, compressed between the end 303 of the bellcrank on which the notch 297 is formed, and a suitable stop 304 formed integral with the base plate 33. The spring 302 urges the bellcrank against a stop 305 also formed integral with the base plate 33.

By the arrangement shown in FIG. 57, when the tear-tab 86 is detached in the manner described above in connection with the apparatus of FIS. 6, 9 and 13, the strip 300 will move the bellcrank clockwise in FIG. 57, forcing the shroud 113 to the left in FIG. 57 and out of engagement with the notch 297, so that the hook 123 of the pressure pad 67 will be brought out of engagement with the detent 124, and the pressure pad will be erected under the influence of the spring 129. That eliminates the need for the hook 16 (FIG. 1), and its function, and makes it possible to omit the film engaging end 110 of the pressure pad 67 so that the latter need not project beyond the ears 111, as shown in FIG. 57. The construction and operation of this embodiment of my invention may otherwise be the same as that described above.

Referring next to FIG. 58, I have illustrated another embodiment of my invention incorporating a modified processing station. The apparatus had been fragmentarily illustrated in conjunction with a housing, such as that described in connection with FIGS. 6–21, comprising a base portion generally designated 310 formed from a floor plate 311 and side wall members 312 in the manner and for the purposes described above. The apparatus of the cassette comprising these and other parts, except those to be described below, may otherwise be as described above for the apparatus of FIGS. 6–21.

As fragmentarily shown in FIG. 58, the apparatus comprises an outer processing composition container generally designated 313 and formed by wall means 314 formed integral with the base plate 311. This container 313 may be the same as the container 63 described in connection with FIG. 9, except for modifications to be described. As shown in FIG. 58, the wall portion 314 is provided with an extension 315 formed with a locating recess 316 to accept a locating dowel, not shown, formed on a cover panel 317, fragmentarily shown in FIGS. 73 and 74, and preferably assembled to close the container 313 before the cover plate, not shown, is assembled.

Within a chamber 318, defined by the base plate 311, walls 314 and cover 317, is an inner receptacle 319 of the type described above in connection with the receptacle 78 in FIG. 9, and similarly containing a charge 320 of processing composition that is initially sealed within the receptacle 319 by one end of a tear-tab 321 sealed to the outer lips of the receptacle 319.

The chamber 318 is provided with a downwardly converging outlet passage 321 confronting a downwardly converging inlet passage 322 in a coating nozzle generally designated 323. The nozzle 323 may be substantially the same as that described in connection with FIG. 9 above, except for omissions to be noted. In general, it is adapted to be received in notches such as 324 formed in the wall members 314, to be confined between a pair of supports 325, shown in FIGS. 64 and 66, and to engage corresponding notches 326 formed in a pair of supports 327, as shown in FIGS. 58 and 65.

As best shown in FIGS. 59 and 64, the cover is generally designated 328 and comprises a top panel 329 formed integral with side walls 330. The side walls 330 are interfitted in any convenient manner with the side walls 312 of the base 310, as suggested in FIG. 59. As shown in FIGS. 64 and 66, the support members 325 are formed integral with the base plate 311 and with the cover panel 329, respectively. Similarly, the support elements 327 are formed integral with the top panel 329 and the base plate 311 as shown in FIGS. 59 and 65.

The nozzle 323 comprises an outlet port 331 of generally rectangular configuration, confronting a working surface 332 formed as described in connection with the working surface 91 of the nozzle 65 in FIG. 31, and, for the same purposes, terminating at the trailing edge in a doctor bar 333 recessed slightly above the working surfaces 332 to define a distance equal to twice the thickness of the desired coating of processing composition on the film, to be described.

A strip of film 334, having features to be considered in detail in connection with FIG. 69, is adapted to be initially stored primarily on a supply reel, and pass therefrom to a takeup reel, over a path including the path segment shown in FIG. 58. In the initial position of the apparatus shown in FIG. 58, the film 334 clears the nozzle working surface 332. The emulsion side of the film 334, which is on the top as shown in FIG. 58, is adapted to be urged at times into resilient engagement with the working surface 332 of the nozzle 323 when the base side of the film 334 is engaged by a pressure pad generally designated 335.

Referring next to FIGS. 58 and 60, the pressure pad 335 may be formed of any convenient and suitable material such as sheet metal or the like. It comprises a raised, plane, film-engaging surface 336 descending to a base plate 337 by way of integrally formed downwardly extending side walls such as 338. At one end of the base plate 337 is formed a downwardly descending cam surface comprising a ramp 339 on which are formed a pair of upstanding guide members 340.

A detent comprising a hook 341 is formed integral with the other end of the base plate 337. The hook 341 is adapted to be initially retained by a spring 342, shown in FIGS. 58 and 62, provided with apertures such as 343 to accept fasteners such as 344 for securing it to the side wall 312.

The pressure pad 335 further comprises side walls 345 formed integral with the base plate 337 and the ramp 339, and pivoted to a set of links 346. The links 346 each have an opposite end pivoted to a lug 347 formed integral with the side wall 312, so that the pressure pad 335 is toggle-mounted for movement between the position shown, in which it is restrained by the spring 342 engaging the hook 341, and a film-engaging position to be described in connection with FIGS. 70–73 below. The pressure pad 335 is resiliently urged upwardly from the position shown in FIG. 58 by a leaf spring 348, best shown in FIG. 61, in compression between the side wall 312 and the lower side of the film-engaging portion 336 of the pressure pad.

Comparing FIGs. 58 and 62, the spring 342 is formed with a slot 349 to admit with clearance a bellcrank generally designated 350 that is pivoted by means of an aperture 351 to a pin 352 anchored in a suitable support 353 formed integral with the side wall 312. The bellcrank 350 is formed at its upper end with a filmengaging hook 354 that is adapted to lightly engage the base side of the film 334 in the initial position of the parts shown in FIG. 58. The opposite end of the bellcrank 350 is formed with a spring engaging end 355, engaging the spring 342 and adapted to effect erection of the pressure pad 335 in a manner to appear.

As shown in FIG. 58, the apparatus further comprises a cam and valve assembly generally designated 356. The assembly 356 is perfectly made of light, resilient sheet metal or the like. As best shown in FIG. 63, the valve and cam assembly 356 comprises a top plate 357 formed at one end with a flange element 358 of reduced width, and folded over itself at the sides to form a pair of guiding flanges 359. At their inner edges, the guiding portions forming the lower side of the flanges 359 are bent downwardly to form a pair of downwardly extending cams 360, each provided with a tapering face 361 adapted first to engage the ramp 339, and then to lower the pressure pad 335, in a manner to be described below. The cams 360 are formed at their ends with a lower pair of legs 362, and, above these legs, with a pair of inwardly extending film-engaging fingers 363 adapted to lightly engage the edges of the film 334 for purposes to appear.

As shown in FIGS. 58 and 59, the cam and valve assembly 356 is initially positioned with its legs 362 supporting the assembly in the position shown by engagement with a pair of supports 364 and 365 formed on each side of the housing. In particular, as best shown in FIG. 59, the support 364 on the right-hand side is formed integral with the top plate 329 of the cover 328, and the support 365 is formed integral with the cover side wall 330. The support 364 on the left is formed integral with the base plate 311, and the support 365 is formed integral with the cover side wall 330.

Further guide and support for the valve and cam assembly 356 is provided by a pair of support elements 366, shown in FIGS. 58, 59 and 64, one formed integrally with the base plate 311 and the other formed integrally with the cover plate 329. As best shown in FIG. 59, the flanges 359 formed at the edges of the valve and cam assembly 356 engage slots formed in the supports 366 to support and guide the assembly 356 for movement to the right in FIG. 58.

As best shown in FIGS. 58 and 65, the support members 327 are formed with slots 367 outwardly converging as indicated at 368 to form an entrance adapted to find the flanges 359 and guide them into the slots 367 during operation of the apparatus in a manner to be described. Similarly, as shown in FIGS. 58 and 66, the supports 325 are formed with slots 369 adapted to engage the corners of the end 358 of the upper plate 357 of the valve and cam assembly 356 to secure it in its final position, to be described.

Referring next to FIG. 69, a film strip 334 adapted for use with the processing apparatus of FIG. 58 is shown. The film 334 extends from a supply end, formed with an aperture 375 to adapt it to be connected to the spool of the supply reel, to a takeup end formed with an aperture 376 to adapt it for connection to a takeup reel, for the purposes described above. Intermediate its ends, the greatest portion of the film is formed over at least its central region with an emulsion 377 of the kind described above. Along the trailing portion 378 of the film 334, intermediate the end of the usable portion 377 of the emulsion and the supply end of the film, is a hook generally designated 379, which may be of the same construction as the hook 16 in FIG. 1. As shown in FIG. 69, the hook 379 comprises an aperture 380 formed in the film and an adjacent region 381 deformed out of the plane of the film and comprising a hook adapted to engage the hook 354 formed on the bellcrank 350 in the manner suggested in FIG. 58.

Along a trailing portion 382 of the film near the takeup end, a pair of adjacent notches 383 are formed in the sides of the film with tapering edges 384 towards the supply end, and normal edges 385 towards the takeup end, as shown in FIG. 69. The notches 383 are adapted at times to engage the fingers 363 of the valve and cam assembly 356 for purposes to appear.

The film 334 may be formed with a pair of notches 386 at its edges near the supply end, as indicated in FIG. 69. These notches may serve the same purpose as the notches 28 in FIG. 1, that is, to detach the tear-tab 321 and release the processing composition 320 in FIG. 58. Since their function, and the consturction utilized to enable them to carry it out, may be the same as described above, they will not be described in further detail herein.

Referring again to FIG. 58, one of the cams 360 formed on the cam and valve assembly 356 initially engages and electrically bridges a pair of contacts 387 and 388. The contacts 387 and 388 extend into the housing for engagement with the cam 360, and out through suitable passages in the housing walls to external terminal surfaces 389 and 390, respectively. The contacts 387 and 388 cooperate with a film drive and projection system, of the kind described above in connection with FIGS. 44 and 45, in the same manner as do the contacts 70 and 71 of FIG. 9. In the initial position of the parts shown, the contacts 387 and 388, being bridged, provide a closed path between the external terminals 389 and 390 to indicate that the film has not yet been processed.

Having described this embodiment of my invention, its operation will next be described in connection with FIGS. 58–74. For the purpose of this discussion, it will be assumed that the film 334 in the cassette of FIGS. 58–74 has been exposed in a camera, placed in the system of FIG. 44, and has begun the initial operation carrying it father onto the takeup reel characteristic of the operation of the system of FIG. 44 in response to the insertion of a cassette of unprocessed film. The film 334 is accordingly moving to the left in FIG. 58, in the direction indicated by the arrow, with the hook 379 on the film approaching the hook 354 formed on the bellcrank 350. Other parts are in the position shown in FIG. 58.

Figure 70:
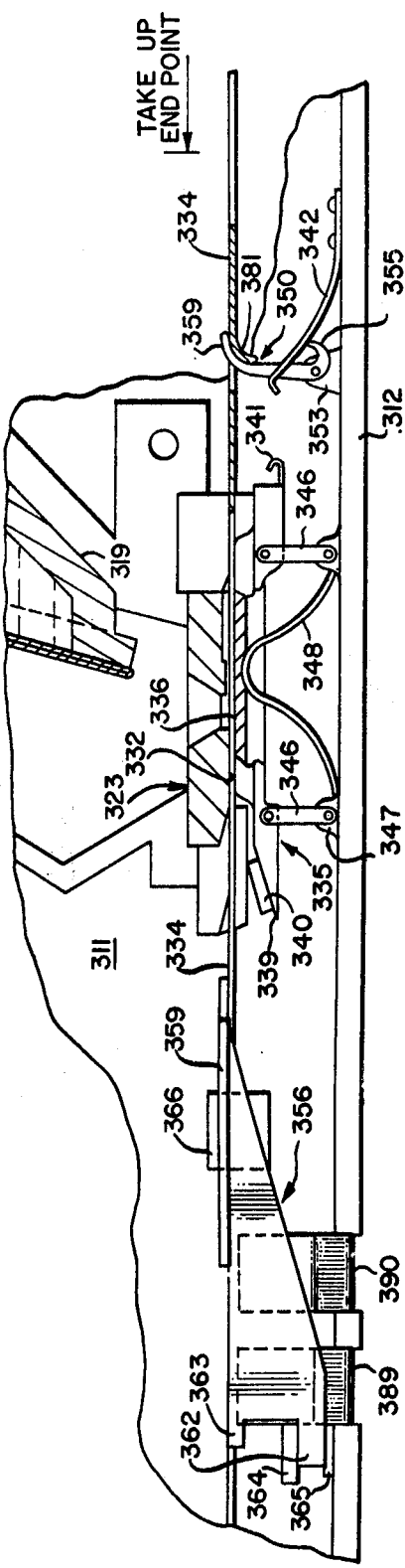

Referring next to FIG. 70, as the film 334 moves onto the takeup reel, the hook 381 will engage the hook 354 formed on the bellcrank 350. The spring engaging end 355 of the hook 350 will then force the spring 342 upward to release the hook 341 of the pressure pad 335. That will allow the pressure pad to be carried upward to the position shown under the influence of the spring 348. The film-engaging surface 336 of the pressure pad will now engage the base of the film 334 and carry the emulsion side into engagement with the working surface 332 of the nozzle 323.

Figure 71:
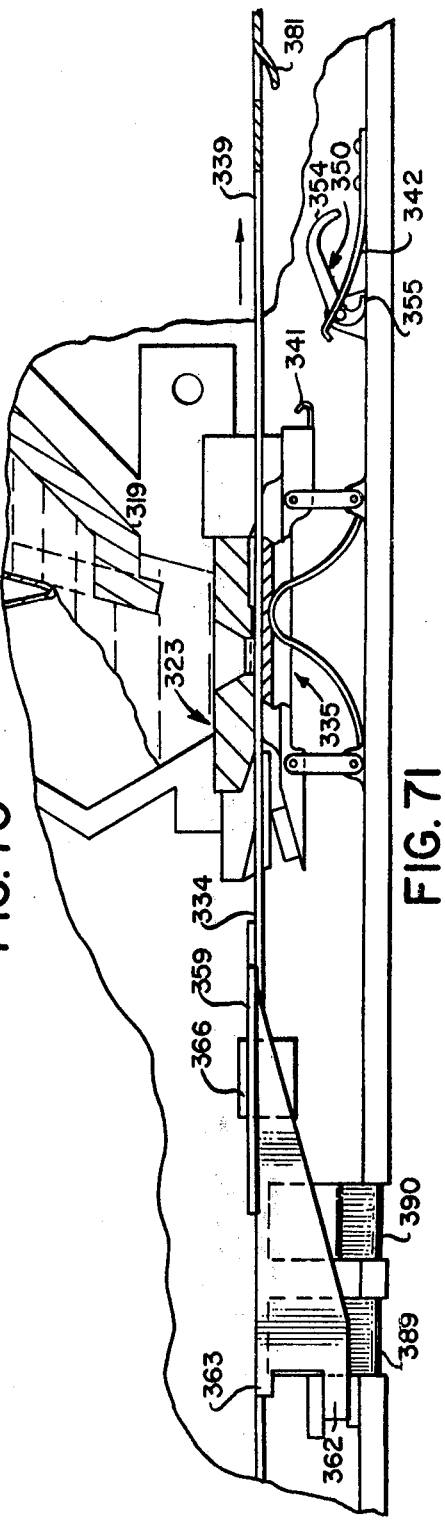

FIG. 70 shows the parts approximately in the position assumed at the end of the first takeup operation, with the hook 354 fully engaged with the hook 381 formed on the film 334. As the subsequent rewind operation is begun, with the film moving onto the supply reel and to the right, as shown in FIG. 71, the hook 381 on the film 334 will move out of engagement with the hook 354 on the bellcrank 350. The spring 342 will then carry the bellcrank 350 down into the position shown in FIG. 71, through engagement with the end 355 of the bellcrank 350. Thereafter, the hook 354 will be out of engagement with the film and will no longer play any part in the operation of the cassette.

With the pressure pad 335 holding the film 334 in coating relation with the nozzle 323 as shown in FIG. 71, further movement of the film 334 to the right in FIG. 71 will cause engagement of the notches 386 in FIG. 69 with the corresponding tear-tab releasing structure, assumed to be identical with that described above in connection with FIGS. 6–21, and thereby release the processing composition in the receptacle 319 for coating of the film during the balance of the rewind operation. The film will be processed as it moves toward the supply reel.

Towards the end of the rewind operation, the notches 383 formed in the film 334 will approach the spring fingers 363 formed on the valve and cam assembly 356, as shown in FIG. 67. When these notches 383 reach and engage the fingers 363, as shown in FIG. 68, and are stopped by the normal edges 385 forming the trailing ends of the notches 383, the valve and cam assembly 356 will be carried to the right in FIG. 68. As shown in FIG. 72, that movement will cause the legs 362 formed on the cams 360 to move out of engagement with the supports 364 and 365, and the end 358 of the cam and valve assembly 356 will move toward engagement with the entrance 368 of the slots 367 formed in the supports 327.

The valve and cam assembly 356 will continue to move to the right in FIG. 72, until the end 358 of the cam and valve assembly 356 engages the entrance 368 of the slots 367, and the flanges 359 thereafter engage and are guided by the slots 367. The cams 360 will then engage the ramp 339 formed on the pressure plate 335 and will be guided at their sides by the supports 340 formed on the ramp. That position of the parts is shown in FIG. 73.

In the interval of movement between the position shown in FIG. 72 and the position shown in FIG. 73, the contacts 387 and 388 are successively disengaged by the cam 360 on the valve and cam assembly 356, so that when the valve and cam assembly 356 reaches the position shown in FIG. 73, the contacts 387 and 388 will both be disengaged. As described above, as soon as the first contact 387 is disengaged, the terminals 389 and 390 will present an open circuit to the apparatus of FIG. 44, signaling that the film has been processed. The electronic delay described above in connection with FIG. 44 serves to delay projection until the valve and cam assembly 356 is carried to its final position, as next to be described.

Referring next to FIG. 74, the apparatus is shown in the final position assumed at the end of the rewind operation. The pressure pad 335 is now held down out of engagement with the film 334 by the cams 360, restrained at their sides by the guides 340 formed on the ramp 339. The end 358 of the top plate of the valve and cam assembly 356 is now received and stopped by the slots 369 formed on the supports 325. (FIG. 58). The top plate 357 of the valve and cam assembly 356 now acts as a valve closure member to close the coating aperture in the nozzle 323, to prevent further escape of processing composition from the nozzle in the manner described above in connection with the somewhat different valve closing apparatus of FIGS. 6–21. Following processing in the manner just described, the film 334 can be projected and then finally rewound in the manner described above in connection with the operation of FIGS. 44 and 45. Thereafter, the film in the cassette will be treated as processed film and simply projected and rewound when placed in the film drive and projection system of FIG. 44.

Film processing apparatus in accordance with another embodiment of my invention will next be described in connection with FIGS. 75–85. In accordance with this embodiment of my invention, the cassette may correspond to any of the preceeding embodiments described above, in respects other than those to be particularly illustrated and described in connection with FIGS. 75–85.

Attention will here be directed to the processing station, which comprises a doctor bar coater of the type described above in connection with FIGS. 9 and 58. The modifications to be described center about the construction of the pressure pad, the means for erecting and retracting the pressure pad, and a modified valve assembly for closing the coating nozzle after processing is complete.

Referring to FIG. 75, the apparatus may compprise an opaque housing for the parts, generally designated 391, and formed in the manner described in detail above from a base portion, including a base plate 392 formed integrally with side walls 393. The base portion is adapted to be assembled with a cover, generally designated 394, and shown schematically and fragmentarily in FIG. 75 as having a cover panel portion 395 adapted to engage and register with the side walls 393 of the base.

A strip of film 396, constructed as illustrated in FIG. 76, to be described, passes through the processing station in the manner and for the purposes generally described above, beneath a coating nozzle generally designated 397 cooperating with an outer processing composition container 398 constructed as described above in connection with FIG. 58.

The film 396 is adapted to travel in a plane spaced from the nozzle 397 in the initial position of the parts shown in FIG. 75. In that position, a pressure pad generally designated 399 and formed with a film-engaging surface 400 is disposed below the plane of the film 396 and out of engagement with it. A cam and valve assembly generally designated 401 is also out of engagement with the film at this time, but holds a pair of resilient fingers 402, to be described, lightly in engagement with the sides of the film 396 for purposes to appear.

Before describing the components thus generally described in connection with FIG. 75 in more detail, the construction of the film strip 396 will be described with reference to FIG. 76. As there shown, the film is generally in conformance with those embodiments described above, in that it extends from a supply end, adapted to be connected to the spool of a supply reel by means of a suitable aperture 403, to a takeup end adapted to be connected to the spool of a takeup reel by means of a corresponding aperture 404. The balance of the film intermediate its ends comprises a photographically usable strip bearing a photosensitive coating 405.

Beyond the photographicaally usable strip, towards the supply end, there are formed, as interruptions in a regularly spaced series of sprocket holes 406 provided for the purposes described above, a first elongated sprocket hole 407 and a second and further elongated sprocket hole 408. these elongated sprocket holes serve to establish an exposure termination point in the camera, and a film advance termination point in the film drive and projection system of FIG. 44, respectively, as described above.

Located beyond these advance termination sprocket holes, in the direction of the supply end of the film, are a first pair of confronting notches 409 formed on the edges of the film and adapted to cooperate with the resilient fingers 402 in FIG. 75 in a manner to be described. Further towards the supply end of the film are a second pair of confronting side notches 410, serving to detach the tear-tab, in a manner that will be sufficiently apparent from the description of FIGS. 6 and 13 above.

In the leader portion of the film on the takeup end of the photographically usable section are formed a pair of confronting side notches 411. The notches 411 also serve at times to cooperate with the resilient fingers 402 in FIG. 75, to seal the nozzle and retract the pressure pad 399 in a manner that will be described below.

As shown in FIGS. 75 and 77, the pressure pad 399 is constructed of sheet material, such as sheet metal or the like, and formed with a first end flange 412 extending upwardly by way of integral wall means 413 to an upper plate 400. As described above, the plate 400 forms the film-engaging surface of the pressure pad. It is preferably ground and polished to a plane region adapted to mate with the working surfaces of the nozzle 397.

At the sides of the plate 400 are formed integral depending side walls 414. On each of the side walls 414 are formed an integral pair of cams 415 and 416 bent out from and extending normally to the walls 414.

The film-engaging plate 400 tapers downwardly by way of end walls 417 to a second flange portion 418. The flange 418 is adapted to cooperate with a stop member generally designated 420, formed integrally with the side wall 393 and to be described in more detail below in connection with FIG. 75.

Referring to FIGS. 77, 78 and 80, a wrapping post 421, which may comprise a bolt or the like threaded into the end flange 412, serves as a support for the resilient fingers 402 described above. These extend downwardly to legs 422 formed integral with each other by way of an intervening wrapping 423 about the post 421. It will be apparent that the fingers 402 and their attaching arms 422 can be formed from a single piece of spring steel wire or the like.

The arms 402 extend upwardly through a pair of cooperating recesses 424 formed in one end 425 of the cam and nozzle plate assembly 401. The end 425 is formed integral with a pair of depending arms 426 that initially engage the end flange 412 of the pressure pad 399. The cam and valve assembly 401 is formed with a reduced end portion 427 that serves at times to act as a valve closing the outlet passage of the nozzle 397 in FIG. 75. Just behind the portions of the end flange 412 initially engaged by the arms 426 on the plate 401 are a pair of notches 428 that serve at times to receive the arms 426, thus allowing the pressure pad to approach the plate 401.

Referring again to FIG. 75, the pressure pad 399 is urged upwardly by a resilient leaf spring 429 compressed between the underside of the pressure pad and the base wall 393. The spring 429 is slidable between a pair of stops 430 and 431 formed integral with the housing, and in the position shown engages neither.

The pressure pad is held in the position shown in FIG. 75 by engagement at three points. First, the end flange 418 is in engagement with a ledge 432 formed on the stop member 420. Second, the depending arms 426 from the cam and valve plate 401 engage the flange 412 just forward of the notches 428. Third, the flange 412 rests on the upper surface of a resilient spring detent 433 secured to the wall 393.

The cams 415 and 416 formed on the pressure pad 399 on either side of the housing are in engagement with cooperating cams 434 and 435, respectively, formed integral with a rib 436 that is in turn formed integral with the side wall 393. When the three point support for the pressure pad 399 just described is disengaged, the cams 415 and 416 are guided by the cams 434 and 435, respectively, for movement of the pressure pad 399 upwardly and to the left in FIG. 75 for purposes to be described.

As best shown in FIGS. 78 and 85, the resilient arms 402 are formed, intermediate their juncture with the portions 422 that lie along the base flange 412 of the pressure pad 399, with bends 437. In the position of the parts shown in FIGS. 75 and 78, the edges of the film 396 lightly engage the arms 402, and the arms are slightly spread by the film so that they will tend to enter notches such as 409 and 411 in the film (FIG. 6) at times to be described. Lowering of the pressure plate from the position shown in FIG. 78 effects a relative displacement of the film 396 from the position shown at 396a in FIG. 85 to the position shown in FIG. 396b, in which the ends of the arm 402 will not engage the sides of the film. The purpose of this arrangement will be made apparent below.

As schematically indicated in FIG. 75, a pair of spaced and mutually insulated contacts 440 may be arranged in the housing, and led out to external terminals in the manner described above in connection with the contacts 70 and 71. In the position of the parts shown in FIG. 75, the contacts 440 are bridged by the end 425 of the plate 401 to present a closed circuit to the system of FIG. 44 indicating that the film has not been processed. In the final position of the plate 401, the contacts will present an open circuit, indicating that the film has been processed for the purposes of the system of FIG. 44 described above.

As best shown in FIGS. 75, 78, 79 and 84, the valve and cam plate 401 is guided for movement from an initial position (FIG. 75) to a terminal position (FIG. 84). In the terminal position, the end 427 of the plate 401 seals the nozzle 397. For this purpose, the sides of the plate 401 are slidably received in slots 438 and 439 formed in the base plate 392 and cover panel 394, respectively. The ends of the slots 438 and 439 stop the nozzle from movement to the left in FIG. 75.

Having described this embodiment of my invention, its operation will next be discussed with reference to FIGS. 75–85. It will be assumed for purposes of description that the film 396 has been exposed in a camera, placed in the system of FIG. 44, and that movement of the film to the left in FIG. 75 has been begun with the film nearing its advance end point established by the film drive and projection system.

The side notches 409 in FIG. 76 approach the arms 402, as shown in FIG. 75. The notches 409 are located on the film (FIG. 76) in position to engage the arms 402 before the notches 410 actuate the tear-tab release mechanism, described above in connection with FIGS. 6 and 13.

When the notches 409 engage the arms 402, as depicted in FIG. 82, the pressure pad 399 will be moved upwardly and to the left to the position shown in FIG. 83. The valve and cam plate 401 cannot move at this time, because it is constrained by the end of the slots 438 and 439 (FIG. 78) in the base plate 392 and cover panel 394, respectively.

Upon engagement of the notches 409 in the film 396 with the arms 402, the movement of the pressure pad will detach the end flange 418 from the ledge 432, and cause the end of the flange 412 to ride up further on the detent spring 433. At the same time, the flange 412 will slide forward under the arms 426 of the valve and cam assembly 401, allowing the arms 426 to enter the notches 428 formed on the sides of the flange 412.

The pressure pad 399 will then rise under the guidance of the cams 434 and 435, and under the influence of the spring 429, into engagement with the film 396. That will carry the film 396 into engagement with the nozzle 397, preparing the apparatus for the coating operation that will follow upon release of the processing composition when the notches 410 in FIG. 76 actuate the tear-tab mechanism in the manner described above in connection with FIGS. 6 and 13.

The release of the tear-tab should be arranged to occur approximately simultaneously with the erection of the pressure pad 399, so that the released composition will reach the coating nozzle just after the pressure pad has been engaged, and just before the subsequent first rewind operation begins. When rewinding is begun, the film 396 will move to the right in FIG. 83, to be coated with processing composition in the manner described above.

As the film approaches the end of rewind after the film has been processed, the notches 411 in the film 396 will approach and engage the arms 402. Upon this engagement, both the pressure pad 399 and the valve and cam assembly 401 will be moved. The pressure pad 399 will be moved downwardly and to the right from the position shown in FIG. 83 to that shown in FIG. 84. During that movement, the cams 415 and 416 formed on the pressure pad will be guided by the cams 434 and 435.

The spring 429 will be compressed into contact and engagement with the stops 430 and 431. The end flange 418 of the pressure pad will be brought down into engagement with a lower ledge 441 formed on the stop member 420.

The flange 412 will be brought down under, and engaged by, the detent formed on the spring 433 to hold the pressure plate in its final position. Similarly, the arms 426 on the plate 401 will rise up out of the notches 428 and engage the upper surface of the plate 412 to aid in holding it in position. The plate 401 will be moved to the right so that its end 427 will seal the coating aperture in the nozzle 397 and prevent further escape of processing composition.

Lowering of the pressure pad to the position shown in FIG. 84 will bring the film 396 out of engagement with the arms 402 by reason of the wider portions of the arms 402 adjacent the film as illustrated in FIG. 85. Accordingly, further manipulations of the film in the cassette will be uninhibited by the processing apparatus, which is now sealed and held out of engagement with the film.

FIG. 86 shows a modification of the process composition release apparatus of my invention whereby the forces required to detach the tear-tab can be reduced. Other elements of a cassette in accordance with my invention may be as described above in connection with FIGS. 6–21. The particular features involved in the modification here described are centered about the portion of the tear-tab connected to the receptacle initially containing the processing fluid, and the angle at which the tear-tab is detached.

Those elements of the apparatus of FIGS. 6, 9 and 13 shown without modification in FIG. 86 are given the same reference characters. In particular, the coating nozzle 65, tear-tab 86, receptacle 78, processing composition 79 and idler 164 connecting the tear-tab 86 to the actuating mechanism 41 in FIG. 6 may all be identical with those described above.

The outer composition container 442 communicating with the nozzle 65 and containing the receptacle 78 is formed by wall means 443 defining a chamber about the initially sealed receptacle 78 that is pierced with an aperture 444 through which the tear-tab 86 passes. The location of the aperture 444 is such that the end of the tear-tab 86 that is connected to the actuating assembly adjoins the end 85 that is initially sealed to the flange 80 of the receptacle 78 at an angle $\Theta$.

The angle $\Theta$ is chosen to have an optimum value when the end 85 is fully engaged with the flange 80, and to vary somewhat to a larger value than the optimum as the tear-tab 86 is further detached. It is desired that the angle at which the initial force is applied be optimized, as the initial force required to detach the portion 85 from the end flange is greater than that required to continue its detaching movement away from the side flanges.

As illustrated, at any point during the detaching motion of the tear-tab, the moving end 86, at the angle $\Theta$ to the attached portion 85, will join the attached portion in a generally cylindrical region of radius $r$. The radius $r$ will in general depend upon the angle $\Theta$, and the thickness of the material 86. The angle $\Theta$ is selected in dependence upon a balance between the stiffness of the tear-tab material and the adhesive forces initially sealing the tear-tab to the receptacle 78.

The radius $r$ of the bend in the tear-tab at its detaching point may be made smaller as the tear-tab is made thinner and of more flexible material, and should be made larger as the tear-tab is made of heavier or less flexible material. Again, the angle $\Theta$ should be larger for smaller adhesive forces between the end 85 and flange 80, and smaller for larger values of these forces. The optimum value can readily be determined for any particular materials.

Referring next to FIGS. 87–92, I have there shown another embodiment of my invention adapted to employ a normally disengaged reverse roll coater. The apparatus may be generally as described above in connection with FIGS. 1–21, with the exception of the modifications in the processor and in the structure of the film for sequencing the processor through its cycle of operation, to be described.

FIG. 87 shows that corner of a cassette in which the processing station is disposed, the location of the parts in the cassette being schematically and fragmentarily indicated by a portion of the cassette side wall 450. Within the housing, whose location is suggested by the wall 450, a strip of film 451 passes downwardly, from the bobulator roll, not shown, over an idler generally designated 452, and thence to the left past the processing station, to be described, towards the film gate, not shown.

The idler 452 may be of the type described above. It is formed integrally with a sprocket 453 located at its base and projecting radially beneath the path of the film 451, as shown in FIG. 87. The idler 453 is adapted to engage a normally disengaged drive sprocket 454 formed integrally with a coating roll 455 journalled by means of a shaft schematically indicated at 456 in a coater housing generally designated 457.

The housing 457 is journalled in the cassette housing within the confines of the wall 450 by means indicated schematically as a shaft 458 formed integral with the housing. The coater housing 457 is held in the position shown in FIG. 87, against a stop 459 formed integral with the housing of the cassette, by means of a spring 460 compressed between the coater housing and a support 461 fixed with respect to the cassette housing.

Internal details of the coater may be as described above in connection with FIG. 47. As schematically illustrated in FIG. 87, these include a container of processing composition 462 initially sealed by one end of a tear-tab 463.

The tear-tab 463 is adapted to be partially disengaged from the container 462 to allow processing composition 464 to be released for application to the coater roll 455, as suggested in FIG. 88. For this purpose, the tear-tab 463 extends over a first idler 465 that is journalled in the cassette housing, and back around the idler 164 forming a part of the tear-tab release mechanism 41, shown in more detail in FIG. 41, and described above in connection with FIGS. 6 and 13–16.

Formed on the coater housing 457 is a normally disengaged hook 466 comprising a part of a detent mechanism and adapted to engage a cooperating hook 467 formed on a bellcrank generally designated 468 and best shown in FIG. 89. Comparing FIGS. 87 and 89, the bellcrank 468 is journalled in the cassette housing by means of a suitable pivot pin passing through an aperture 469 in the bellcrank 468. A second end of the bellcrank 468 is formed with a pair of spaced film-engaging fingers 470.

The fingers 470 are initially biased into a position lightly engaging the edges of the film 451 by means shown in FIG. 87 as a resilient spring 471. The spring 471 is fixed in the cassette housing by means shown as a support 472 formed integral with the cassette housing. As best shown in FIG. 89, the fingers 470 are formed with rounded outer film-engaging edges 473, and with inner normal edges 474.

As shown in FIGS. 89 and 90, the film 451 is formed with a pair of side notches 475 at its edges. It will be apparent that the fingers 470 will enter and leave these notches 475 as the film 451 passes downwardly and to the left in FIG. 89 adjacent the fingers 470. On the other hand, having passed the fingers in that direction, upon passage upwardly and to the right, engagement of the fingers 470 with the notches 475 will cause engagement of the edges 474 of the fingers with the trailing edges of the notches 475, thus rotating the bellcrank 468 counterclockwise, as seen in FIG. 87.

The compressive force of the spring 460 is selected with respect to the force required to detach the tear-tab 463 such that upon actuation of the tear-tab release mechanism to swing the lever 155 counterclockwise as seen in FIGS. 87 and 88, the coater housing 457 will first be swung down into engagement with the film 451, and the tear-tab 463 will then be partially detached from the receptacle 462. That will cause the coating roll 455 to engage the emulsion side of the film 451.

The idler sprocket 453 will drivingly engage the roll sprocket 454 to drive the coating roll against the direction of movement of the film. The hook 466 will engage the hook 467 on the bellcrank 468, causing the coater to be held in coating engagement with the film even though the forces applied to the tear-tab 463 fall off as the tear-tab is detached and drawn out of the housing 457 by the lever 155.

FIG. 90 shows pertinent details of the film strip 451 adapted for use in the apparatus of FIG. 87. Constructional features other than those shown may be identical with those described above in connection with the film strip of FIGS. 1 and 2. As shown, the film 451 is formed with a pair of side notches 476 in the trailer region adjacent the supply reel end of the film, to actuate the tear-tab release mechanism in the manner described above in connection with the apparatus of FIGS. 1-21. The side notches 475, which can be of rectangular section as shown in FIGS. 89 and 90, are located near the takeup end of the film 451 in position to engage the edges 474 of the hook formed by the spring fingers 470 as the film nears its end on the takeup reel during the first rewind cycle following exposure. While not shown in FIG. 90, the film 451 may also be provided with the two spaced elongated holes of first and second length to establish an exposure end point in the camera, and an advance termination point in the film drive and projection apparatus, as described above. Similarly, contacts, not shown, may be located in the cassette in position to be closed by one of the levers 155 in their position shown in FIG. 87, and opened in other positions of the levers, to signal the processed or unprocessed state of the film.

Having thus described this embodiment of my invention, its operation will next be described in connection with FIGS. 87-92. Operation will be discussed on the assumption that the film 451 has been exposed in the camera, and has been placed in the system of FIG. 44 so that the first advance movement is begun to carry the film to the second termination point established by the film drive and projection system. During this movement, the notches 476 will be moved to the right of the position shown in FIG. 91 beyond the actuating arms 151 in their initial position. When the first rewind operation is begun, the notches 476 will pass and engage the arms 151, actuating the release mechanism 41 to swing the levers 155 counterclockwise to the position shown in FIG. 91.

With the apparatus in the initial position shown in FIG. 87, as tension is first applied to the tear-tab 463 and before the tear-tab begins to detach from the receptacle 462, the force applied to the tear-tab will draw the coater housing 457 down against the spring 460 and into the film-engaging position illustrated in FIG. 88. That will cause engagement of the sprockets 453 and 454, to drive the coating roll 455 as it engages the film 451.

The detent elements 466 and 467 will be engaged to hold the processor housing 457 in the position shown in FIG. 88 as the tear-tab is partially detached by movement of the lever 155 to release the processing composition 464 and allow it to flow to the coating roll. Coating of the film 451 will then proceed as the film is moved onto the supply reel.

Toward the end of the coating operation, the notches 475 will engage the portions 474 of the hooks 470 on the bellcrank 468, rotating the bellcrank 468 counterclockwise and out of engagement with the hook 466 to allow the container 457 to rise under the action of the spring 460 into engagement with the stop 459. The bellcrank 468 will be retained in a position out of engagement with the film 451 by the spring detent 471, as shown in FIG. 92. The parts will remain in the position shown in FIG. 92 thereafter, as the film is projected and then rewound, free of engagement with the elements of the processing system.

FIGS. 93, 94 and 95 illustrate process and control apparatus in accordance with another embodiment of my invention. FIG. 93 illustrates schematically a strip of film, as seen from the base side, adapted to program the apparatus of this embodiment.

Referring to FIG. 93, I have shown a film strip generally designated 477 having an end 478 adapted to be connected to a supply reel and an end 479 adapted to be connected to a takeup reel. The film intermediate its ends is formed with sprocket holes such as 480 in the manner and for the purposes described above, together with a first elongated sprocket hole and a second more greatly elongated sprocket hole, not shown, for the purposes described above in connection with FIGS. 1 and 2.

On the emulsion side of the film, opposite the side shown, a strip of emulsion illustrated by the dotted line 481 is applied, at least over the central portion of the film and at least over that substantial portion of the length thereof on which usable images can be formed.

On the trailer region adjacent the supply end 478 of the film is formed a bump generally designated 482, which may be the same as the bump 16 in FIG. 1, formed with an aperture 483 at its leading edge (in the direction of movement towards the takeup reel) for purposes to be described. Also located on the film trailer portion is a circular aperture 484, formed in the central region of the film for purposes to be described.

In the leader end of the film adjacent the takeup end 479 is formed a first circular aperture 485, which may be the same as the aperture 484 in shape and size, and which performs a function to be described below. Following this aperture 485 is a second hook 486 formed on the film. The hook 486 may be of the same construction as the hook 482 just described, except that it faces the supply end of the film and is operative to perform its function, to be described, when the film is moved towards the supply reel.

FIG. 94 illustrates schematically and fragmentarily the pertinent elements of a processing station adapted to utilize the film strip of FIG. 93. These comprise a generally rectangular receptacle 487 initially containing a charge of processing composition 488 and open at one side in a region bounded by plane flange 489. The flange 489 forms a surface to which one end 490 of a tear-tab generally designated 491 is sealed, to initially seal the composition 488 in the receptacle 487.

The free end 492 of the tear-tab extends through, and is affixed to, a cylindrical block 493 of any suitable material, such as plastic or the like, that is lightly secured by a pressure-sensitive adhesive, as suggested at 494, to the lower surface of a nozzle block 495, to be described. The cylindrical block 493 is adapted to be received in a circular aperture, such as the aperture 484 formed near the supply end of the film.

On the top side of the nozzle block 495 is formed a post 496 to which one end of a flexible strip 497 is secured. The strip 497 may be of any suitable flexible plastic material, such as that from which the tear-tab 491 is made, and serves at times to seal the nozzle in a manner to appear. The other end of the strip 497 is secured in a suitable slot formed in a second cylindrical block 498, which may be of the same size and material as the block 493. The block 498 is adapted to be received in the recess 485 under conditions to be described.

The apparatus of FIG. 94 further comprises a pressure pad generally designated 499, which may be of the same construction as the pressure pad 335 described above in connection with FIG. 70 with exceptions to be noted. In particular, the pressure pad 499 is adapted to be toggle-mounted in the cassette housing, not shown, by a set of links 500, which may be the same as the links 346 in FIG. 70. The pressure pad is adapted to be erected by the hook 482 formed on the film 477 when the hook 482 engages a hook fragmentarily shown at 501 in FIG. 94. The hook 501 may be identical in construction and function with the hook 354 in FIG. 70, and, like that hook, may be formed as part of a bell-crank assembly that is adapted to release a spring loaded detent to allow the pressure pad to rise into engagement with the film, carrying the film into coating engagement with the nozzle, to be described.

Comparing FIG. 94 with FIG. 70, the pressure pad 499 of FIG. 94 is adapted to be retracted by a simple mechanism comprising a hook 502 formed on the left end of the pressure pad 499, which replaces the ramp 339 in FIG. 70, its wedge guides 340, and the combination cam and nozzle valve assembly 356 in FIG. 70. The hook 502 is adapted to be engaged at times by the hook 486, formed on the film 477 as shown in FIG. 93. When thus engaged, the pressure pad 499 will be drawn down into its latched position out of engagement with the film 477 by the mechanism otherwise described in connection with FIG. 70.

A nozzle is formed by the nozzle block 495, comprising, as its leading edge, the block 498 in the position shown, lightly adhered to the lower surface of the block 495 by a small amount of pressure-sensitive adhesive indicated at 503. Side channels confining the processing composition 488 to the emulsion region of the film may be provided on the nozzle block, but are not shown in the drawings to simplify the illustration of the conceptually relevant parts. The trailing edge of the nozzle is formed by a doctor bar 504, functioning as described above to limit the thickness of the layer of processing composition coated on the film 477 during processing.

Operation of the embodiment of FIGS. 93–95 will be discussed on the assumption that the film 477 has been exposed in the camera, and that a cassette comprising the film 477 and the processing structure fragmentarily shown in FIG. 94 has been inserted in the system of FIG. 44. For the purpose of giving the system of FIG. 44 a signal indicating whether or not the film has been processed, a pair of contacts may be initially bridged by the pressure plate 499, and opened when the pressure plate 499 is moved to its final position. The manner in which these contacts may be deployed in the housing is sufficiently described above, and is not shown in connection with FIGS. 93–95.

As the film 477 is first advanced from the exposure termination point established in the camera to the second termination point established in the system of FIG. 44, and the film 477 is thereby moved to the left in FIG. 94, the first operation effecting the processor will be the engagement of the hook 482 with the hook 501, causing erection of the pressure pad 499 with concomitant engagement of the film 477 between the pressure pad and the nozzle. At the end of this movement, the aperture 484 will be brought into registry with the block 493, causing the film 477 to rise slightly and accept the lower end of the block 493. As the first rewind operation is begun, the block 493 will be carried to the right in FIG. 94 by the film, completely detaching the tear-tab 491 and opening the receptacle 487 to allow the processing composition 488 to flow down into coating relationship with the film.

Processing of the film 477 will continue in the manner described above, as the composition 488 is coated on the film while it is rewound onto the supply reel. Near the end of the run onto the supply reel, the block 498 will enter the recess 485 in the film, carrying the flexible strip 497 over the nozzle opening, and thereby sealing the nozzle. The block 498 will pass over the doctor bar 504, and the residual pressure-sensitive adhesive on its upper surface will engage it with the lower surface of the block 495 to maintain the nozzle in sealed condition following processing.

Shortly thereafter, the hook 486 formed on the film 477 will engage the hook 502 formed on the pressure pad 499, bringing the pressure pad down into its final lowered position as discussed above in connection with FIG. 70. As suggested in FIG. 95, the film 477 will be drawn down during this operation. It will be released from the hook 502 during the subsequent projection cycle, whereafter it will move back and forth over a path above the elements of the pressure pad and its engaging and disengaging assembly.

While I have described my invention with respect to the details of various illustrative embodiments, many changes and variations will become apparent to those skilled in the art upon reading my description, and such can obviously be made without departing from the scope of my invention.

Having thus described my invention, what I claim

1. A photographic product for use with apparatus including a rotatable member, said product comprising an elongated strip of photographic material adapted to be operably connected to a rotatable member to effect its coiling therearound responsive to the rotation of the member, an actuating element on said strip of photographic material extending above a surface thereof, and at least one discontinuity in said strip of photographic material spaced from said actuating element a predetermined distance to receive said actuating element as the section of said strip of photographic material containing said actuating element and said discontinuity is coiled around the rotatable member, whereby said strip can be coiled smoothly around the rotatable member over said actuating element with a uniform radius.

* * * * *